US012387537B2

(12) United States Patent
 Hinduja et al.

(10) Patent No.: US 12,387,537 B2
(45) Date of Patent: Aug. 12, 2025

(54) DETERMINATION OF HEALTH STATUS OF VEHICULAR SYSTEMS IN VEHICLES

(71) Applicant: ANI TECHNOLOGIES PRIVATE LIMITED, Bengaluru (IN)

(72) Inventors: Hitesh Hinduja, Bangalore (IN);
 Krishna Koushik Vsr, Nellore (IN);
 Gaurav Agarwal, Bangalore (IN);
 Shreya Kekkar, Pune (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 574 days.

(21) Appl. No.: 17/090,620

(22) Filed: Nov. 5, 2020

(65) Prior Publication Data
 US 2022/0068053 A1   Mar. 3, 2022

(30) Foreign Application Priority Data
 Aug. 25, 2020 (IN) .............................. 202041036561

(51) Int. Cl.
 *G07C 5/08* (2006.01)
 *B60H 1/00* (2006.01)
 (Continued)

(52) U.S. Cl.
 CPC ....... *G07C 5/0816* (2013.01); *B60H 1/00021* (2013.01); *B60W 40/09* (2013.01);
 (Continued)

(58) Field of Classification Search
 CPC ...... G07C 5/0816; G07C 5/008; G07C 5/006; B60H 1/00021; B60H 1/00978;
 (Continued)

(56) References Cited

U.S. PATENT DOCUMENTS 6,829,530 B2   12/2004 Mauro
7,082,359 B2   7/2006 Breed
 (Continued)

FOREIGN PATENT DOCUMENTS

CN   109460003 A   3/2019
WO   2019141411 A1   7/2019
 (Continued)

*Primary Examiner* — Aniss Chad
*Assistant Examiner* — Chase L Cooley
(74) *Attorney, Agent, or Firm* — CHIP Law Group

(57) ABSTRACT

A predictive maintenance method for determining a health status of a vehicular system included in a first vehicle is provided. A first dataset is collected for a plurality of vehicles. The first dataset is processed to determine a plurality of features corresponding to the vehicular system and a plurality of feature values for the plurality of features. A classifier is trained, based on the plurality of features, for determining the health status of the vehicular system. A second dataset including second operational data, second vehicle data, second trip data, and second service data for the first vehicle is collected. The second dataset is provided as input to the trained classifier. The health status of the vehicular system included in the first vehicle is determined based on an output of the trained classifier for the second dataset.

17 Claims, 33 Drawing Sheets

(51) Int. Cl.
*B60W 40/09* (2012.01)
*B60W 50/00* (2006.01)
*B60W 50/02* (2012.01)
*G06F 18/214* (2023.01)
*G06F 18/24* (2023.01)
*G07C 5/00* (2006.01)

(52) U.S. Cl.
CPC .... *B60W 50/0098* (2013.01); *B60W 50/0205* (2013.01); *G06F 18/214* (2023.01); *G06F 18/24* (2023.01); *G07C 5/008* (2013.01)

(58) Field of Classification Search
CPC ............ B60W 40/09; B60W 50/0098; B60W 50/0205; G06F 18/214; G06F 18/24
See application file for complete search history.

(56) References Cited

U.S. PATENT DOCUMENTS

| | | | |
|---|---|---|---|
| 7,751,955 | B2 | 7/2010 | Chinnadurai |
| 9,026,304 | B2 | 5/2015 | Olsen |
| 9,177,428 | B2 | 11/2015 | Nguyen |
| 9,547,944 | B2 | 1/2017 | Nelson |
| 9,600,541 | B2 | 3/2017 | Choi |
| 9,780,967 | B2 | 10/2017 | Sargent |
| 9,846,978 | B1 | 12/2017 | Tseng |
| 9,881,428 | B2 | 1/2018 | Barfield |
| 10,055,903 | B2 | 8/2018 | Koons |
| 10,197,631 | B2 | 2/2019 | Barfield |
| 2005/0125117 | A1* | 6/2005 | Breed ................. G07C 5/0808 701/31.5 |
| 2014/0074345 | A1* | 3/2014 | Gabay ................... G07C 5/008 701/33.9 |
| 2014/0279707 | A1 | 9/2014 | Joshua |
| 2015/0262432 | A1* | 9/2015 | Yturriaga-Trenor ..... G07C 5/00 701/29.1 |
| 2016/0035150 | A1 | 2/2016 | Barfield |
| 2016/0046170 | A1* | 2/2016 | Lu ...................... B60T 8/17551 701/1 |
| 2016/0063418 | A1 | 3/2016 | Roddy |
| 2016/0133066 | A1 | 5/2016 | Lavie |
| 2018/0122160 | A1 | 5/2018 | Heredia |
| 2018/0150776 | A1 | 5/2018 | Anagnos |
| 2018/0173216 | A1 | 6/2018 | Spiro |
| 2018/0195470 | A1* | 7/2018 | Bevan ................ B60H 1/00314 |
| 2018/0374060 | A1 | 12/2018 | Viswanath |
| 2020/0013237 | A1 | 1/2020 | Kanbe |
| 2021/0284179 | A1* | 9/2021 | Diamond ............. B60W 50/00 |
| 2021/0335062 | A1* | 10/2021 | Claessens ............. G06N 20/00 |
| 2022/0114560 | A1* | 4/2022 | Senzer .................. G07C 5/085 |
| 2022/0126864 | A1* | 4/2022 | Moustafa ........... B60W 30/182 |
| 2022/0180671 | A1* | 6/2022 | Aggarwal .............. H04L 67/10 |

FOREIGN PATENT DOCUMENTS

| | | |
|---|---|---|
| WO | 2019171337 A1 | 9/2019 |
| WO | 2019185657 A1 | 10/2019 |
| WO | 2019185659 A1 | 10/2019 |

\* cited by examiner

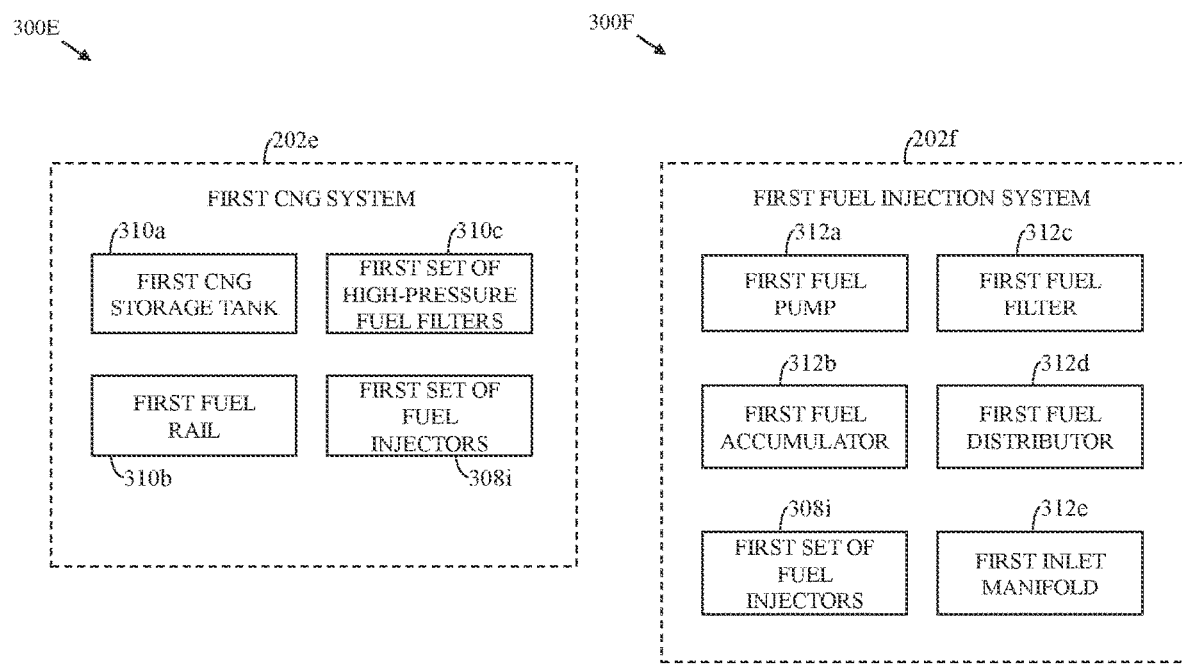

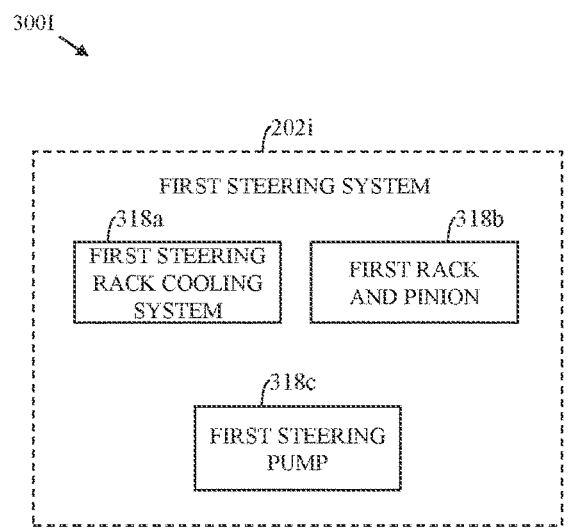
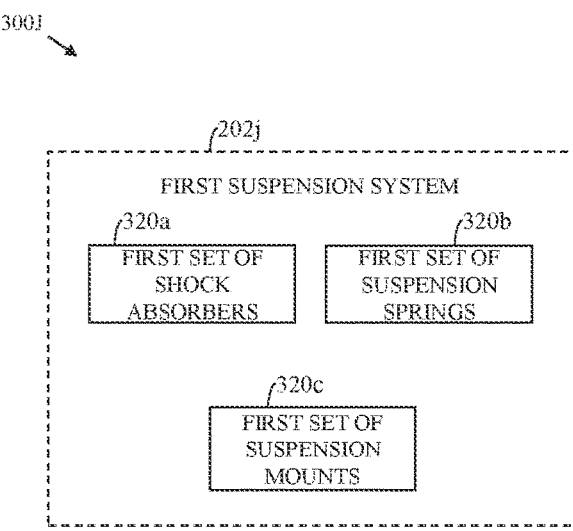
FIG. 3I
FIG. 3J

DETERMINATION OF HEALTH STATUS OF VEHICULAR SYSTEMS IN VEHICLES

CROSS-RELATED APPLICATIONS

This application claims priority of Indian Non-Provisional Application No. 202041036561, filed Aug. 25, 2020, the contents of which are incorporated herein by reference.

FIELD

Various embodiments of the disclosure relate generally to predictive maintenance for vehicular systems. More specifically, various embodiments of the disclosure relate to methods and systems for determining a health status of a vehicular system in a vehicle.

BACKGROUND

Transportation constitutes an important aspect of the modern world. For transport, an individual may utilize various types of vehicles or automobiles such as motorbikes, autorickshaws, cars, buses, trucks, or the like. A modern vehicle (e.g. a car) is a complex machine that includes various vehicular systems such as an air-conditioning (AC) system, a braking system, a suspension system, or the like. Deterioration in an operation of a vehicular system may have ramifications ranging from a mild inconvenience, for example, in case of an AC system malfunction, to a safety hazard for occupants of the vehicle, for example, in case of a braking system malfunction. In some scenarios, the deterioration may result in the vehicle abruptly breaking down during a journey. The deterioration in the operation of the vehicular system may be a result of wear and tear of one or more components of the vehicular system.

In light of the above concerns, vehicular systems in a vehicle need to be monitored for any undesirable changes in performance. A known approach for monitoring the vehicular systems includes performing periodic servicing of the vehicle. Servicing of the vehicle is typically a static procedure conducted at fixed intervals (e.g., every 5,000 kilometers or 6 months) prescribed by a vehicle manufacturer of the vehicle. Servicing of the vehicle includes a diagnosis of the vehicular systems in the vehicle according to a standard operating procedure and execution of repair/replacement procedures to rectify issues diagnosed in the vehicular systems. This is a time-consuming process and often results in various faults or issues being overlooked. Further, monitoring the vehicular systems requires a physical presence of a vehicle owner/driver at a service center. In some cases, the vehicle owner/driver may find it inconvenient to bring the vehicle to the service center, owing to a downtime of the vehicle during the servicing of the vehicle.

In light of the foregoing, there exists a need for a technical and reliable solution that overcomes the abovementioned problems, and ensures effective monitoring of health of vehicular systems in a vehicle.

SUMMARY

Predictive Maintenance methods for determining health status of a vehicular system are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A-3J are block diagrams that collectively illustrate the plurality of vehicular system of FIG. 2, in accordance with an exemplary embodiment of the disclosure;

DETAILED DESCRIPTION

Figure 1A:
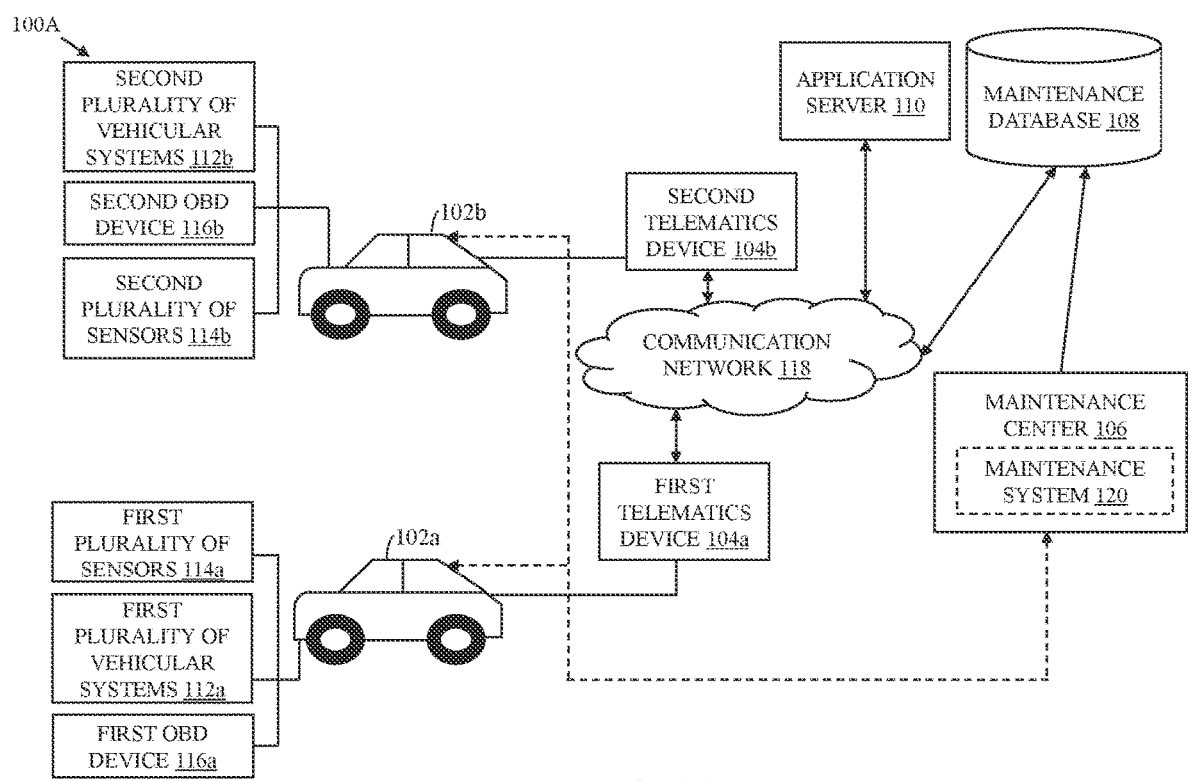
FIG. 1A is a block diagram that illustrates a system environment for predictive maintenance of a vehicular system included in a vehicle, in accordance with an exemplary embodiment of the disclosure.

Certain embodiments of the disclosure may be found in disclosed systems and methods for determining a health status of a vehicular system (for example, a suspension system or a braking system) included in a vehicle. Exemplary aspects of the disclosure provide methods for determining the health status of the vehicular system. The methods include various operations that are executed by a server (for example, an application server) to determine the health status of the vehicular system. In an embodiment, the server may be configured to collect, over a first time-interval, a first dataset for a plurality of vehicles. The first dataset includes first operational data, first vehicle data, first trip data, and first service data for plurality vehicles. A portion of the first dataset may be collected by way of a plurality of telematics devices in the plurality of vehicles. The server may be further configured to process the first dataset to determine a plurality of features corresponding to a vehicular system and a plurality of feature values for the plurality of features. The server may be further configured to train a classifier, based on the plurality of features, for determining the health status of the vehicular system. The server may be configured to collect a second dataset for a first vehicle. The second dataset may include second operational data, second vehicle data, second trip data, and second service data for the first vehicle. A portion of the second dataset may be collected by way of a first telematics device in the first vehicle. The second dataset may be provided as input to the trained classifier. The server may be configured to determine the health status of the vehicular system based on an output of the trained classifier for the second dataset.

In another embodiment, the server may be configured to receive, from a database server, a first dataset for a plurality of vehicles. The first dataset includes first operational data, first vehicle data, first trip data, and first service data for plurality vehicles. The server may be further configured to process the first dataset to determine a plurality of features corresponding to a vehicular system and a plurality of feature values for the plurality of features. The server may be further configured to train a classifier, based on the plurality of features, for determining the health status of the vehicular system. The server may be configured to receive a second dataset for a first vehicle from the database server. The second dataset may include second operational data, second vehicle data, second trip data, and second service data for the first vehicle. The second dataset may be provided as input to the trained classifier. The server may be configured to determine the health status of the vehicular system based on an output of the trained classifier for the second dataset.

In some embodiments, the vehicular system the vehicular system may be an air conditioning (AC) system. The plurality of features may be associated with a health of an evaporator, a health of a condenser, a health of an AC clutch, a health of an AC blower, and a level of AC gas in a compressor of each of the plurality of vehicles.

In some embodiments, the vehicular system is a clutch or a braking system. The plurality of features may be associated with a driver behavior of a driver associated with each of the plurality of vehicles and a distance travelled by each of the plurality of vehicles.

In some embodiments, the vehicular system is a compressed natural gas (CNG) system. The plurality of features are associated with a signal from an air intake temperature circuit, a signal from an oxygen sensor circuit, a health of a fuel injector circuit, a signal from a camshaft position sensor, a health of an ignition circuit, an efficiency of a heated catalyst, a level of performance of an exhaust pressure control valve, and a health of a throttle actuator of each of the plurality of vehicles.

In some embodiments, the vehicular system may correspond to a set of components in an engine bay. The plurality of features may be associated with a health of an engine, a level of engine oil in an engine oil tank, a health of an oil feed line, a health of an oil sump, a health of a turbocharger, a health of a radiator, a level of coolant in a coolant tank, a health of a set of spark plugs, a health of a thermostat, and a health of a set of fuel injectors of each of the plurality of vehicles.

In some embodiments, the vehicular system may be a fuel injection system. The plurality of features may be associated with a health of a fuel filter, a health of an engine, and a health of a set of spark plugs of each of the plurality of vehicles.

In some embodiments, the vehicular system may be a turbocharger. The plurality of features may be associated with a health of an air filter, a health of an oil filter, a health of an engine, a health of an oil feed line, a health of an oil sump, a level of coolant in a coolant tank, a health of a set of spark plugs, a health of a radiator, and a level of engine oil in each of the plurality of vehicles.

In some embodiments, the vehicular system may be a radiator. The plurality of features may be associated with a health of a radiator cooling fan, a health of a set of radiator mountings, a health of a water pump, a health of a thermostat, a health of a heater core, a level of coolant in a coolant tank, a health of an engine, and a health of an alternator belt in each of the plurality of vehicles.

In some embodiments, the vehicular system may be a steering system. The plurality of features may be associated with a health of a steering rack cooling system, a health of a suspension, a health of a steering pump, and a degree of alignment of a set of wheels of each of the plurality of vehicles.

In some embodiments, the vehicular system may be a suspension system. The plurality of features may be associated with a health of a set of shock absorbers, a health of a set of springs, a health of a set of suspension mounts, and a degree of alignment of a set of wheels of each of the plurality of vehicles.

In some embodiments, the server may be further configured to determine a remaining useful life (RUL) of the vehicular system based on the health status of the vehicular system.

In some embodiments, the server may be further configured to receive, in real-time or near real-time, voice data of a driver of the first vehicle from one of the first telematics device or a driver device of the driver of the first vehicle.

In some embodiments, the server may be further configured to communicate, a notification indicative of the determined health status of the vehicular system to the first telematics device.

Thus, the methods and systems of the disclosure provide a solution for determining the health status and the RUL of the vehicular system of the vehicle, enabling regular monitoring of the health status and performance of the vehicular system. The methods and systems significantly reduce a requirement to periodically check the performance and health of the vehicular system manually using a physical device or by taking the vehicle to a service center. Beneficially, the methods disclosed herein significantly reduce effort and human interference required for keeping the health status of the vehicular system in check. Further, such determination of the health status of the vehicular system prevents unexpected break downs or faults in the vehicle. Therefore, a vehicle owner/driver ensures comfort, convenience, and safety of passengers in the vehicle. Further, the disclosed methods enable predictive maintenance of the vehicle based on the health status of the vehicular system.

FIG. 1A is a block diagram that illustrates a system environment 100A for predictive maintenance of a vehicular system, in accordance with an exemplary embodiment of the disclosure. The system environment 100A includes a plurality of vehicles 102 (e.g., first and second vehicles 102a and 102b) associated with a plurality of telematics devices 104 (e.g., first and second telematics devices 104a and 104b). The system environment 100A further includes an application server 110, a maintenance center 106, and a maintenance database 108. The first vehicle 102a includes a first plurality vehicular systems 112a, a first plurality of sensors 114a, and a first on-board diagnostics (OBD) device 116a. The second vehicle 102b includes a second plurality vehicular systems 112b, a second plurality of sensors 114b, and a second OBD device 116b. The plurality of telematics devices 104, the application server 110, and the maintenance database 108 may be communicatively coupled to each other via a communication network 118.

The first vehicle 102a is a mode of transport that is utilized, by a user (such as a first driver or an owner of the first vehicle 102a), to commute from one location to another location. The first vehicle 102a may include suitable logic, circuitry, interfaces and/or code, executable by the circuitry, that may be configured to control and perform one or more operations with or without any driving assistance from the first driver. In one embodiment, the first vehicle 102a may be deployed by a service provider, such as a transport aggregator, to provide on-demand vehicle services to one or more users. In another embodiment, the first vehicle 102a may be privately owned by the user and may be used for fulfilling self-travelling requirements. The first vehicle 102a may be associated with the first telematics device 104a and may include the first plurality of vehicular systems 112a, the first plurality of sensors 114a, and the first OBD device 116a for its operations.

The first plurality of vehicular systems 112a may include electronic, electrical, mechanical, or electromechanical systems installed within the first vehicle 102a. For example, the first plurality of vehicular systems 112a may include a first air-conditioning (AC) system, a first braking system, a first engine, a first suspension system, a first radiator, or the like. Each of the first plurality of vehicular systems 112a may be integral in ensuring a drivability of the first vehicle 102a or a convenience, a comfort, and a safety of the first driver or a passenger in the first vehicle 102a. For example, proper functioning of the first AC system may be necessary for ensuring the comfort of the first driver and the passenger. In other words, a health status of the first AC system affects the comfort of the first driver and the passenger during their travel in the first vehicle 102a. Similarly, a health status of the first braking system affects the drivability of the first vehicle 102a and the safety of the first driver and the passenger (i.e., occupants of the first vehicle 102a). Various vehicular systems that constitute the first plurality of vehicular systems 112a are described in conjunction with FIGS. 2 and 3A-3J.

The first plurality of sensors 114a may include various sensors installed in the first vehicle 102a for monitoring the functioning of the first plurality of vehicular systems 112a. The first plurality of sensors 114a may include, but are not limited to, position sensors, position switches, limit switches, current sensors, voltage sensors, force sensors, pressure sensors, speed sensors, motor control sensors, airflow sensors, or the like. For example, the first engine of the first vehicle 102a may be equipped with a set of fuel rail pressure sensors, a set of crankshaft position sensors, a set of camshaft position sensors, or the like. In another example, the first suspension system of the first vehicle 102a may include linear position sensors, potentiometers, proximity switches, magneto-restrictive sensors, or the like. The first plurality of sensors 114a may be coupled to a first electronic control unit (ECU) in the first vehicle 102a by way of a communication bus (not shown). Examples of the communication bus may include, but are not limited to, a controller area network (CAN) bus, a FlexRay bus, or a BroadR-Reach bus.

Each of the first plurality of sensors 114a may communicate a corresponding output (i.e., a sensor signal) to the first ECU. The output (i.e., the sensor signal) of each of the first plurality of sensors 114a may be an analog output (e.g., an output by a pressure sensor) or a discrete output (e.g., an output by a limit switch). Functioning of the first ECU will be well known to those of skill in the art. In some embodiments, the first ECU may be configured to communicate one or more signals to one or more vehicular components (e.g., actuators, values, spark plugs, or fuel injectors) in the first vehicle 102a based on the sensor signals received from the first plurality of sensors 114a. The first ECU may be configured to generate diagnostic trouble codes (DTCs) based on the outputs of the first plurality of sensors 114a. A DTC may be generated by the first ECU if a sensor signal, received by the first ECU from a sensor of the first plurality of sensors 114a, deviates from a preset threshold. The DTC generated by the first ECU may indicate that a corresponding vehicular system is in a fault-state, that the corresponding vehicular system is not functioning as expected, or that the corresponding vehicular system requires maintenance. The DTCs generated by the first ECU may pertain to one of the first plurality of vehicular systems 112a, one or more internal components of the first plurality of vehicular systems 112a, or one or more functions associated with the first plurality of vehicular systems 112a. For example, the DTCs may pertain to a steering system in the first vehicle 102a, a health of one or more airbags in the first vehicle 102a, fuel and air metering functions in the first vehicle 102a, functioning of injection circuits in the first vehicle 102a, speed control and idle control of the first vehicle 102a, or the like. Format of the DTCs and faults indicated by the DTCs are well known to those of ordinary skill in the art.

The first OBD device 116a may include suitable logic, circuitry, interfaces, and/or code, executable by the circuitry, that may be configured to acquire sensor data (i.e., data corresponding to one or more sensors signals) corresponding to the first plurality of sensors 114a from the first ECU. In one embodiment, the first vehicle 102a may include a first OBD port (not shown) for acquiring sensor data from the first plurality of sensors 114a. As is known to those of ordinary skill in the art, the sensor data may be acquired from the first ECU by coupling the first OBD device 116a (e.g., an OBD scanner) to the first OBD port. The first OBD device 116a may further acquire the DTCs generated by the first ECU. The first OBD device 116a may be further configured to acquire first vehicle data of the first vehicle 102a from the first ECU. Vehicle data of a vehicle may be indicative of a corresponding vehicle make, a corresponding vehicle model, a vehicle manufacturing date (e.g., a month and year) of the vehicle, a vehicle age, a vehicle identification number (VIN) of the vehicle that uniquely identifies the vehicle, or the like. In a non-limiting example, the first vehicle data of the first vehicle 102a may indicate that the first vehicle 102a is a vehicle model "Q" offered by a vehicle manufacturer (i.e., vehicle make) "ABC" and that the first vehicle 102a was manufactured in March 2016.

The first telematics device 104a may include suitable logic, circuitry, interfaces, and/or code, executable by the circuitry, that may be configured to communicate vehicle-related data of the first vehicle 102a to the application server 110. The vehicle-related data may include, but is not limited to, the first vehicle data and first operational data associated with the first vehicle 102a. The first operational data may include the sensor data of the first plurality of sensors 114a and the DTCs generated by the first ECU based on the sensor data. In one embodiment, the first telematics device 104a may be communicatively coupled (e.g., by way of Wi-Fi, Bluetooth, or the like) to the first OBD device 116a. In other words, the first OBD device 116a may communicate the first vehicle data and the first operational data to the first telematics device 104a. The first telematics device 104a may communicate the first vehicle data and the first operational data to the application server 110 by way of the communication network 118.

The first telematics device 104a may be further configured to track a real-time location of the first vehicle 102a. For example, the first telematics device 104a may include a first global positioning system (GPS) circuitry (not shown) that tracks a current location of the first vehicle 102a. The first telematics device 104a may be further configured to periodically communicate (e.g., every 10 seconds, 20 seconds, minute, 2 minutes, or the like), to the application server 110, the current location of the first vehicle 102a. In one embodiment, the first telematics device 104a may be further configured to temporarily store first trip data associated with the first vehicle 102a. The first trip data may be indicative of a set of routes traversed by the first vehicle 102a over a time period (e.g., an hour, a day, or the like). The first trip data may also include date stamps and/or time stamps linked to the set of routes. The first trip data may indicate when (i.e., a date and time) a route of the set of routes was traversed by the first vehicle 102a. The first telematics device 104a may be further configured to communicate the first trip data to the application server 110. In another embodiment, the application server 110 may generate, determine, or collect the first trip data based on real-time or near real-time location data communicated by the first telematics device 104a. In an exemplary embodiment, the first telematics device 104a may be integrated with the first OBD device 116a within a single device.

In one embodiment, the first telematics device 104a may be further configured to perform functions of a driver device, in addition to aforementioned functions. For example, the first telematics device 104a may be further configured to receive ride requests from passenger devices of passengers (not shown). The first telematics device 104a may be further configured to allow the first driver associated with the first vehicle 102a to accept or reject the received ride requests and receive allocation information from the application server 110 following the acceptance of the ride requests. The allocation information may include, but is not limited, passenger information of a passenger, a first route to be traversed to reach a pickup location of the passenger, a second route to be traversed to reach a destination location of the passenger from the pickup location. The first telematics device 104a may be further configured to receive messages and/or notifications regarding a health status of each of the first plurality of vehicular systems 112a from the application server 110.

Similarly, the second vehicle 102b is another mode of transport that is associated with the second telematics device 104b and includes the second plurality of vehicular systems 112b, the second plurality of sensors 114b, and the second OBD device 116b for its operations. The second plurality of vehicular systems 112b may be functionally similar to the first plurality of vehicular systems 112a. The second plurality of sensors 114b may be functionally similar to the first plurality of sensors 114a. The second plurality of sensors 114b may be communicatively coupled to a second ECU (not shown) in the second vehicle 102b. The second OBD device 116b may be functionally similar to the first OBD device 116a. The second telematics device 104b may be functionally similar to the first telematics device 104a. Thus, the second telematics device 104b may communicate second vehicle data and second operational data of the second vehicle 102b to the application server 110 by way of the communication network 118.

Examples of the plurality of vehicles 102 may include any type of automobile such as, but not limited to, a car, a bus, an auto rickshaw, or a motorbike bike. The plurality of vehicles 102 may vary with regards to vehicle data. For the sake of brevity, the plurality of vehicles 102 are shown to include only two vehicles (i.e., the first and second vehicles 102a and 102b). However, in an actual implementation, the plurality of vehicles 102 may include multiple vehicles of different types, makes, models, age, or the like, without deviating from the scope of the disclosure.

The maintenance center 106 may be a service center that conducts service, maintenance, or repair work on the plurality of vehicles 102. The plurality of vehicles 102 may be examined at the maintenance center 106 weekly, monthly, annually, or so forth. The maintenance center 106 may be associated with a maintenance system 120. The maintenance system 120 may include suitable logic, circuitry, interfaces, and/or code, that may be configured to generate service logs following any service or repair work conducted on any of the plurality of vehicles 102. Each service log may indicate a condition of a vehicle and a condition of each of its vehicular systems before and after the service or repair work (i.e., pre-maintenance or post-maintenance) is conducted on the vehicle. For example, a first service log generated following a service of the first vehicle 102a may indicate a corresponding odometer reading (i.e., mileage or total distance travelled), a health (i.e., a condition) of a corresponding oil filter, or a level of engine oil in a corresponding engine oil tank. The first service log may further indicate a level of coolant in a corresponding coolant tank, a health status of a corresponding timing belt, a health status of a corresponding serpentine belt, a health of corresponding one or more hose pipes, a health of a corresponding set of wiper blades, a voltage level of a corresponding battery, or the like. The first service log may further indicate a level of steering fluid in a corresponding steering fluid tank, a level of transmission fluid, a level of brake fluid, a health of a corresponding fuel filter, a health of a corresponding set of brake pads, a health of a set of spark plugs, or the like. The first service log may further indicate work (e.g., component repairs, component replacements, engine oil change, coolant refill, or the like) carried out on the first vehicle 102a at the maintenance center 106. In other words, the first service log may include pre-service data that is indicative of a pre-service condition of the first vehicle 102a, post-service data that is indicative of a post-service condition of the first vehicle 102a, and a service action taken to repair or service the first vehicle 102a. The maintenance system 120 may generate and maintain a service log for each service conducted for the plurality of vehicles 102. The maintenance system 120 may store each service log in the maintenance database 108. For the sake of brevity, only a single maintenance center (i.e., the maintenance center 106) is shown. It will be apparent to those of skill in the art that the environment 100 may include a plurality of maintenance centers at a plurality of geographical locations (e.g., villages, towns, or cities) for servicing the plurality of vehicles 102.

The maintenance database 108 may include suitable logic, circuitry, interfaces, and/or code, executable by the circuitry, that may be configured to perform one or more database operations, such as receiving, storing, processing, and transmitting queries, data, information, messages, or content. The maintenance database 108 may be a data management and storage computing device that is coupled to the maintenance system 120 for performing the one or more database operations, such as receiving, storing, processing, and transmitting service logs. The service logs may be received from the maintenance system 120. The maintenance database 108 may be configured to transmit the service logs to the application server 110. The maintenance database 108 may be implemented as a cloud-based server. Examples of the maintenance database 108 may include, but are not limited to, Hadoop®, MongoDB®, MySQL®, NoSQL®, and Oracle®.

The application server 110 may include suitable logic, circuitry, interfaces, and/or code, executable by the circuitry, that may be configured to perform one or more operations associated with determination of health statuses of various vehicular systems (for example, the first and second pluralities of vehicular systems 112a and 112b). The application server 110 may be a computing device, which may include a software framework, that may be configured to create the application server implementation and perform the various operations. The application server 110 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the application server 110 may include, but are not limited to, a personal computer, a laptop, a mini-computer, a mainframe computer, a cloud-based server, a network of computer systems, or a non-transient and tangible machine executing a machine-readable code.

Figure 4:
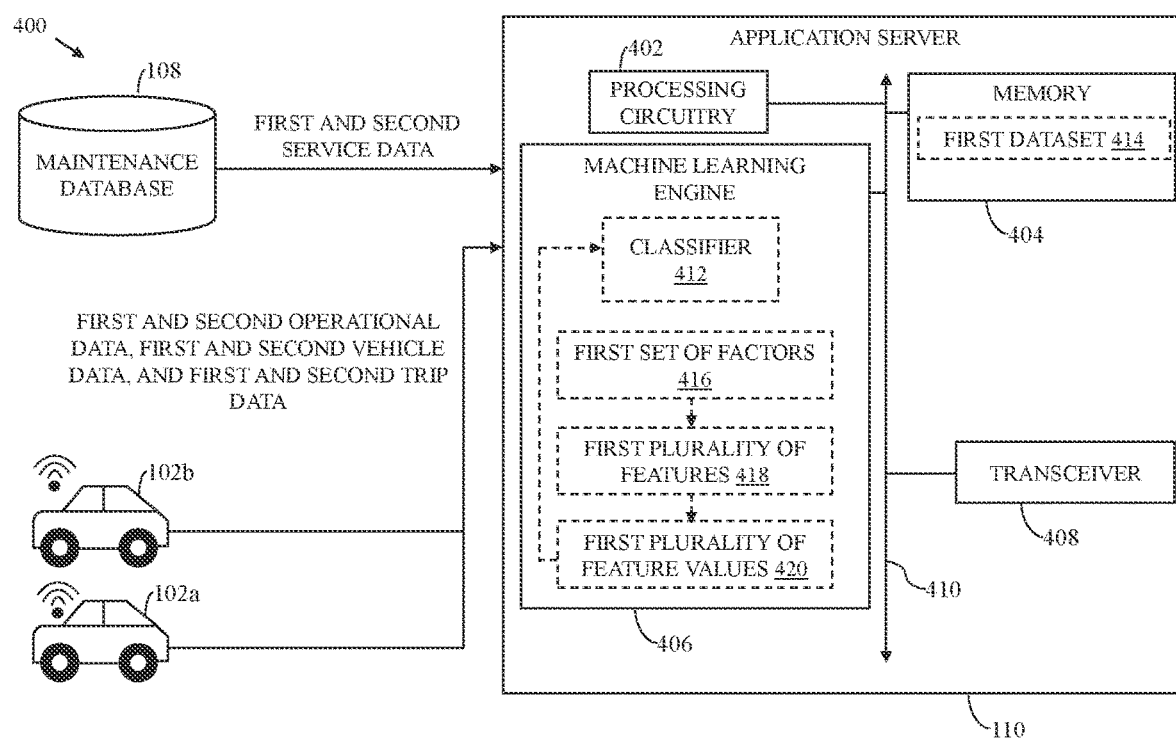
FIG. 4 is a block diagram that illustrates an exemplary scenario for training a classifier for predictive maintenance of an air-conditioning system in a vehicle, in accordance with an exemplary embodiment of the disclosure.

The application server 110 may be configured to operate in two modes such as a training mode and an implementation mode. The application server 110 may operate in the training mode for training a classifier (as shown in FIG. 4) to determine health statuses various vehicular components. After the classifier is trained, the application server 110 may operate in the implementation mode where the health statuses of various vehicular components are determined in real-time or near-real time using the trained classifier.

While operating in the training mode, the application server 110 may be configured to collect, by way of the plurality of telematics devices 104, the first and second vehicle data and the first and second operation data. The application server 110 may be further configured to receive the first trip data of the first vehicle 102a and second trip data of the second vehicle 102b by way of the plurality of telematics devices 104, respectively. The application server 110 may further receive first and second service data of the first and second vehicles 102a and 102b, respectively, from the maintenance database 108.

Based on the received first and second trip data, the application server 110 may be configured to determine first and second external factor data associated with the plurality of vehicles 102. In a non-limiting example, the first external factor data associated with the first vehicle 102a may include first weather data (e.g., pressure, temperature, humidity, or pollution level) associated with a set of geographical locations that constitute an area of operation of the first vehicle 102a. The first external factor data may further include first road condition data of various roads traversed by the first vehicle 102a. In a non-limiting example, the first road condition data may indicate a condition of each road or route traversed by the first vehicle 102a. The condition of each road or route may be indicative of a type of road (e.g., a tar road, a concrete road, or the like) and a level of undulations present on the road (e.g., no undulation, mild undulations, heavy undulations, or the like). Similar to the first external factor data, the second external factor data may also include second weather data and second road condition data. Based on the first and second vehicle data, the first and second service data, the first and second external factor data, the first and second operational data including the sensor data and the DTCs, and first and second driver behavior data, the application server 110 may train a classifier to determine health statuses of various vehicular systems. The processes of training the classifier and determining the health statuses of various vehicular systems are explained in conjunction with FIGS. 4-23.

In one embodiment, the application server 110 may be associated with the transport aggregator. In such a scenario, the application server 110 may be further configured to receive the ride requests from the passenger devices (not shown, the application server 110). Further the application server 110 may be configured to transmit the ride requests to one or more telematics devices of the plurality of telematics devices 104 via the communication network 118. Based on acceptance of the ride requests by one or more drivers associated with the plurality of vehicles 102, the application server 110 may be configured to allocate a vehicle from the plurality of vehicles 102 to the passengers.

The communication network 118 may include suitable logic, circuitry, interfaces, and/or code, executable by the circuitry, that may be configured to transmit queries, messages, data, and requests between various entities, such as the plurality of telematics devices 104, the application server 110, and the maintenance database 108. Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the system environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 110 may be configured to receive, from the first telematics device 104a, the first trip data, the first vehicle data, and the first operational data in real-time or near-real time. The application server 110 may further receive, from the maintenance database 108, the first service data corresponding to the first vehicle 102a. The application server 110 may be configured to collect the first trip data, the first vehicle data, and the first service data over a first time-interval (e.g., a few months, a year, a few years, a decade, or the like).

Based on the first trip data, the application server 110 may be configured to determine the first external factor data including the first weather data and the first road condition data. In an embodiment, the application server 110 may determine the first weather data and the first road condition data in conjunction with one or more auxiliary servers (e.g., one or more third party servers associated with the application server 110). The one or more third party servers may store data pertaining to weather and road conditions (for example, a server associated with a meteorological department, a server associated with civil works and/or construction in a country, or the like). In one exemplary scenario, the application server 110 may be configured to transmit the first trip data to the one or more third party servers. The first trip data may include a first set of trip logs associated with the first vehicle 102a. Each trip log may be indicative of a trip taken by the first vehicle 102a, a road or route traversed by the first vehicle 102a, a geographical location (e.g., a village, a town, a city, or the like) associated with a corresponding road/route, a date and time (i.e., date stamp and time stamp) associated with a corresponding trip. For example, a first trip log of the first vehicle 102a may indicate that the first vehicle 102a, on 22 May 2019, travelled 5 Kilometers (Km) along a first route from a location "X" in New York City to location "Y" in New York City. The first trip log may further indicate that the first vehicle 102a started from location "X" at 5:15 p.m. and reached location "Y" at 5:50 p.m. Based on the first trip data, the one or more third party servers may determine first road condition data and first weather data associated with the first set of trip logs. For example, the one or more third party servers may determine a temperature, pressure, humidity, a pollution level, and/or a level of precipitation on 22 May 2019 in New York City. The one or more third party servers may further determine a condition of each road that constitutes the first route. Following the determination of the first road condition data and the first weather data, the one or more third party servers may communicate the first road condition data and the first weather data to the application server 110.

The application server 110 may further determine the first driver behavior data (i.e., a first driver profile) of the first driver associated with the first vehicle 102a by way of the first trip data and the first operational data. In a non-limiting example, the first operational data may include sensor data indicative of an average level of throttle input, an average level of brake input, a maximum acceleration of the first vehicle 102a over various time periods in the first time-interval, or the like. The sensor data may further include an average acceleration of the first vehicle 102a over the various time periods in the first time-interval, an average deceleration of the first vehicle 102a over the various time periods in the first time-interval, or the like. The sensor data may be further indicative of a top speed of the first vehicle 102a over the various time periods, an average revolutions per minute (RPM) of the first engine of the first vehicle 102a over the various time periods, the maximum RPM of the first engine of the first vehicle 102a over the various time periods, or the like. The application server 110 may link and correlate the sensor data with the first trip data to generate the first driver behavior data of the first driver associated with the first vehicle 102a.

The application server 110 may analyze the first driver behavior data to score or tag the first driver. For example, if the application server 110 determines, based on an analysis of the first driver behavior data, that a driving pattern of the first driver predominantly consists of high throttle input, rapid acceleration, rapid deceleration, and/or frequent high revving of the first engine (i.e., high RPM of the first engine), the application server 110 may classify the first driver as an aggressive or a bad driver. Similarly, if the application server 110 determines that driving pattern of the first driver predominantly consists of controlled throttle input, smooth acceleration, smooth deceleration, and/or non-aggressive revving of the first engine, the application server 110 may classify the first driver as a sedate or a good driver. For the sake of brevity, the first trip data, the first vehicle data, the first service data, the first operational data, the first external factor data, and the first driver behavior data are collectively referred to as "a first vehicle dataset".

Similarly, the application server 110 may further collect over the first time-interval, the second trip data, the second vehicle data, and the second operational data associated with the second vehicle 102b. The application server 110 may further receive the second service data for the second vehicle 102b from the maintenance database 108. As described in the foregoing, the application server 110 may determine the second external factor data, consisting of the second road condition data and the second weather data, based on the second trip data. The application server 110 may further determine the second driver behavior data of a second driver associated with the second vehicle 102b. For the sake of brevity, the second trip data, the second vehicle data, the second service data, the second operational data, the second external factor data, and the second driver behavior data (i.e., a second driver profile) are collectively referred to as "a second vehicle dataset".

The application server 110 may generate a single dataset that consists of the first and second vehicle datasets. For the sake of brevity, the single dataset is hereinafter referred to as "first dataset". For the sake of brevity, the first dataset is explained with respect to only two vehicles (i.e., the first and second vehicles 102a and 102b). However, in an actual implementation, the first dataset may include trip data, vehicle data, service data, operational data, external factor data, and driver behavior data pertaining to a large number of vehicles (e.g., hundreds, thousands, or millions of vehicles) that vary in terms of age, make, model, type, or the like. A portion (e.g., the first and second operational data, the first and second vehicle data, the first and second trip data) of the first dataset is collected by way of the plurality of telematics devices 104.

The application server 110 may be configured to utilize the first dataset for training the classifier (i.e., a machine learning model) to determine a health status of a vehicular system (e.g., any of the first plurality of vehicular systems 112a). Examples of the classifier may include, but are not limited to, a neural network (e.g., long-short term memory or LSTM), a linear regression model, a logistic regression model, a decision tree, a support vector machine, a naïve Bayes model, a K-nearest neighbors model, a K-means model, a random forest model, or the like. Examples of the classifier may further include, but are not limited to, a gradient boosting machine model, an XGBoost model, a light gradient boosting model, a cat boost model or the like. In one embodiment, the classifier may be an ensemble model that is a combination of two or more aforementioned models. For example, the classifier may determine whether the vehicular system (e.g., an AC system, a braking system, or the like) is healthy or not (i.e., whether the vehicular system requires any repairs or replacements).

Prior to training the classifier, the application server 110 may use feature or variable selection techniques to analyze the first dataset and select a set of factors or variables that affect a health status of the vehicular system. Each of the selected set of factors may have a high degree of correlation or a causal relationship with the health status of the vehicular system. The feature or variable selection techniques may include various statistical techniques such as, but not limited to, Theil's U, Spearman's correlation, Pearson's correlation, variance inflation factor, analysis of variance (ANOVA), or logarithmic scaling.

Following the selection of the set of factors, the application server 110 may process the first dataset, using feature engineering techniques, to determine a plurality of features associated with the selected set of factors. Each feature of the plurality of features may correspond to a change, a trend, or a pattern in a value of a factor of the selected set of factors. The plurality of features may include a plurality of moving averages, a plurality of moving standard deviations, a plurality of cumulative sums, a plurality of rolling means, or a plurality of rolling standard deviations corresponding to one or more factors of the selected set of factors. Each feature of the plurality of features may be associated with a corresponding weight that is indicative of an extent to which the feature is correlated with the health status of the vehicular system. The application server 110 processes the first dataset to determine a plurality of feature values for the plurality of features. For example, the application server 110 may determine, based on the first and second vehicle datasets, a set of feature values for each feature of the plurality of features.

The application server 110 may be further configured to train the classifier, based on the plurality of feature values, for determining a health status of the vehicular system. The set of factors, the plurality of features, and the plurality of feature values are explained in conjunction with FIGS. 4-23. The above process describes operations to be performed for training the classifier to determine the health status of a single vehicular system (e.g., an AC system in a vehicle). For training the classifier (i.e., the machine learning model or) to determine health statuses of remaining vehicular systems of the first and second pluralities of vehicular systems 112a and 112b, the application server 110 may repeat the same process for the remaining vehicular systems of the first plurality of vehicular systems 112a and the second plurality of vehicular systems 112b. After the classifier is trained, the application server 110 may be configured to operate in the implementation mode. For the sake of brevity, the implementation mode of the application server 110 is described with respect to the first vehicle 102a.

Over a second time-interval after the first time-interval, the application server 110 may collect, by way of the first telematics device 104a for the first vehicle 102a, third operational data, third trip data, and third vehicle data. The third operational data may correspond to sensor data and DTCs that correspond to sensor signals generated by the first plurality of sensors 114a over the second time-interval. The third trip data may be similar to the first trip data, but corresponds to trips taken by the first vehicle 102a over the second time-interval. The third vehicle data may be similar to the first vehicle data, but may include an updated mileage and vehicle age of the first vehicle 102a. The application server 110 may further receive, over the second time-interval, third service data corresponding to the first vehicle 102a. The third service data may correspond to a set of service logs generated by the maintenance center 106 for the first vehicle 102a during the second time-interval.

As described in the foregoing, the application server 110 may determine third driver behavior data and third external factor data. The third driver behavior data may be similar to the first driver behavior data, but corresponds to the second time-interval. In one embodiment, the first driver behavior data may be updated to account for the third driver behavior data. Similarly, the application server 110 may determine third weather data and third road condition data based on the third trip data (collectively referred to as "third external factor data"). For the sake of brevity, the third operational data, the third trip data, the third vehicle data, the third driver behavior data (i.e., the updated first driver behavior data), and the third external factor data are collectively referred to as "second dataset". In other words, the application server 110 collects the second dataset over the second the time-interval, and a portion of the second dataset (i.e., the third operational data, the third vehicle data, and the third trip data) is collected by the application server 110 by way of the first telematics device 104a in the first vehicle 102a.

The application server 110 may provide the second dataset to the trained classifier as input. The trained classifier determines, from the second dataset, data that corresponds to the plurality of features. Based on the determined data, the trained classifier determines a health status of a vehicular system (e.g., the first plurality of vehicular systems 112a) as output. The trained classifier determines a probability (e.g., "70%") of a current health status of any vehicular system (e.g., the first AC system) of the first plurality of vehicular systems 112a being bad. In another embodiment, the trained classifier determines a probability (e.g., "70%") of a current health status of any vehicular system of the first plurality of vehicular systems 112a being good. In other words, the application server 110 determines a current health status of any vehicular system of the first vehicle 102a based on an output of the trained classifier for the second dataset. If the probability of the current health status of the vehicular system being bad exceeds or equals a pre-defined or preset probability threshold (e.g., "30%"), the application server 110 may communicate a notification to the first telematics device 104a, notifying the first driver of the determined health status.

The application server 110 may further request the first driver to communicate an assessment by the first driver of a current health status of the vehicular system (e.g., the first AC system). In one embodiment, voice data (i.e., a feedback), indicative of a current functioning of the vehicular system, may be communicated by the first driver to the application server 110 by way of the first telematics device 104a. The voice data may include a speech message recorded by the first driver that may be indicative of the assessment of the current functioning of the vehicular system by the first driver. Based on the voice data, the application server 110 may validate the output of the trained classifier and based on a result of the validation (i.e., whether the determined health status is correct or not), the application server 110 may classify the output (i.e., the determined health status of the first AC system) as one of a true negative or a false negative. In another embodiment, feedback may be communicated by the first driver in a format different from the voice data, for example, a text message, a video message, or the like.

Based on principles of reinforcement learning known to those of ordinary skill in the art, the result of the validation (i.e., the validated or disproved output) may be used as feedback to improve an accuracy of the trained classifier over time. In other words, the application server 110 validates the output of the classifier based on the voice data. Based on the classification of the output of the classifier, the application server 110 may communicate a message to the first driver by way of the first telematics device 104a. The message may be a request to the first driver to take the first vehicle 102a to the maintenance center 106 for maintenance of the vehicular system. Following service work conducted by the maintenance center 106 on the vehicular system, the maintenance system 120 may generate a set of service logs indicative of a set of internal components repaired and/or replaced. The set of service logs may be communicated to the maintenance database 108, which in turn may communicate corresponding service data (i.e., feedback data) to the application server 110 to validate the output of the classifier, thereby improving an accuracy of the classifier.

In another example, if the probability of the current health status of the vehicular system being bad is less than the pre-defined or preset probability threshold (e.g., "30%"), the application server 110 may communicate a notification to the first telematics device 104a, notifying the first driver of the determined health status (i.e., good health). Further, when the determined health status of the vehicular system is good, the trained classifier may determine a remaining useful life (RUL) of the vehicular system. The RUL of the vehicular system is indicative of a remaining distance that may traversed by the first vehicle 102a before requiring repair or replacement of one or more components of the vehicular system. In other words, the RUL of the vehicular system may indicate a remaining distance that may be traversed by the first vehicle 102a before the health status of the vehicular system of the vehicle deteriorates below the pre-defined or preset probability threshold. Based on the determined RUL of the vehicular system, the application server 110 may schedule a service session (i.e., predictive maintenance) for the first vehicle 102a. The application server 110 may communicate, to the first telematics device 104a, a message indicating the determined RUL of the vehicular system and requesting the first driver to visit the maintenance center 106 for servicing the first vehicle 102a at a scheduled time.

Figure 1B:
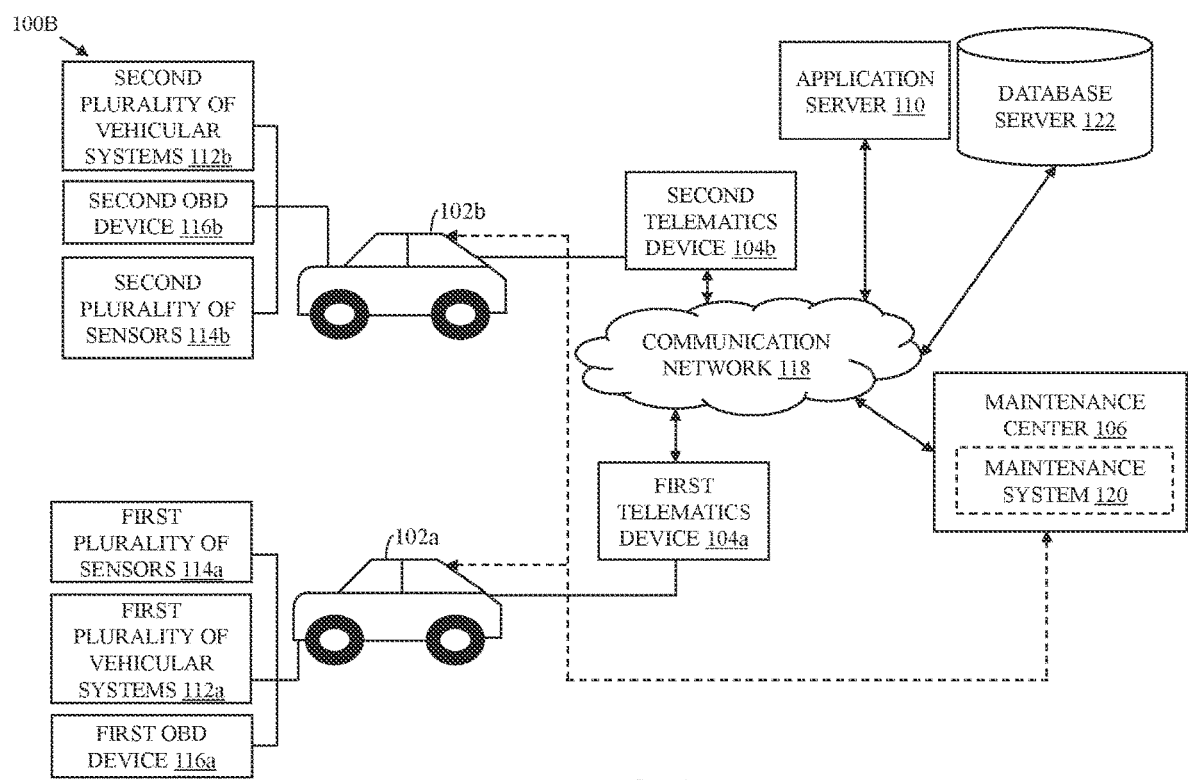
FIG. 1B is a block diagram that illustrates a system environment for predictive maintenance of a vehicular system included in a vehicle, in accordance with another exemplary embodiment of the disclosure.

FIG. 1B is a block diagram that illustrates a system environment 100B for predictive maintenance of a vehicular system, in accordance with another exemplary embodiment of the disclosure. The system environment 100B includes the plurality of vehicles 102, the plurality of telematics devices 104, and the maintenance center 106, and the application server 110. The first vehicle 102a includes the first plurality of vehicular systems 112a, the first plurality of sensors 114a, and the first OBD device 116a. The second vehicle 102b includes the second plurality of vehicular systems 112b, the second plurality of sensors 114b, and the second OBD device 116b. The environment 100B further includes a database server 122, in lieu of the database server 122 shown in FIG. 1A. The plurality of telematics devices 104, the application server 110, the maintenance system 120, and the database server 122 may be communicatively coupled to each other via the communication network 118. In one embodiment, the application server 110 may not collect any data by way of the plurality of telematics devices 104 or the maintenance database 108. In such a scenario, the data may be collected by the database server 122.

The database server 122 may include suitable logic, circuitry, interfaces, and/or code, executable by the circuitry, that may be configured to collect by way of the plurality of telematics devices 104, the first and second trip data, the first and second operational data, and the first and second vehicle data over the first time-interval. The database server 122 may be further configured to receive, from the maintenance system 120 over the first time-interval, service logs for the plurality of vehicles 102. In other words, the database server 122 may receive the first and second service data from the maintenance system 120. The database server 122 may further determine the first and second driver behavior data and the first and second external factor data, based on the first and second trip data (as described in the foregoing description of FIG. 1A). In a non-limiting example, the database server 122 may store the first and second trip data, the first and second operational data, and the first and second vehicle data, and the first and second service data, the first and second driver behavior data, and the first and second external factor data as a single dataset (i.e., the first dataset).

At any time-instance after the first time-interval, the database server 122 may receive a query from the application server 110 via the communication network 118. The query may be a request for vehicle data, historical trip data, historical service data, historical operational data, historical driver behavior data, and historical external factor data. Based on the received query, the database server 122 may communicate the first dataset (i.e., historical data collected over the first interval) to the application server 110. The application server 110 may receive the first dataset from the database server 122. The application server 110 may then process the first dataset to determine the plurality of features and the plurality of feature values to train the classifier to determine a health status of the vehicular system (e.g., any of the first plurality of vehicular systems 112*a*). The application server 110 may receive the second dataset for the first vehicle 102*a* from the database server 122. The process of training the classifier and determining the health status of the vehicular system is similar to that described in the foregoing description of FIG. 1A.

Figure 2:
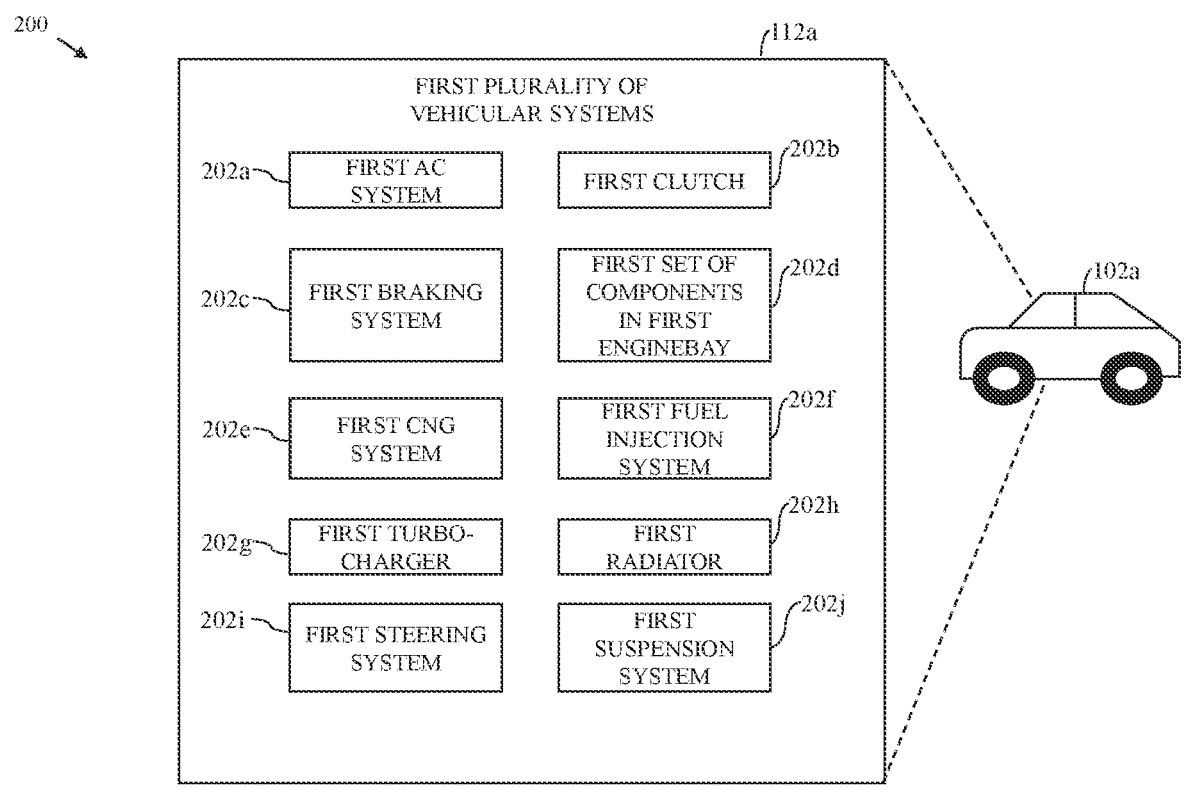
FIG. 2 is a block diagram that illustrates a plurality of vehicular systems included in a first vehicle of FIG. 1, in accordance with an exemplary embodiment of the disclosure.

FIG. 2 is a block diagram 200 that illustrates the first plurality of vehicular systems 112*a* included in the first vehicle 102*a*, in accordance with an exemplary embodiment of the disclosure. The first plurality of vehicular systems 112*a* include the first AC system (hereinafter, designated and referred to as "the first AC system 202*a*") and a first clutch 202*b*. The first plurality of vehicular systems 112*a* further includes the first braking system (hereinafter, designated and referred to as "the first braking system 202*c*"), a first set of components 202*d* in a first engine bay of the first vehicle 102*a*, a first CNG system 202*e*, and a first fuel injection system 202*f*. The first plurality of vehicular systems 112*a* further includes a first turbocharger 202*g*, a first radiator 202*h*, a first steering system 202*i*, and the first suspension system (hereinafter, designated and referred to as the first suspension system 202*j*"). Each of the first plurality of vehicular systems 112*a* is described in detail in FIGS. 3A-3J. However, it will be apparent to those of skill in the art that the first plurality of vehicular systems 112*a* may further include other vehicular systems such as, but not limited to, a transmission system, a driver information system, a traction control system, a dynamic chassis control system, a cruise control system, an electronic boot opening system, an autonomous or semi-autonomous driving system, or the like, which are not shown for the sake of brevity.

The first plurality of vehicular systems 112*a* may further include, components, such as an oxygen sensor circuit, an air intake temperature circuit, a fuel injector circuit, a camshaft position sensor, an ignition circuit, a catalytic converter, an exhaust pressure control valve, a throttle actuator, or the like. The first plurality of vehicular systems 112*a* may further include, other components that are not shown, such as a fuel filter, an oil filter, a set of radiator mountings, an alternator belt, a heater core, a steering wheel, or the like. Functions and locations of these components are known to those of skill in the art. However, these components have not been shown for the sake of brevity.

In the current embodiment, it is assumed that the second plurality of vehicular systems 112*b* may be similar to the first plurality of vehicular systems 112*a*. However, the second plurality of vehicular systems 112*b* may not necessarily be the same as the first plurality of vehicular systems 112*a*. For example, the second plurality of vehicular systems 112*b* may include or exclude one or more vehicular systems (e.g., the first CNG system 202*e* or the first turbocharger 202*g*) of the first plurality of vehicular systems 112*a* without deviating from the scope of the disclosure.

Figures 3A, 3B:
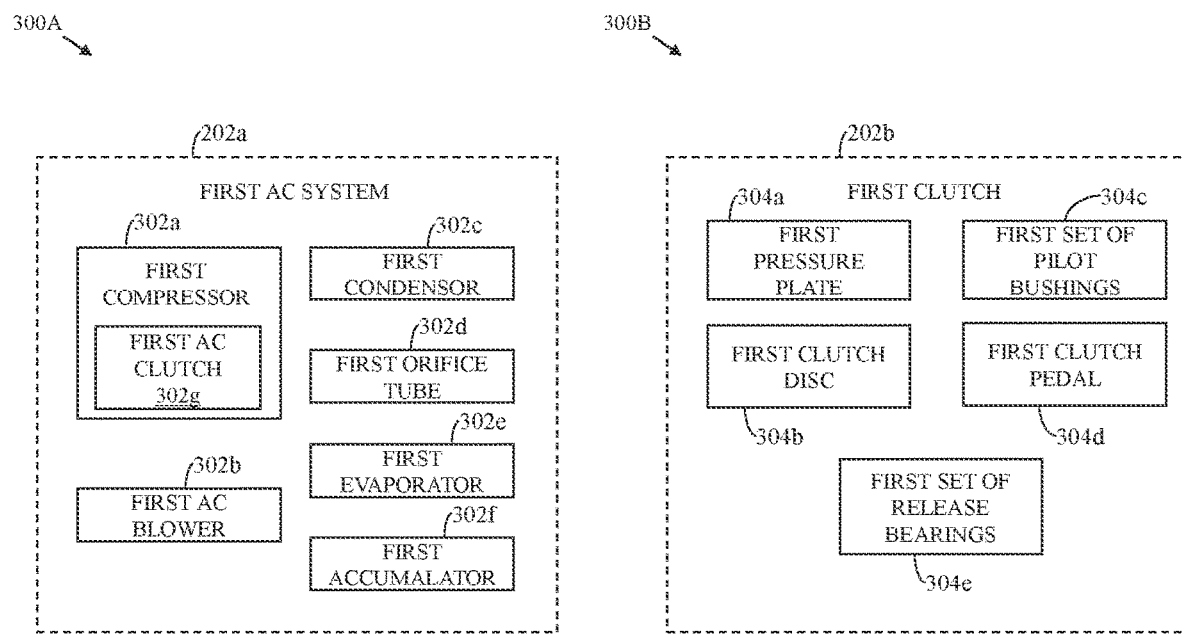

FIG. 3A is a block diagram 300A that illustrates the first AC system 202*a*, in accordance with an exemplary embodiment of the disclosure. The first AC system 202*a* may include various internal components such as, but not limited to, a first compressor 302*a*, a first AC blower 302*b*, a first condenser 302*c*, a first orifice tube 302*d*, a first evaporator 302*e*, a first accumulator 302*f*. The first compressor 302*a* may include a first AC clutch 302*g*. Functions and structures of the various internal components will be known to those of skill in the art. It will be apparent to those of skill in the art that the various internal components of the first AC system 202*a* shown are merely exemplary and one or more internal components may be removed or added to the first AC system 202*a* without deviating from the scope of the disclosure. For example, if the first compressor 302*a* is a variable load compressor, the first AC system 202*a* may not include the first AC clutch 302*g*.

FIG. 3B is a block diagram 300B that illustrates the first clutch 202*b*, in accordance with an exemplary embodiment of the disclosure. The first clutch 202*b* may include various internal components such as, but not limited to, a first pressure plate 304*a*, a first clutch disc 304*b*, a first set of pilot bushings 304*c*, a first clutch pedal 304*d*, and a first set of release bearings 304*e*. Functions and structures of the various internal components of the first clutch 202*b* will be known to those of skill in the art. It will be apparent to those of skill in the art that the various internal components of the first clutch 202*b* shown are merely exemplary and one or more internal components may be removed or added to the first clutch 202*b* without deviating from the scope of the disclosure.

Figure 3C:
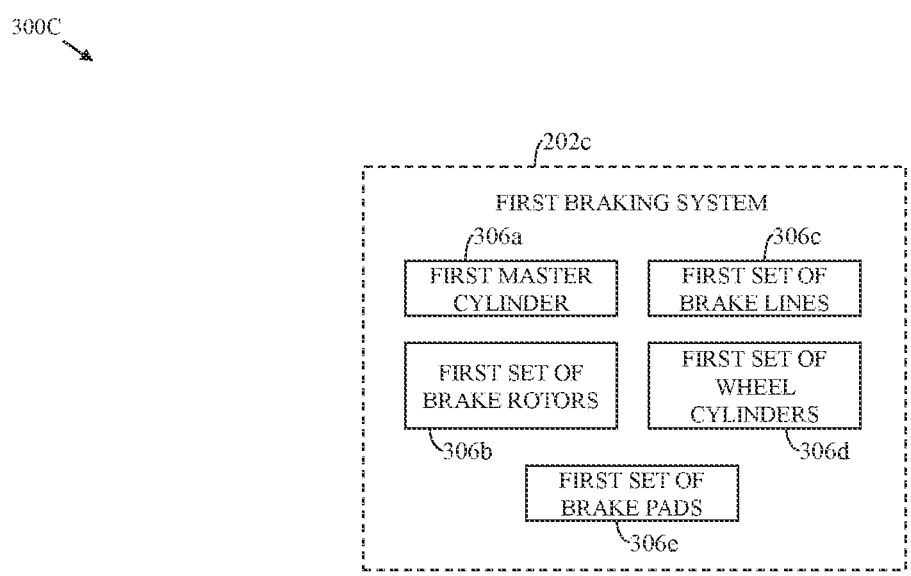

FIG. 3C is a block diagram 300C that illustrates the first braking system 202*c*, in accordance with an exemplary embodiment of the disclosure. The first braking system 202*c* may include various internal components such as, but not limited to, a first master cylinder 306*a*, a first set of brake rotors 306*b*, a first set of brake lines 306*c*, a first set of wheel cylinders 306*d*, and a first set of brake pads 306*e*. Working of the various internal components of the first braking system 202*c* will be well known to those of skill in the art. It will be apparent to those of skill in the art that the various internal components of the first braking system 202*c* shown are merely exemplary and one or more components may be removed from or added to the first braking system 202*c* without deviating from the scope of the disclosure.

Figure 3D:
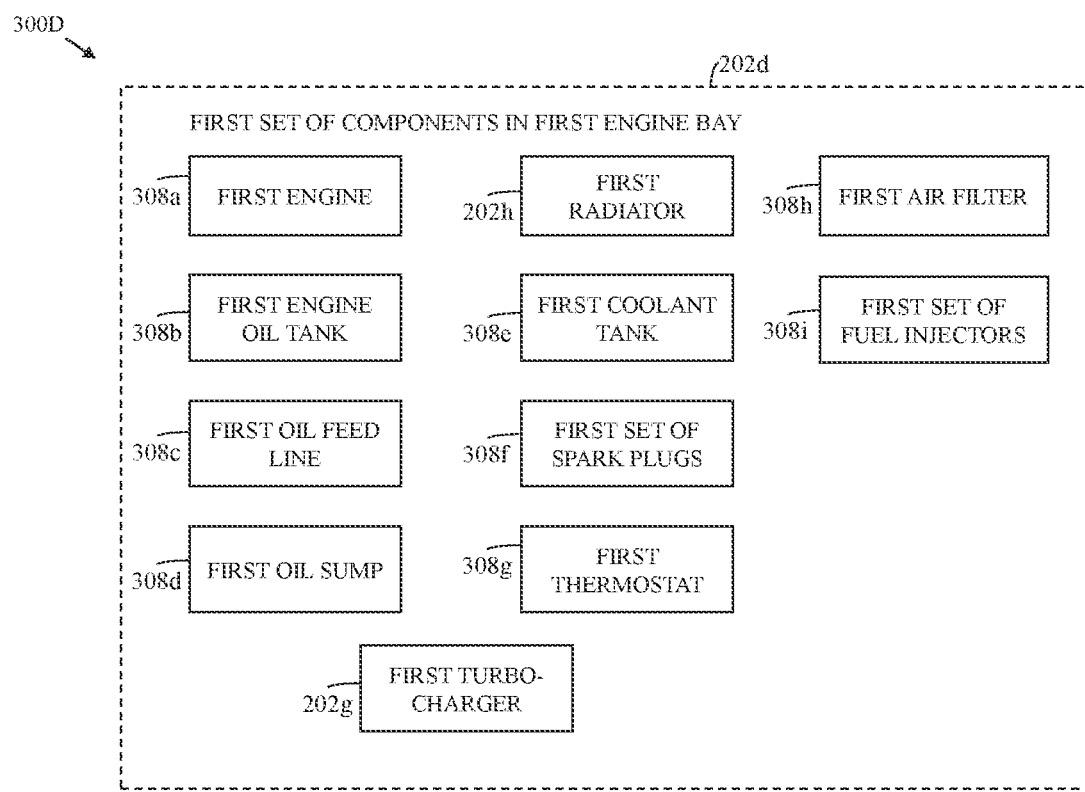

FIG. 3D is a block diagram 300D that illustrates the first set of components 202*d* in the first engine bay, in accordance with an exemplary embodiment of the disclosure. The first set of components 202*d* may include various components such as, but not limited to, the first engine (hereinafter, designated and referred to as "the first engine 308*a*"), a first engine oil tank 308*b*, a first oil feed line 308*c*, and a first oil sump 308*d*. The first set of components 202*d* may further include the first turbocharger 202*g*, the first radiator 202*h*, a first coolant tank 308*e*, a first set of spark plugs 308*f*, a first thermostat 308*g*, a first air filter 308*h*, and a first set of fuel injectors 308*i*. Working of the first set of components 202*d* will be well known to those of skill in the art. It will be apparent to those of skill in the art that the first set of components 202*d* shown are merely exemplary and one or more components may be removed from or added to the first set of components 202*d* without deviating from the scope of the disclosure.

FIG. 3E is a block diagram 300E that illustrates the first CNG system 202*e*, in accordance with an exemplary embodiment of the disclosure. The first CNG system 202*e* may include various internal components such as, but not limited to, a first CNG storage tank 310a, a first fuel rail 310b, a first set of high-pressure fuel filters 310c, and the first set of fuel injectors 308i. Working of the various internal components of the first CNG system 202e will be well known to those of skill in the art. It will be apparent to those of skill in the art that the various internal components of the first CNG system 202e shown are merely exemplary and one or more components may be removed from or added to the first CNG system 202e without deviating from the scope of the disclosure.

FIG. 3F is a block diagram 300F that illustrates the first fuel injection system 202f, in accordance with an exemplary embodiment of the disclosure. The first fuel injection system 202f may include various internal components such as, but not limited to, a first fuel pump 312a, a first fuel accumulator 312b, the first set of fuel injectors 308i, a first fuel filter 312c, a first fuel distributor 312d, a first inlet manifold 312e. Working of the various internal components of the first fuel injection system 202f will be well known to those of skill in the art. It will be apparent to those of skill in the art that the various internal components of the first fuel injection system 202f shown are merely exemplary and one or more components may be removed from or added to the first fuel injection system 202f without deviating from the scope of the disclosure.

Figure 3G:
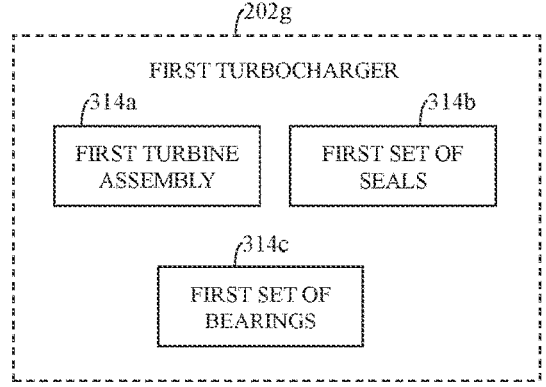

FIG. 3G is a block diagram 300G that illustrates the first turbocharger 202g, in accordance with an exemplary embodiment of the disclosure. The first turbocharger 202g may include various internal components such as, but not limited to, a first turbine assembly 314a, a first set of seals 314b, and a first set of bearings 314c. Working of the various internal components of the first turbocharger 202g will be well known to those of skill in the art. It will be apparent to those of skill in the art that the various internal components of the first turbocharger 202g shown are merely exemplary and one or more components may be removed from or added to the first turbocharger 202g without deviating from the scope of the disclosure.

Figure 3H:
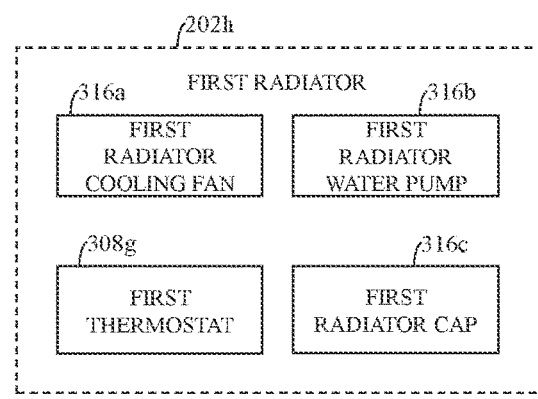

FIG. 3H is a block diagram 300H that illustrates the first radiator 202h, in accordance with an exemplary embodiment of the disclosure. The first radiator 202h may include various internal components such as, but not limited to, a first radiator cooling fan 316a, the first thermostat 308g, a first radiator water pump 316b, and a first radiator cap 316c. Working of the various internal components of the first radiator 202h will be well known to those of skill in the art. It will be apparent to those of skill in the art that the various internal components of the first radiator 202h shown are merely exemplary and one or more components may be removed from or added to the first radiator 202h without deviating from the scope of the disclosure.

FIG. 3I is a block diagram 300I that illustrates the first steering system 202i, in accordance with an exemplary embodiment of the disclosure. The first steering system 202i may include various internal components such as, but not limited to, a first steering rack cooling system 318a, a first rack and pinion 318b, a first steering pump 318c. Working of the various internal components of the first steering system 202i will be well known to those of skill in the art. It will be apparent to those of skill in the art that the various internal components of the first steering system 202i shown are merely exemplary and one or more components may be removed from or added to the first steering system 202i without deviating from the scope of the disclosure.

FIG. 3J is a block diagram 300J that illustrates the first suspension system 202j, in accordance with an exemplary embodiment of the disclosure. The first suspension system 202j may include various internal components such as, but not limited to, a first set of shock absorbers 320a, a first set of suspension springs 320b, and a first set of suspension mounts 320c. Working of the various internal components of the first suspension system 202j will be well known to those of skill in the art. It will be apparent to those of skill in the art that the various internal components of the first suspension system 202j shown are merely exemplary and one or more components may be removed from or added to the first suspension system 202j without deviating from the scope of the disclosure.

The first plurality of vehicular systems 112a may further include, components, such as an oxygen sensor circuit, an air intake temperature circuit, a fuel injector circuit, a camshaft position sensor, an ignition circuit, a catalytic converter, an exhaust pressure control valve, a throttle actuator, or the like. The first plurality of vehicular systems 112a may further include, other components that are not shown, such as a fuel filter, an oil filter, a set of radiator mountings, an alternator belt, a heater core, a steering wheel, or the like. Functions and locations of these components are known to those of skill in the art. However, these components have not been shown for the sake of brevity.

FIG. 4 is a block diagram that illustrates an exemplary scenario 400 for training the classifier for predictive maintenance of an AC system in a vehicle, in accordance with an exemplary embodiment of the disclosure. FIG. 4 includes the plurality of vehicles 102, the maintenance database 108, and the application server 110. The application server 110 is shown to include processing circuitry 402, a memory 404, a machine learning engine 406, and a transceiver 408. The processing circuitry 402, the memory 404, the machine learning engine 406, and the transceiver 408 may communicate by way of a communication bus 410. The machine learning engine 406 is shown to include the classifier ("hereinafter, designated and referred to as "the classifier 412"). FIG. 4 is explained in conjunction with FIGS. 1A and 3A.

The processing circuitry 402 may include suitable logic, circuitry, interfaces, and/or code, executable by the circuitry, that may be configured to perform one or more operations for collecting the first and second trip data, the first and second vehicle data, and the first and second operational data by way of the plurality of telematics devices 104 via the communication network 118 (as described in the foregoing description of FIG. 1A). The first and second trip data, the first and second vehicle data, and the first and second operational data may be collected over the first time-interval. The processing circuitry 402 may be further configured to collect, over the first time-interval, the first and second service data from the maintenance database 108. The processing circuitry 402 may be further configured to collect the first and second driver behavior data based on the first and second operational data and the first and second trip data. The processing circuitry 402 may be further configured to collect the first and second external factor data (i.e., the first and second road condition data and first and second weather data) for the plurality of vehicles 102, based on the first and second trip data.

The first and second external factor data may correspond to the first time-interval. For example, if the first trip data indicates that the first vehicle 102a has been operating in a first city (not shown) for a duration of a week, the first external factor data may include temperature, humidity, pressure, and pollution logs for each day of the week for the first city. The processing circuitry 402 may be further configured to combine the first and second vehicle datasets into the first dataset and store the first dataset (hereinafter, referred to as the "first dataset 414") in the memory 404. In other words, the processing circuitry 402 collects the first dataset 414 over the first time-interval. The processing circuitry 402 may be further configured to receive ride requests from passengers and allocate the plurality of vehicles 102 to the passengers based received on the received ride requests.

The processing circuitry 402 may be implemented by one or more processors, such as, but are not limited to, an application-specific integrated circuit (ASIC) processor, a reduced instruction set computing (RISC) processor, a complex instruction set computing (CISC) processor, and a field-programmable gate array (FPGA) processor. The processing circuitry 402 may also correspond to a central processing unit (CPU), a graphics processing unit (GPU), a neural processing unit (NPU), a digital signal processor (DSP), or the like. It will be apparent to a person of ordinary skill in the art that the processing circuitry 402 may be compatible with multiple operating systems.

The memory 404 may include suitable logic, circuitry, interfaces, and/or code, executable by the circuitry, that may be configured to store one or more instructions that are executed by the processing circuitry 402, the machine learning engine 406, the classifier 412, and the transceiver 408 to perform their operations. In an exemplary embodiment, the memory 404 may be configured to store the first dataset 414. In some embodiments, the memory 404 may be further configured to store ride requests received from the passengers and the allocation information associated with the allocation of the plurality of vehicles 102 to the passengers. Examples of the memory 404 may include, but are not limited to, a random-access memory (RAM), a read-only memory (ROM), a programmable ROM (PROM), and an erasable PROM (EPROM).

The machine learning engine 406 includes suitable logic, circuitry, interfaces, and/or code, executable by the circuitry, that may be configured to perform one or more operations associated with the determination of a health status of an AC system in a vehicle. The machine learning engine 406 may generate and train the classifier 412. Examples of the classifier 412 may include, but are not limited to, a neural network (e.g., long-short term memory or LSTM), a linear regression model, a logistic regression model, a decision tree, a support vector machine, a naïve Bayes model, a K-nearest neighbors model, a K-means model, a random forest model, or the like. Examples of the classifier 412 may further include, but are not limited to, a gradient boosting machine model, an XGBoost model, a light gradient boosting model, a cat boost model or the like. In one embodiment, the classifier 412 may be an ensemble model that is a combination of two or more aforementioned models.

The transceiver 408 may include suitable logic, circuitry, interfaces, and/or code, executable by the circuitry, that may be configured to transmit (or receive) data to (or from) various servers or devices, such as the plurality of telematics devices 104 or the maintenance database 108 via the communication network 118. In another embodiment, when the first dataset 414 is collected by the database server 122, the transceiver 408 may be configured to receive the first dataset 414 from the database server 122 via the communication network 118. Examples of the transceiver 408 may include, but are not limited to, an antenna, a radio frequency transceiver, a wireless transceiver, and a Bluetooth transceiver. The transceiver 408 may be configured to communicate with the plurality of telematics devices 104 and the maintenance database 108, using various wired and wireless communication protocols, such as TCP/IP, UDP, LTE communication protocols, or any combination thereof.

As described in the foregoing description of FIG. 1A, prior to training the classifier 412, the machine learning engine 406 may employ the feature or variable selection techniques to process the first dataset 414 and select a first set of factors 416. Each factor of the first set of factors 416 may have a causal relationship (e.g., direct causal relationship or indirect causal relationship) or a high degree of correlation with a health status of an AC system in a vehicle (e.g., the first and second vehicles 102a and 102b). In a non-limiting example, the first set of factors 416 may include, but are not limited to, a health of an evaporator, a health of a condenser, a health of an AC clutch, a health of an AC blower, a level of AC gas in the condenser, and a health of a radiator.

The first set of factors 416 may further include an ambient temperature, a level of humidity, a level of atmospheric pressure, an air quality index or AQI (i.e., a level of air pollution), a vehicle model, a vehicle age, and a distance travelled (mileage), or the like. Therefore, the first set of factors 416 is shown to include a health of internal components of an AC system, and one or more external factors such as temperature, humidity, atmospheric pressure and air pollution (AQI). Internal components of an AC system (e.g., the first AC system 202a) have been described in FIG. 3A. The first set of factors 416 may further include a health of one or more other components, of the first plurality of vehicular systems 112a or the second plurality of vehicular systems 112b, whose functioning is closely correlated with functioning of an AC system. It will be apparent to those of skill in the art that factors included in the first set of factors 416 are merely exemplary and are not to be construed as limitations to the scope of the disclosure. In an actual implementation, the first set of factors 416 may include any number of factors that affect functioning and operation of an AC system without deviating from the scope of the disclosure. In some embodiments, the machine learning engine 406 may filter the first dataset 414 based on the first set of factors 416 to obtain a filtered first dataset 414. The filtered first dataset 414 may include only data that corresponds to the first set of factors 416. In other words, any data that does not correspond to the first set of factors 416 is discarded. For example, the first and second driver behavior data may be filtered out of the first dataset 414.

In an exemplary embodiment, the machine learning engine 406 may determine, using the feature engineering techniques, a first plurality of features 418 associated with the selected first set of factors 416. The machine learning engine 406 may determine the first plurality of features 418 by processing and analyzing the filtered first dataset 414 based on the selected first set of factors 416. The first plurality of features 418 may include one or more features associated with each factor of the first set of factors 416. Each feature of the first plurality of features 418 may be selected such that a corresponding feature captures a change, a trend, or a pattern in a value of a corresponding factor (of the first set of factors 416) across various time periods (e.g., days, weeks, months, years, the like) over the first time-interval. For example, a first feature of the first plurality of features 418 may correspond to a moving average of distances travelled by a vehicle between consecutive AC system service sessions.

In an exemplary scenario, a distance travelled by the first vehicle 102a per week over two months may include distances $x_1$, $x_2$, $x_3$, $x_4$, $x_5$, $x_6$, $x_7$, and $x_8$. Thus, a moving average of distances travelled for a first week is determined based on moving average ($x_1$), moving average of distances travelled for a second week is determined based on moving average ($x_1$, $x_2$), and moving average of distances travelled for a third week is determined based on moving average ($x_1$, $x_2$, $x_3$).

A second feature of the first plurality of features 418 may correspond to an average time duration between consecutive AC system service sessions. A third feature of the first plurality of features 418 may correspond to a moving average of temperatures of one or more geographical locations associated with a vehicle prior to an AC system service session. A fourth feature of the first plurality of features 418 may correspond to an average humidity of one or more geographical locations associated a vehicle. A fifth feature of the first plurality of features 418 may correspond to an average atmospheric pressure of one or more geographical locations associated with a vehicle. A sixth feature of the first plurality of features 418 may correspond to an average AQI of one or more geographical locations associated with a vehicle.

A seventh feature of the first plurality of features 418 may correspond to an average distance travelled by a vehicle operating in a specific geographical location (e.g., a vehicle operating in New York) between consecutive AC system service sessions. An eighth feature of the first plurality of features 418 may correspond to a minimum distance travelled by a vehicle between consecutive AC system service sessions. A ninth feature of the first plurality of features 418 may correspond to a maximum distance travelled by a vehicle between consecutive AC system service sessions. A tenth feature of the first plurality of features 418 may correspond to an average level of AC gas in a condenser a vehicle prior to an AC system service session. In one embodiment, a level of AC gas in a condenser may be indicated by sensor data received from a telematics device of a corresponding vehicle. For example, the sensor data or the DTCs corresponding to the first ECU of the first vehicle 102a may be indicative of change in a level of AC gas in the first vehicle 102a over the first time-interval. In another embodiment, a level of AC gas in a condenser may be indicated by corresponding service data.

An eleventh feature of the first plurality of features 418 may correspond to a cumulative sum of a number of instances of generation of one or more relevant DTCs in a vehicle prior to an AC system service session. For example, a first DTC indicative of a low level of AC gas or refrigerant may be generated $x_1$ times (e.g., 5 times) over a course of seven days, leading to a cumulative sum of "$x_1$". A twelfth feature of the first plurality of features 418 may correspond to rolling mean of a number of instances of generation one or more relevant DTCs in a vehicle prior to an AC system service session. In an example, a number of instances of generation of a DTC per day over a week (e.g., a week prior to an AC system service session) may include values $x_1$, $x_2$, $x_3$, $x_4$, $x_5$, $x_6$, and $x_7$. Thus, rolling mean for the first day of the week is based on a number of instances of generation of the DTC on the first day ($x_1$). Rolling mean for the second day of the week is determined based on a number of instances of generation of the DTC on each of the first and second days ($x_1$, $x_2$). Rolling mean for the third day of the week is determined based on a number of instances of generation of the DTC on each of the first through third days ($x_1$, $x_2$, $x_3$). Similarly, rolling mean for a number of instances of generation the DTC for the fourth through seventh days are obtained based on a number of instances of generation of the DTC on each of the first through seventh days. For example, the first DTC indicative of a low level of AC gas may be generated five times over a course of seven days, leading to a rolling mean of "0.714" (i.e., "5/7=0.714"). A thirteenth feature of the first plurality of features 418 may correspond to a standard deviation of sensor data indicative of a level of AC gas, in a vehicle, from a threshold level. The thirteenth feature may further correspond to a time period (e.g., a week) prior to an AC system service session. Methods of determining cumulative sums, moving averages, rolling means, and standard deviations are well known to those of skill in the art.

A fourteenth feature of the first plurality of features 418 may correspond to a level of wear and tear on an AC compressor (i.e., a health of the AC compressor) of a vehicle prior to an AC system service session. In a non-limiting example, a health (i.e., a level of wear and tear) of mechanical or electromechanical components such as the compressor (e.g., the first compressor 302a), an evaporator (e.g., the first evaporator 302e), an AC blower (e.g., the first AC blower 302b), an AC clutch (e.g., the first AC clutch 302g) may be quantified by way of service data of a corresponding vehicle (e.g., the first and second service data of the first vehicle 102a). In another non-limiting example, the health of the compressor, the evaporator, the AC clutch, the AC blower, or the like, may be quantified by way of sensor data or one or more DTCs generated by a corresponding ECU.

The first plurality of features 418 listed above should not be construed as a limitation to the present disclosure. The first plurality of features 418 may include any type of feature and any number of features without deviating from the scope of the disclosure. Each factor of the first set of factors 416 may be associated with one or more features.

In one embodiment, each feature of the first plurality of features 418 may be assigned a weight corresponding to a strength of a relationship of correlation or causation between the feature and a health status of an AC system. For example, the third feature may be assigned a higher weight than the fourth feature, based on determination by the machine learning engine 406 that the average ambient temperature over the first time-interval is a better predictor of a health status of an AC system than the average humidity over the first time-interval. It will be apparent to a person of ordinary skill in the art that the abovementioned first plurality of features 418 are for exemplary purpose and should not be construed as limitations to the scope of the disclosure. Each factor of the first set of factors 416 may be associated with one or more features of the first plurality of features 418.

On determining the first plurality of features 418, the machine learning engine 406 processes the filtered first dataset 414 to determine a first plurality of feature values 420. For determining the first plurality of feature values 420, the machine learning engine 406 may determine one or more feature values for each feature of the first plurality of features 418. For example, the machine learning engine 406 may determine, for each vehicle of the plurality of vehicles 102, a feature value for each of the first plurality of features 418. For example, for the first feature (moving average of distances travelled between consecutive AC system service sessions), the machine learning engine 406 may determine a feature value for each of the plurality of vehicles 102, based on the first and second service data and the first and second trip data included in the first dataset 414. In a non-limiting example, the machine learning engine 406 may determine that a moving average of distances travelled between consecutive AC system service sessions for the first vehicle 102a is approximately 7,500 Km. Similarly, the machine learning engine 406 may determine that a moving average of distances travelled between consecutive AC system service sessions for the first vehicle 102a is approximately 8,300 Km. Similarly, the machine learning engine 406 may determine feature values for remaining first plurality of features 418 using the first dataset 414 or the filtered first dataset 414. On determining the first plurality of feature values 420, the machine learning engine 406 may initiate a training phase of the classifier 412.

The machine learning engine 406 may train the classifier 412 for determining a health status of an AC system. The training of the classifier 412 may be based on the first plurality of feature values 420 and the weight assigned to each feature of the first plurality of features 418. In other words, the first plurality of feature values 420 and the weight assigned to each feature of the first plurality of features 418 constitute a first training dataset for training the classifier 412. Methods of training the classifier 412 on the first training dataset to determine a health status of an AC system are well known to those of skill in the art. In the current embodiment, for the sake of brevity, the first training dataset has been shown to correspond to a sample size of two (i.e., the first and second vehicles 102a and 102b). However, in an actual implementation, the first training dataset may correspond to a large sample size (e.g., a sample size of a thousand vehicles, ten thousand vehicles, or a million vehicles).

In an exemplary embodiment, the machine learning engine 406 may further train the classifier 412, using the first training dataset, to determine an RUL of an AC system of a vehicle. An RUL of any vehicular system may be expressed in terms of distance (i.e., Km) and is indicative of a remaining distance that may be traversed by the vehicle before a repair or replacement of one or internal components of the AC system is required. In other words, the RUL of an AC system is indicative of a need of predictive maintenance of the AC system. In a non-limiting example, an RUL may be classified as a "good RUL" if the RUL is greater than a first threshold RUL (e.g., 5,000 Km). An RUL may be classified as a "bad RUL" if the RUL is less than or equal to the first threshold RUL (e.g., 5,000 Km), but greater than a second threshold RUL (e.g., 1,000 Km). An RUL may be classified as a "very bad RUL" if the RUL is less than or equal to the second threshold RUL (e.g., 1,000 Km). Classification of an RUL as a "good RUL", a "bad RUL", or a "very bad RUL" may be different for different vehicular systems.

Figure 5:
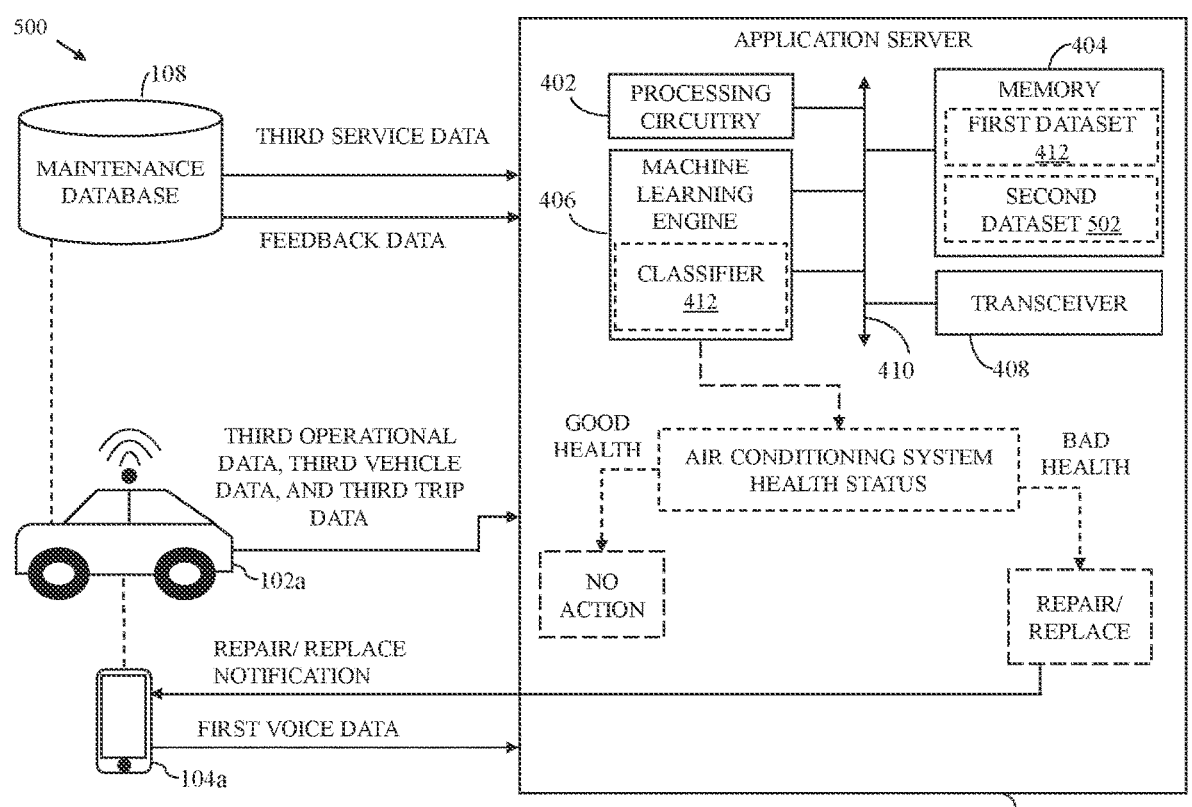
FIG. 5 is a block diagram that illustrates determination of a health status of an air-conditioning system in the first vehicle, in accordance with an exemplary embodiment of the disclosure.

FIG. 5 is a block diagram 500 that illustrates determination of a health status of the first AC system 202a, in accordance with an exemplary embodiment of the disclosure. FIG. 5 is explained in conjunction with FIGS. 1A and 4. In one embodiment, the processing circuitry 402 collects, by way of the first telematics device 104a, over the second time-interval, the third operational data, the third trip data, and the third vehicle data. The processing circuitry 402 collects the third service data from the maintenance database 108. As described in the foregoing description of FIG. 1A, the processing circuitry 402 determines the third driver behavior data and the third external factor data. The processing circuitry 402 is configured to store the second dataset (i.e., the third operational data, the third trip data, the third vehicle data, the third service data, the third driver behavior data, and the third external factor data) in the memory 404. Hereinafter, the second dataset is designated and referred to as "the second dataset 502".

The machine learning engine 406 provides the second dataset 502 as input to the trained classifier 412. The classifier 412 may determine, from the second dataset 502, data that corresponds to the first plurality of features 418. For example, from the second dataset 502, the classifier 412 may determine a cumulative sum of distances travelled by the first vehicle 102a till a current date (i.e., an end of the second time-interval), a total number of AC system service sessions undergone by the first vehicle 102a, or the like. The classifier 412 may further determine, from the second dataset 502, a health of each internal component of the first AC system 202a at a last AC system service session, one or more DTC codes pertaining to the first AC system 202a generated by the first ECU during the second time-interval, weather data over various time periods in the second interval, or the like.

Based on the data determined from the second dataset 502, the classifier 412 may determine a health status of the first AC system 202a. In one embodiment, the classifier 412 may determine whether health status of the first AC system 202a is good or bad. In other words, the classifier 412 determines whether the first AC system 202a is functioning properly or not.

In a non-limiting example, the classifier 412 determines a probability (e.g., "70%") that the first AC system 202a is currently faulty (i.e., health status is bad). For example, the classifier 412 may determine that there is a "70%" probability that the health status of the first AC system 202a is bad. If the probability (e.g. "70%") associated with the determination is greater than or equal to a preset probability threshold (e.g., "40%"), the health status of the first AC system 202a is classified as bad. If the probability (e.g. "70%") associated with the determination is less than the preset probability threshold (e.g., "40%"), the health status of the first AC system 202a is classified as good.

The machine learning engine 406 may employ one or more model interpretability techniques, to identify a set of factors that have influenced the classifier 412 in determining faulty functioning of the first AC system 202a (i.e., "70%" probability of the health status of the first AC system 202a being bad). The Model interpretability techniques include various statistical or probabilistic techniques, such as Eli5, local interpretable model-agnostic explanations (LIME), Shapley Additive explanation (SHAP), or the like. In a non-limiting example, the machine learning engine 406 may identify that a level of AC gas (i.e., a first factor of the set of factors) in the first compressor 302a is currently below an acceptable threshold. In such a scenario, the machine learning engine 406 may determine that an immediate or replacement of one or more components of the first AC system 202a (i.e., a refill of the AC gas or refrigerant) is in order.

Based on the determined health status of the first AC system 202a, the processing circuitry 402 may communicate, by way of the transceiver 408, a notification to the first telematics device 104a. The notification may be indicative of the determined health status of the first AC system 202a. Further, the notification may include a message requesting the first driver to assess a functioning of the first AC system 202a. In other words, the processing circuitry 402 may request the first driver to assess whether the first AC system 202a displays an onset of one or more symptoms (e.g., reduced cooling effect) of poor health or faulty functioning of the first AC system 202a.

In one embodiment, first voice data (i.e., feedback) indicative an assessment of the functioning of the first AC system 202a may be communicated by the first driver to the application server 110 by way of the first telematics device 104a. For example, the first voice data may include a speech message recorded by the first driver, indicating a reduced cooling effect in the first vehicle 102a. In another embodiment, an assessment of the functioning of the first AC system 202a may be communicated to the application server 110 when the first driver selects an option from one or more options (e.g., "Good functioning", "Below par functioning", "Bad functioning", or "Very bad functioning") presented on a user interface (UI) rendered on a display screen of the first telematics device 104a. The first telematics device 104a may communicate the selected option to the application server 110. For the sake of brevity, it is assumed that the first driver communicates the first voice data. The processing circuitry 402 may include or work in conjunction with a natural language processing (NLP) engine (not shown) to decipher the speech message included in the first voice data. The processing circuitry 402 may communicate the deciphered speech message to the machine learning engine 406. If the deciphered speech message indicates that the functioning of the first AC system 202a is "below par", "bad", or "very bad", the processing circuitry 402 may communicate a message to the first telematics device 104a, requesting the first driver to visit the maintenance center 106 for servicing the first AC system 202a.

Based on the message, the first vehicle 102a may be taken by the first driver to the maintenance center 106 for servicing. Following a servicing of the first AC system 202a, the maintenance system 120 in the maintenance center 106 may communicate corresponding one or more service logs to the maintenance database 108 for storing therein. The service logs may indicate repair or replacement of one or more of the internal components of the first AC system 202a. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first AC system 202a) of the classifier 412 and tag the output of the classifier 412 as a "true negative" (i.e., bad health status determined correctly) or a "false negative" (i.e., bad health status determined wrongly) as per a result of the validation. If the speech message indicates that the functioning of the first AC system 202a is "below par", "bad", or "very bad" and the corresponding service data indicates the repair and/or the replacement of one or more of the internal components of the first AC system 202a, the machine learning engine 406 tags the output as a true negative.

If the deciphered speech message indicates that the functioning of the first AC system 202a is "good", the processing circuitry 402 may or may not communicate, to the first telematics device 104a, a message requesting the first driver to visit the maintenance center 106 for servicing the first AC system 202a. In some scenarios, no such message is communicated to the first telematics device 104a by the processing circuitry 402. In such scenarios, the machine learning engine 406 may tag the output as a false negative (i.e., bad health status determined wrongly).

However, in some other scenarios, the processing circuitry 402 may communicate the message to the first telematics device 104a. Based on the message, the first vehicle 102a may be taken by the first driver to the maintenance center 106 for servicing. Following the servicing of the first AC system 202a, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first AC system 202a prior to the servicing, the machine learning engine 406 may tag the output as a true negative. If the corresponding service data indicates a good or healthy functioning of the first AC system 202a prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. In one example, the machine learning engine 406 may modify or update the weights assigned to the first plurality of features 418 for improving the accuracy of the classifier 412.

Further, the machine learning engine 406 may analyze the corresponding service data to determine whether the identified set of factors was correct. On determining whether the set of factors was correctly identified or not, the machine learning engine 406 may re-train the classifier 412 (i.e., update the weights of the first plurality of features 418) based on the corresponding service data to improve an accuracy of the classifier 412. In a non-limiting example, the identified set of factors includes the low level of AC gas as the sole factor for the determination of the failure of the first AC system 202a. In such a scenario, the machine learning engine 406 may determine whether the corresponding service data indicates a low level of AC gas prior to servicing or whether the AC gas was refilled as part of the servicing.

Further, the machine learning engine 406 may determine, based on the corresponding service data, whether any other internal component of the first AC system 202a was repaired or replaced. Accordingly, the machine learning engine 406 may re-train the classifier 412.

In another example, the classifier 412 may determine a "25%" probability of the health status of the first AC system 202a being bad. Since the determined probability (i.e., "25%") is less than the preset probability threshold (e.g., "40%"), the health status of the first AC system 202a is classified as good. In other words, the classifier 412 determines that there is a "75%" probability that the health status of the first AC system 202a is good. In a non-limiting example, no action may be taken by the application server 110 based on the determination. However, in another non-limiting example, the processing circuitry 402 may communicate a notification to the first telematics device 104a, requesting the first driver for first voice data (i.e., feedback) indicative of an assessment of a functioning of the first AC system 202a. The first voice data (i.e., feedback), indicative of the assessment of the current functioning of the first AC system 202a, may be communicated by the first driver to the application server 110. The first voice data may not be indicative of any symptoms of poor health or faulty functioning of the first AC system 202a. Based on the first voice data, an output (i.e., the determined health status of the first AC system 202a) of the classifier 412 may be tagged as a "true positive". If the first voice data is indicative of one or more symptoms of poor health or faulty functioning of the first AC system 202a, the output of the classifier 412 may be tagged as a "false positive". Further, if the first voice data is indicative of one or more symptoms of faulty functioning of the first AC system 202a, the processing circuitry 402 may communicate a message to the first telematics device 104a. The message may be a request to the first driver to take the first vehicle 102a to the maintenance center 106 for servicing the first AC system 202a. Based on the tagging of the output (i.e., a result of validation of the output) as a true positive or a false positive, the machine learning engine 406 may re-train the classifier 412, using the reinforcement learning techniques for improving the accuracy of the classifier 412.

In a scenario where the determined health status of the first AC system 202a is good, the classifier 412 may further determine a first RUL of the first AC system 202a. For example, the classifier 412 may determine that there is a "70%" chance of the first AC system 202a turning faulty after 2,500 Km. In other words, there is a "70%" chance of the first AC system 202a experiencing bad health or reduced efficacy (i.e., requiring repair or replacement) after 2,500 Km. Based on the determined first RUL, the classifier 412 may classify the determined first RUL as a bad RUL.

The machine learning engine 406 may employ the one or more model interpretability techniques, to identify a set of factors that have influenced the classifier 412 in determining the first RUL. Based on the determined first RUL, the processing circuitry 402 may schedule an AC system service session for the first AC system 202a to prevent the health status (i.e., good health status) of the first AC system 202a from deteriorating. In other words, the processing circuitry 402 may schedule a predictive service or maintenance session to deal with the set of factors identified for the determined first RUL. The processing circuitry 402 may communicate, to the first telematics device 104a, a notification indicative of the determined first RUL and the scheduled AC system service session. Based on the notification, the first vehicle 102a may be taken by the first driver to the maintenance center 106 at a scheduled time for the scheduled AC system service session.

Following a servicing of the first AC system 202a based on the scheduled AC system service session, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining RUL of an AC system.

It will be apparent to those of skill in the art that a health status or an RUL of an AC system in any vehicle (e.g., the second vehicle 102b or any other vehicle) may be determined in a similar manner.

Figure 6:
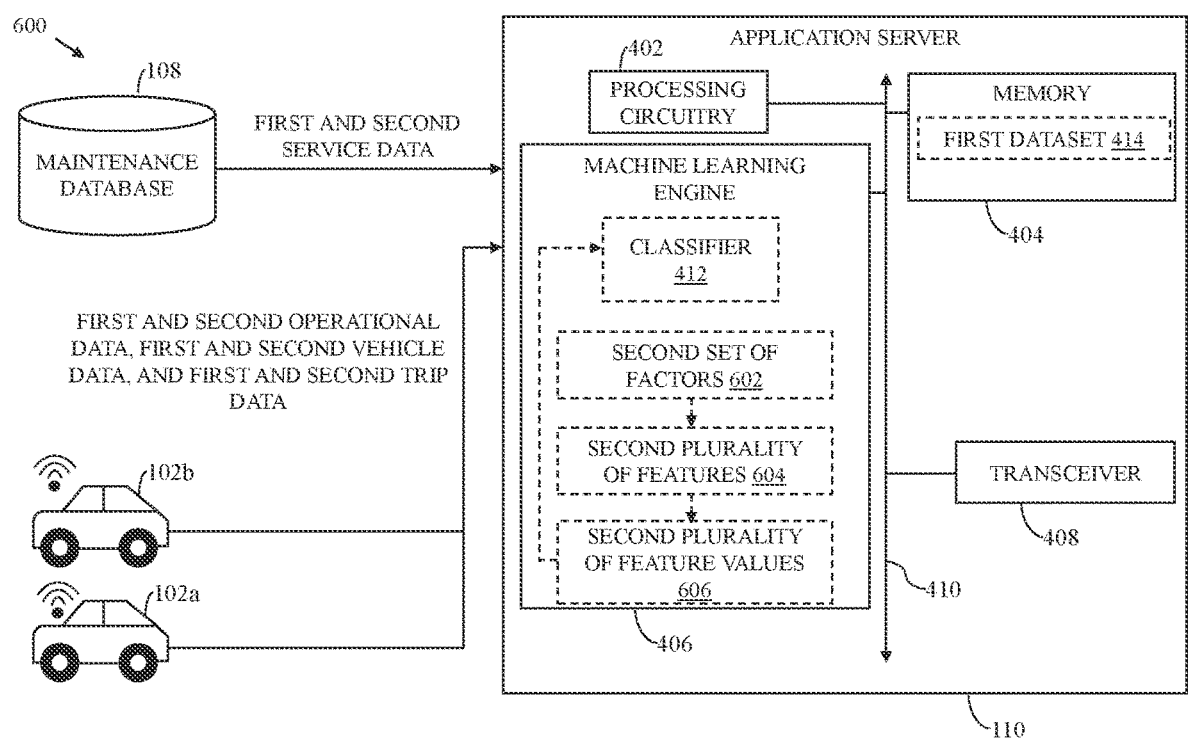
FIG. 6 is a block diagram that illustrates an exemplary scenario for training a classifier for predictive maintenance of a clutch in a vehicle, in accordance with an exemplary embodiment of the disclosure.

FIG. 6 is a block diagram 600 that illustrates an exemplary scenario for training the classifier 412 for predictive maintenance of a clutch in a vehicle, in accordance with an exemplary embodiment of the disclosure. FIG. 6 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 6 is explained in conjunction with FIGS. 1A and 3B.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select a second set of factors 602. Each factor of the second set of factors 602 may have a causal relationship (e.g., direct causal relationship or indirect causal relationship) or a high degree of correlation with a health status of a clutch in a vehicle (e.g., the first and second vehicles 102a and 102b).

In a non-limiting example, the second set of factors 602 may include, but are not limited to, a health of a pressure plate, a health of a clutch disc, a health of a set of pilot bushings, or a health of a set of release bearings. The second set of factors 602 may further include, a vehicle age, a vehicle model, a distance travelled (mileage), a driver behavior or a driving style of a driver, a service or maintenance history, or the like. It will be apparent to those of skill in the art that factors included in the second set of factors 602 are merely exemplary and are not to be construed as limitations to the scope of the disclosure. In an actual implementation, the second set of factors 602 may include any number of factors and any type of factor without deviating from the scope of the disclosure. In some embodiments, the machine learning engine 406 may filter the first dataset 414 based on the second set of factors 602 to obtain a filtered first dataset 414. The filtered first dataset 414 may include only data that corresponds to the second set of factors 602.

In an exemplary embodiment, the machine learning engine 406 may determine, using the feature engineering techniques, a second plurality of features 604 associated with the selected second set of factors 602. The machine learning engine 406 may determine the second plurality of features 604 by processing and analyzing the filtered first dataset 414 based on the selected second set of factors 602. The second plurality of features 604 may include one or more features associated with each factor of the second set of factors 602. Each feature of the second plurality of features 604 may be selected such that the feature captures a change, a trend, or a pattern in a value of a corresponding factor (of the second set of factors 602) across various time periods (e.g., days, weeks, months, years, or the like) over the first time-interval.

For example, a first feature of the second plurality of features 604 may correspond to a cumulative or total distance travelled by a vehicle prior to a clutch service session. A second feature of the second plurality of features 604 may correspond to a cumulative or total age of a vehicle prior to a clutch service session. A third feature of the second plurality of features 604 may correspond to a moving average of distances travelled by a vehicle between consecutive clutch service sessions. A fourth feature of the second plurality of features 604 may correspond to an average engine RPM of a vehicle prior to a clutch service session. A fifth feature of the second plurality of features 604 may correspond to an average maximum RPM of a vehicle prior to a clutch service session. A sixth feature of the second plurality of features 604 may correspond to an average speed of a vehicle prior to a clutch service session. A seventh feature of the second plurality of features 604 may correspond to an average level of clutch riding by a driver associated with a vehicle before a clutch service session. An eighth feature of the second plurality of features 604 may correspond to an average level of traffic congestion encountered by a vehicle, prior to a clutch service session.

A ninth feature of the second plurality of features 604 may correspond to an average level of hardness in a clutch pedal of a vehicle prior to a clutch service session. In a non-limiting example, a hardness of a clutch pedal (i.e., force or pressure required to depress the clutch pedal) in a vehicle may be indicated by sensor data received from a telematics device of the vehicle. For example, the sensor data or the DTCs corresponding to the first ECU of the first vehicle 102a may be indicative of change in a level of hardness of the first clutch pedal 304d in the first vehicle 102a over the first time-interval.

A tenth feature of the second plurality of features 604 may correspond to a cumulative sum of a number of instances of generation of one or more relevant DTCs in a vehicle prior to a clutch service session. For example, a first DTC indicative of a high level of clutch pedal hardness may be generated 45 times over a course of 45 days, leading to a cumulative sum of "45". A thirteenth feature of the second plurality of features 604 may correspond to a moving average of a number of instances of generation of one or more relevant DTCs in a vehicle prior to a clutch service session.

An eleventh feature of the second plurality of features 604 may correspond to a level of wear and tear on a pressure plate (i.e., a health of a pressure plate) of a vehicle prior to a clutch service session. In a non-limiting example, a health (i.e., a level of wear and tear) of mechanical or electromechanical components such as the pressure plate (e.g., the first pressure plate 304a), a clutch disc (e.g., the first clutch disc 304b), a set of pilot bushings (e.g., the first set of pilot bushings 304c), a set of release bearings (e.g., the first set of release bearings 304e) may be quantified by way of service data of a corresponding vehicle (e.g., the first and second service data of the first vehicle 102a). In another non-limiting example, the health of the pressure plate, the clutch disc, the set of pilot bushings, the set of release bearings or the like, may be quantified by way of sensor data or one or more DTCs generated by a corresponding ECU.

The second plurality of features 604 listed above should not be construed as a limitation to the present disclosure. Each factor of the second set of factors 602 may be associated with one or more features. The second plurality of features 604 may include any type of feature and any number of features without deviating from the scope of the disclosure. In one embodiment, each feature of the second plurality of features 604 may be assigned a weight corresponding to a strength of a relationship of correlation or causation between a corresponding feature and a health status of a clutch.

On determining the second plurality of features 604, the machine learning engine 406 processes the filtered first dataset 414 to determine a second plurality of feature values 606. For determining the second plurality of feature values 606, the machine learning engine 406 may determine one or more feature values for each feature of the second plurality of features 604. For example, for the first feature (cumulative or total distance travelled by a vehicle prior to a clutch service session), the machine learning engine 406 may determine a feature value for each of the plurality of vehicles 102. The machine learning engine 406 may determine that first and second total distances travelled by the first and second vehicles 102a and 102b prior to a corresponding clutch service session is approximately 45,000 Km and 33,000 Km, respectively. The machine learning engine 406 may determine the second plurality of feature values 606 for the second plurality of features 604. On determining the second plurality of feature values 606, the machine learning engine 406 may initiate a training phase of the classifier 412.

The machine learning engine 406 may train the classifier 412 for determining a health status of a clutch. The training of the classifier 412 may be based on the second plurality of feature values 606 and the weight assigned to each feature of the second plurality of features 604. In other words, the second plurality of feature values 606 and the weight assigned to each feature of the second plurality of features 604 constitute a second training dataset for training the classifier 412. Methods of training the classifier 412 on the second training dataset to determine a health status of a clutch are well known to those of skill in the art. In the current embodiment, for the sake of brevity, the second training dataset has been shown to correspond to a sample size of two (i.e., the first and second vehicles 102a and 102b). However, in an actual implementation, the second training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the second training dataset, to determine an RUL of a clutch in a vehicle and classify the determined RUL as one of a good RUL, a bad RUL, a very bad RUL, or the like.

Figure 7:
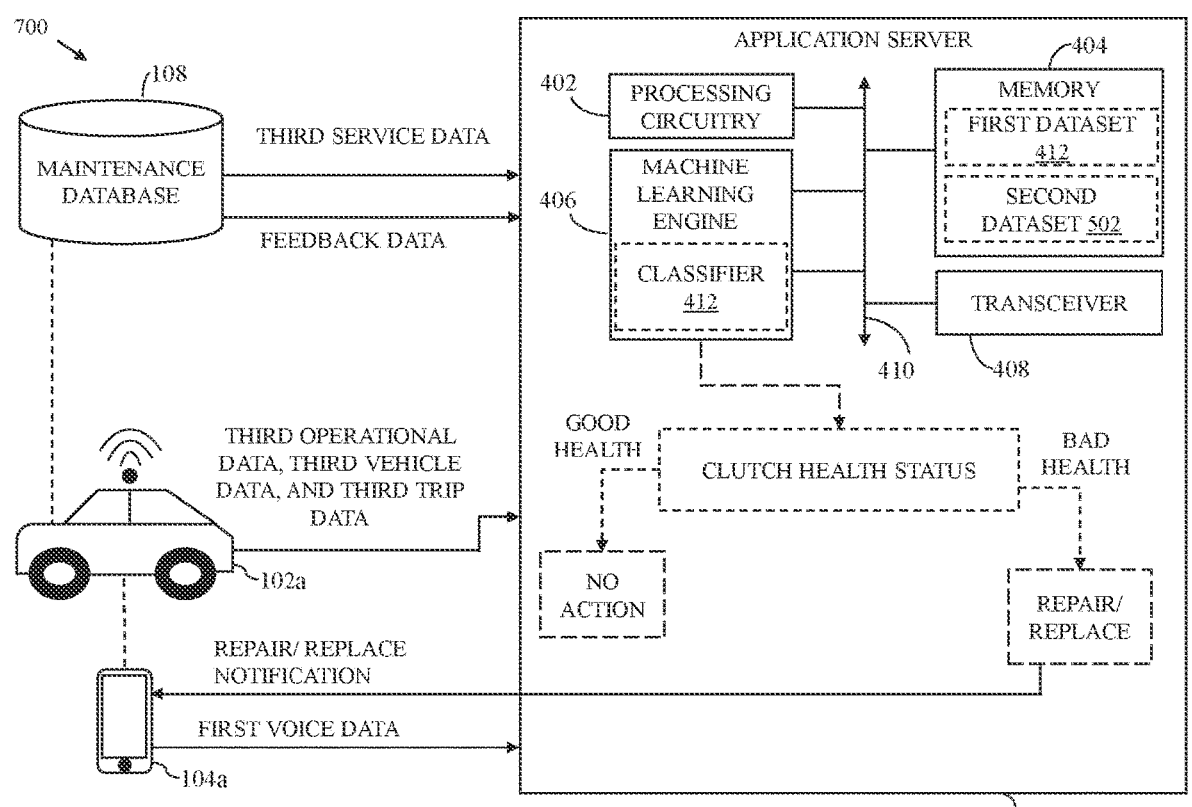
FIG. 7 is a block diagram that illustrates determination of a health status of a clutch in the first vehicle, in accordance with an exemplary embodiment of the disclosure.

FIG. 7 is a block diagram 700 that illustrates determination of a health status of the first clutch 202b, in accordance with an exemplary embodiment of the disclosure. FIG. 7 is explained in conjunction with FIGS. 1A and 6. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104a, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the second plurality of features 604. For example, from the second dataset 502, the classifier 412 may determine a total travelled by the first vehicle 102a till a current date (i.e., an end of the second time-interval), a total number of clutch service sessions undergone by the first vehicle 102a, or the like. The classifier 412 may further determine, from the second dataset 502, a health of each internal component of the first clutch 202b at a last clutch service session, one or more DTC codes pertaining to the first clutch 202b generated by the first ECU during the second time-interval, weather data over various time periods in the second interval, or the like.

Based on the data determined from the second dataset 502, the classifier 412 may determine a health status of the first clutch 202b. In other words, the classifier 412 determines whether the first clutch 202b is functioning properly or not.

In a non-limiting example, the classifier 412 determines a probability (e.g., "85%") that the first clutch 202b is currently faulty (i.e., health status is bad). For example, the classifier 412 may determine that there is an "85%" probability that the health status of the first clutch 202b is bad.

If the probability (e.g. "85%") associated with the determination is greater than or equal to a preset probability threshold (e.g., "40%"), the health status of the first clutch 202b is classified as bad. If the probability (e.g. "80%") associated with the determination is less than a preset probability threshold (e.g., "40%"), the health status of the first clutch 202b is classified as good.

The machine learning engine 406 may employ the one or more model interpretability techniques, to identify a set of factors that have influenced the classifier 412 in determining faulty functioning of the first clutch 202b (i.e., "85%" probability of the health status of the first clutch 202b being bad). Based on the determined health status of the first clutch 202b, the processing circuitry 402 may communicate, by way of the transceiver 408, a notification to the first telematics device 104a. The notification may be indicative of the determined health status of the first clutch 202b. Further, the notification may include a message requesting the first driver to assess a functioning of the first clutch 202b (as described in the foregoing description of FIG. 5). In other words, the processing circuitry 402 may request the first driver to assess whether the first clutch 202b displays an onset of one or more symptoms (e.g., a hard clutch pedal) of poor health or faulty functioning of the first clutch 202b.

In one embodiment, first voice data (i.e., feedback) indicative of an assessment of the functioning of the first clutch 202b may be communicated by the first driver to the application server 110 by way of the first telematics device 104a. For example, the first voice data may include a speech message recorded by the first driver, indicating that the first clutch pedal 304d is hard. In another embodiment, an assessment of the functioning of the first clutch 202b may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first clutch 202b is "below par", "bad", or "very bad", the processing circuitry 402 may communicate a message to the first telematics device 104a, requesting the first driver to visit the maintenance center 106 for servicing the first clutch 202b.

Based on the message, the first vehicle 102a may be taken by the first driver to the maintenance center 106 for servicing. Following a servicing of the first clutch 202b, the maintenance system 120 in the maintenance center 106 may communicate corresponding one or more service logs to the maintenance database 108 for storing therein. The service logs may indicate repair or replacement of one or more of the internal components of the first clutch 202b. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first clutch 202b) of the classifier 412 and tag the output of the classifier 412 as a "true negative" (i.e., bad health status determined correctly) or a "false negative" (i.e., bad health status determined wrongly) as per a result of the validation. If the speech message indicates that the functioning of the first clutch 202b is "below par", "bad", or "very bad" and the corresponding service data indicates the repair and/or the replacement of one or more of the internal components of the first clutch 202b, the machine learning engine 406 tags the output as a true negative.

If the deciphered speech message indicates that the functioning of the first clutch 202b is "good", the processing circuitry 402 may or may not communicate, to the first telematics device 104a, a message requesting the first driver to visit the maintenance center 106 for servicing the first clutch 202b. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first clutch 202b, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first clutch 202b prior to the servicing, the machine learning engine 406 may tag the output as a true negative. If the corresponding service data indicates a good or healthy functioning of the first clutch 202b prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the second plurality of features 604), as described in the foregoing description of FIG. 5.

In another example, the classifier 412 may determine a "25%" probability of the health status of the first clutch 202b being bad. Since the determined probability (i.e., "25%") is less than the preset probability threshold (e.g., "40%"), the health status of the first clutch 202b is classified as good. In other words, the classifier 412 determines that there is a "75%" probability that the health status of the first clutch 202b is good. In a non-limiting example, no action may be taken by the application server 110 based on the determination. However, in another non-limiting example, the processing circuitry 402 may communicate a notification to the first telematics device 104a, requesting the first driver for first voice data indicative of an assessment of a functioning of the first clutch 202b. The first voice data (i.e., feedback), indicative of the assessment of the functioning of the first clutch 202b, may be communicated by the first driver to the application server 110. If the first voice data is not indicative of any symptoms of poor health or faulty functioning of the first clutch 202b, an output (i.e., the determined health status of the first clutch 202b) of the classifier 412 may be tagged as a "true positive". If the first voice data is indicative of one or more symptoms of poor health or faulty functioning of the first clutch 202b, the output of the classifier 412 may be tagged as a "false positive". Further, if the first voice data is indicative of one or more symptoms of faulty functioning of the first clutch 202b, the processing circuitry 402 may communicate a message to the first telematics device 104a. The message may be a request to the first driver to take the first vehicle 102a to the maintenance center 106 for servicing the first clutch 202b. Based on the tagging of the output (i.e., as a result of validation of the output) as a true positive or a false positive, the machine learning engine 406 may re-train the classifier 412 (e.g., update the weights of the second plurality of features 604), using the reinforcement learning techniques for improving the accuracy of the classifier 412.

In a scenario where the determined health status of the first clutch 202b is good, the classifier 412 may further determine a second RUL of the first clutch 202b (as described in the foregoing description of FIG. 5). For example, the classifier 412 may determine that there is an "80%" chance of the first clutch 202b turning faulty after 2,500 Km. In other words, there is an "80%" chance of the first clutch 202b experiencing bad health (i.e., requiring repair or replacement) after 2,500 Km. Based on the determined second RUL, the classifier 412 may classify the determined second RUL as a bad RUL.

The machine learning engine 406 may employ the one or more model interpretability techniques, to identify a set of factors that have influenced the classifier 412 in determining the second RUL. Based on the determined second RUL, the processing circuitry 402 may schedule a clutch service session for the first clutch 202b to prevent the health status (i.e., good health status) of the first clutch 202b from deteriorating. The processing circuitry 402 may communicate, to the first telematics device 104a, a notification indicative of the determined second RUL and the scheduled clutch service session. Based on the notification, the first vehicle 102a may be taken by the first driver to the maintenance center 106 at a scheduled time for the scheduled clutch service session.

Following a servicing of the first clutch 202b, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining an RUL of a clutch. It will be apparent to those of skill in the art that a health status or an RUL of a clutch in any vehicle (e.g., the second vehicle 102b or any other vehicle) may be determined in a similar manner.

Figure 8:
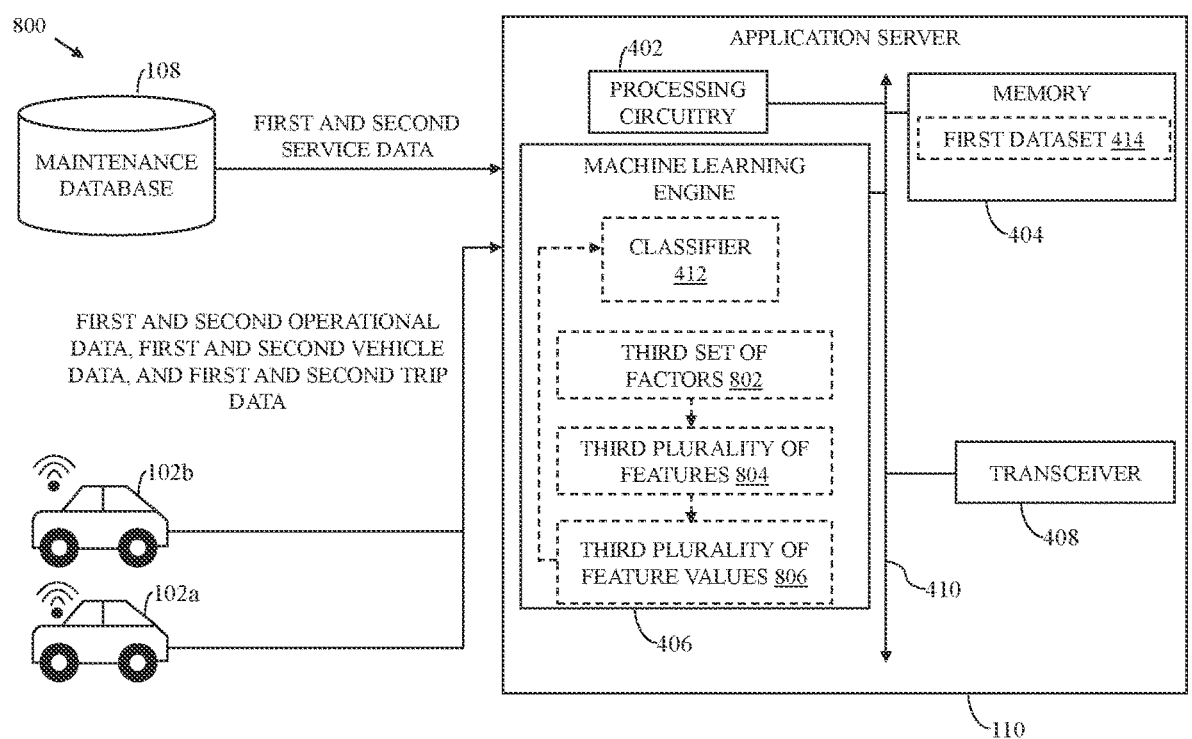
FIG. 8 is a block diagram that illustrates an exemplary scenario for training a classifier for predictive maintenance of a braking system in a vehicle, in accordance with an exemplary embodiment of the disclosure.

FIG. 8 is a block diagram 800 that illustrates an exemplary scenario for training the classifier 412 for predictive maintenance of a braking system in a vehicle, in accordance with an exemplary embodiment of the disclosure. FIG. 8 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 8 is explained in conjunction with FIGS. 1A and 3B.

The processing circuitry 402 may collect, over the first time-interval, the first dataset 414 (as described in the foregoing description of FIG. 4). The processing circuitry 402 may store the first dataset 414 in the memory 404.

The machine learning engine 406 may generate and train the classifier 412. As described in the foregoing description of FIG. 1A, prior to training the classifier 412, the machine learning engine 406 may employ the feature or variable selection techniques to process the first dataset 414 and select a third set of factors 802. Each factor of the third set of factors 802 may have a causal relationship (e.g., direct causal relationship or indirect causal relationship) or a high degree of correlation with a health status of a braking system in a vehicle (e.g., the first and second vehicles 102a and 102b). In a non-limiting example, the third set of factors 802 may include, but are not limited to, a health of a master cylinder, a health of a set of brake rotors, a health of a set of brake lines, a health of a set of wheel cylinders, or a health of a set of brake pads. The third set of factors 802 may further include, a vehicle age, a vehicle model, a distance travelled (mileage), a driver behavior or a driving style of a driver, a service or maintenance history, or the like. It will be apparent to those of skill in the art that factors included in the third set of factors 802 are merely exemplary and are not to be construed as limitations to the scope of the disclosure. In an actual implementation, the third set of factors 802 may include any number of factors and any type of factor without deviating from the scope of the disclosure. In some embodiments, the machine learning engine 406 may filter the first dataset 414 based on the third set of factors 802 to obtain a filtered first dataset 414. The filtered first dataset 414 may only include data that corresponds to the third set of factors 802.

In an exemplary embodiment, the machine learning engine 406 may determine, using the feature engineering techniques, a third plurality of features 804 associated with the selected third set of factors 802. The machine learning engine 406 may determine the third plurality of features 804 by processing and analyzing the filtered first dataset 414 based on the selected third set of factors 802. The third plurality of features 804 may include one or more features associated with each factor of the third set of factors 802. Each feature of the third plurality of features 804 may be determined such that the feature captures a change, a trend, or a pattern in a value of a corresponding factor (of the third set of factors 802) across various time periods (e.g., days, weeks, months, years, or the like) over the first time-interval. For example, a first feature of the third plurality of features 804 may correspond to a cumulative or total distance travelled by a vehicle prior to a braking system service session. A second feature of the third plurality of features 804 may correspond to an average age of a vehicle prior to a braking system service session. A third feature of the third plurality of features 804 may correspond to a moving average of distances travelled by a vehicle between consecutive braking system service sessions.

A fourth feature of the third plurality of features 804 may correspond to a rolling mean of engine RPM of a vehicle prior to a braking system service session. A fifth feature of the third plurality of features 804 may correspond to an average maximum RPM of a vehicle prior to a braking system service session. A sixth feature of the third plurality of features 804 may correspond to an average speed of a vehicle prior to a braking system service session. A seventh feature of the third plurality of features 804 may correspond to an average level of traffic congestion encountered by a vehicle, prior to a braking system service session.

An eighth feature of the third plurality of features 804 may correspond to a level of hardness in a brake pedal of a vehicle prior to a braking system service session. In a non-limiting example, a hardness of a brake pedal (i.e., force or pressure required to depress the brake pedal) in a vehicle may be indicated by sensor data received from a telematics device of the vehicle. For example, the sensor data or the DTCs corresponding to the first ECU of the first vehicle 102*a* may be indicative of change in a level of hardness of a first brake pedal in the first vehicle 102*a* over the first time-interval.

A ninth feature of the third plurality of features 804 may correspond to a cumulative sum of a number of instances of generation of one or more relevant DTCs in a vehicle prior to a braking system service session. For example, a first DTC indicative of a high level of brake pedal hardness may be generated 45 times over a course of 45 days, leading to a cumulative sum of "45". A tenth feature of the third plurality of features 804 may correspond to a rolling average of a number of instances of generation one or more relevant DTCs prior to a braking system service session. An eleventh feature of the third plurality of features 804 may correspond to a standard deviation of sensor data, indicative of data pertaining to a braking system, from a threshold level prior to an AC system service or maintenance.

A twelfth feature of the third plurality of features 804 may correspond to a level of wear and tear on a set of brake pads of a vehicle prior to a braking system service session. In a non-limiting example, a health (i.e., a level of wear and tear) of mechanical or electromechanical components such as a set of brake pads (e.g., the first set of brake pads 306*e*), a set of brake rotors (e.g., the first set of brake rotors 306*b*), a set of wheel cylinders (e.g., the first set of wheel cylinders 306*d*), or the like may be quantified by way of service data of a corresponding vehicle (e.g., the first and second service data of the first vehicle 102*a*). In another non-limiting example, the health of the set of brake pads, the set of brake rotors, the set of wheel cylinders, or the like, may be quantified by way of sensor data or one or more DTCs generated by a corresponding ECU.

The third plurality of features 804 listed above should not be construed as limitations to the present disclosure. Each factor of the third set of factors 802 may be associated with one or more features. The third plurality of features 804 may include any type of feature and any number of features without deviating from the scope of the disclosure. In one embodiment, each feature of the third plurality of features 804 may be assigned a weight corresponding to a strength of a relationship of correlation or causation between the feature and a health status of a braking system.

On determining the third plurality of features 804, the machine learning engine 406 processes the filtered first dataset 414 to determine a third plurality of feature values 806. For determining the third plurality of feature values 806, the machine learning engine 406 may determine, for each of the plurality of vehicles 102, a feature value for each feature of the third plurality of features 804. For example, for the first feature (average total distance travelled by a vehicle prior to a braking system service session) of the third plurality of features 804, the machine learning engine 406 may determine a feature value based on the first through third service data and the first through third trip data included in the first dataset 414. The machine learning engine 406 may determine the third plurality of feature values 806 for the third plurality of features 804. On determining the third plurality of feature values 806, the machine learning engine 406 may initiate a training phase of the classifier 412.

The machine learning engine 406 may train the classifier 412 for determining a health status of a braking system. The training of the classifier 412 may be based on the third plurality of feature values 806 and the weight assigned to each feature of the third plurality of features 804. In other words, the third plurality of feature values 806 and the weight assigned to each feature of the third plurality of features 804 constitute a third training dataset for training the classifier 412. Methods of training the classifier 412 on the third training dataset to determine a health status of a braking system are well known to those of skill in the art. In the current embodiment, for the sake of brevity, the third training dataset has been shown to correspond to a sample size of two (i.e., the first and second vehicles 102*a* and 102*b*). However, in an actual implementation, the third training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the third training dataset, to determine an RUL of a braking system in a vehicle and classify the determined RUL as one of a good RUL, a bad RUL, a very bad RUL, or the like.

Figure 9:
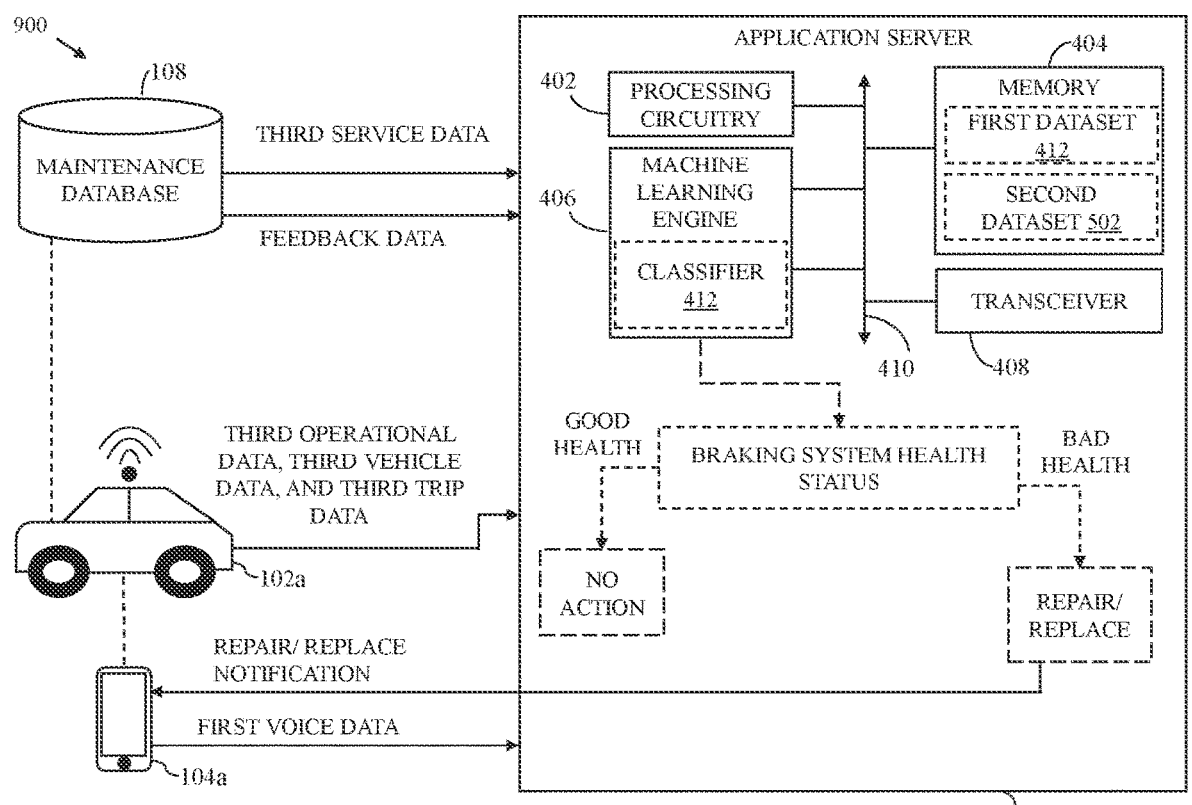
FIG. 9 is a block diagram that illustrates determination of a health status of a braking system in the first vehicle, in accordance with an exemplary embodiment of the disclosure.

FIG. 9 is a block diagram 900 that illustrates determination of a health status of the first braking system 202*c*, in accordance with an exemplary embodiment of the disclosure. FIG. 9 is explained in conjunction with FIGS. 1A and 8. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104*a*, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the third plurality of features 804 (as described in the foregoing description of FIG. 5). Based on the data determined from the second dataset 502, the classifier 412 may determine a health status of the first braking system 202*c*. In other words, the classifier 412 determines whether the first braking system 202*c* is functioning properly or not.

In a non-limiting example, the classifier 412 determines a probability (e.g., "60%") that the first braking system 202*c* is currently faulty (i.e., health status is bad). For example, the classifier 412 may determine that there is a "60%" probability that the health status of the first braking system 202*c* is bad. If the probability (e.g. "60%") associated with the determination is greater than or equal to a preset probability threshold (e.g., "40%"), the health status of the first braking system 202*c* is classified as bad. If the probability (e.g. "60%") associated with the determination is less than the preset probability threshold (e.g., "40%"), the health status of the first braking system 202*c* is classified as good.

The machine learning engine 406 may employ the one or more model interpretability techniques, to identify a set of factors that have influenced the classifier 412 in determining faulty functioning of the first braking system 202*c* (i.e., "60%" probability of the health status of the first braking system 202c being bad). Based on the determined health status of the first braking system 202c, the processing circuitry 402 may communicate, by way of the transceiver 408, a notification to the first telematics device 104a. The notification may be indicative of the determined health status of the first braking system 202c. Further, the notification may include a message requesting the first driver to assess a functioning of the first braking system 202c (as described in the foregoing description of FIG. 5). In other words, the processing circuitry 402 may request the first driver to assess whether the first braking system 202c displays an onset of one or more symptoms (e.g., loss in braking power) of poor health or faulty functioning of the first braking system 202c.

In one embodiment, first voice data (i.e., feedback) indicative of an assessment of the functioning of the first braking system 202c may be communicated by the first driver to the application server 110 by way of the first telematics device 104a. For example, the first voice data may include a speech message recorded by the first driver, indicating a loss in braking power in the first braking system 202c. In another embodiment, an assessment of the functioning of the first braking system 202c may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first braking system 202c is "below par", "bad", or "very bad", the processing circuitry 402 may communicate a message to the first telematics device 104a, requesting the first driver to visit the maintenance center 106 for servicing the first braking system 202c.

Based on the message, the first vehicle 102a may be taken by the first driver to the maintenance center 106 for servicing. Following a servicing of the first braking system 202c, the maintenance system 120 in the maintenance center 106 may communicate corresponding one or more service logs to the maintenance database 108 for storing therein. The service logs may indicate repair or replacement of one or more of the internal components of the first braking system 202c. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first braking system 202c) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first braking system 202c is "below par", "bad", or "very bad" and the corresponding service data indicates the repair and/or the replacement of one or more of the internal components of the first braking system 202c, the machine learning engine 406 tags the output as a true negative.

If the deciphered speech message indicates that the functioning of the first braking system 202c is "good", the processing circuitry 402 may or may not communicate, to the first telematics device 104a, a message requesting the first driver to visit the maintenance center 106 for servicing the first braking system 202c. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first braking system 202c, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first braking system 202c prior to the servicing, the machine learning engine 406 may tag the output as a true negative. If the corresponding service data indicates a good or healthy functioning of the first braking system 202c prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the third plurality of features 804), as described in the foregoing description of FIG. 5.

In another example, the classifier 412 may determine a "15%" probability of the health status of the first braking system 202c being bad. If the determined probability (i.e., "15%") is less than the preset probability threshold (e.g., "40%"), the health status of the first braking system 202c is classified as good. In other words, the classifier 412 determines that there is an "85%" probability that the health status of the first braking system 202c is good. In a non-limiting example, no action may be taken by the application server 110 based on the determination. However, in another non-limiting example, the processing circuitry 402 may communicate a notification to the first telematics device 104a, requesting the first driver for first voice data indicative of an assessment of a functioning of the first braking system 202c. The first voice data (i.e., feedback), indicative of the assessment of the functioning of the first braking system 202c, may be communicated by the first driver to the application server 110. If the first voice data is not indicative of any symptoms of poor health or faulty functioning of the first braking system 202c, an output (i.e., the determined health status of the first braking system 202c) of the classifier 412 may be tagged as a "true positive". If the first voice data is indicative of one or more symptoms of poor health or faulty functioning of the first braking system 202c, the output of the classifier 412 may be tagged as a "false positive". Further, if the first voice data is indicative of one or more symptoms of faulty functioning of the first braking system 202c, the processing circuitry 402 may communicate a message to the first telematics device 104a. The message may be a request to the first driver to take the first vehicle 102a to the maintenance center 106 for servicing the first braking system 202c. Based on the tagging of the output (i.e., a result of validation of the output) as a true positive or a false positive, the machine learning engine 406 may re-train the classifier 412 (e.g., update the weights of the third plurality of features 804), using the reinforcement learning techniques for improving the accuracy of the classifier 412.

In a scenario where the determined health status of the first braking system 202c is good, the classifier 412 may further determine a third RUL of the first braking system 202c (as described in the foregoing description of FIG. 5). For example, the classifier 412 may determine that there is an "86%" chance of the first braking system 202c turning faulty after 10,500 Km. In other words, there is an "86%" chance of the first braking system 202c experiencing bad health (i.e., requiring repair or replacement) after 10,500 Km. Based on the determined third RUL, the classifier 412 may classify the determined third RUL as a good RUL.

The machine learning engine 406 may employ the one or more model interpretability techniques, to identify a set of factors that have influenced the classifier 412 in determining the third RUL. Based on the determined third RUL, the processing circuitry 402 may schedule a braking system service session for the first braking system 202c, in the future (e.g., after the first vehicle 102a has travelled 8,000 Km), to prevent the health status (i.e., good health status) of the first braking system 202c from deteriorating. The processing circuitry 402 may communicate, to the first telematics device 104a, a notification indicative of the determined third RUL and the scheduled braking system service session. Based on the notification, the first vehicle 102a may be taken by the first driver to the maintenance center 106 at a scheduled time for the scheduled braking system service session.

Following a servicing of the first braking system 202c, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining an RUL of a braking system. It will be apparent to those of skill in the art that a health status or an RUL of a braking system in any vehicle (e.g., the second vehicle 102b or any other vehicle) may be determined in a similar manner.

Figure 10:
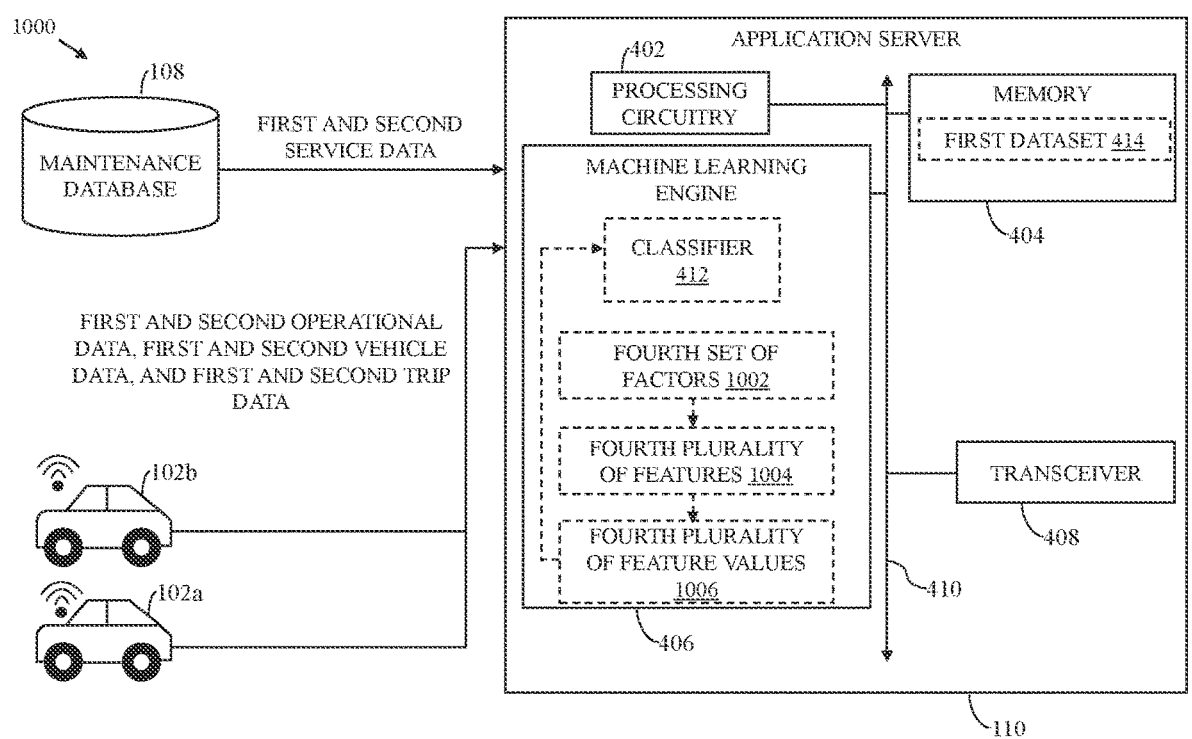
FIG. 10 is a block diagram that illustrates an exemplary scenario for training a classifier for predictive maintenance of a set of components in an engine bay of a vehicle, in accordance with an exemplary embodiment of the disclosure.

FIG. 10 is a block diagram 1000 that illustrates an exemplary scenario for training the classifier 412 for predictive maintenance of a set of components in an engine bay of a vehicle, in accordance with an exemplary embodiment of the disclosure. FIG. 10 is explained in conjunction with FIGS. 1A and 3D. FIG. 10 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4.

The processing circuitry 402 may collect, over the first time-interval, the first dataset 414 (as described in the foregoing description of FIG. 4). The processing circuitry 402 may store the first dataset 414 in the memory 404.

The machine learning engine 406 may generate and train the classifier 412. As described in the foregoing description of FIG. 1A, prior to training the classifier 412, the machine learning engine 406 may employ the feature or variable selection techniques to process the first dataset 414 and select a fourth set of factors 1002. Each factor of the fourth set of factors 1002 may have a causal relationship (e.g., direct causal relationship or indirect causal relationship) or a high degree of correlation with a health status of components in an engine bay of a vehicle (e.g., the first and second vehicles 102a and 102b). In a non-limiting example, the fourth set of factors 1002 may include, but are not limited to, a health of an engine, a level of engine oil in an engine oil tank, a health of an oil feed line, a health of an oil sump, a health of a turbocharger, a health of a radiator, or a level of coolant in a coolant tank. The fourth set of factors 1002 may further include a health of a transmission, a health of a set of fuel injectors, a health of a set of spark plugs, a health of a thermostat, a health of a battery, or the like. It will be apparent to those of skill in the art that factors included in the fourth set of factors 1002 are merely exemplary and are not to be construed as limitations to the scope of the disclosure. In an actual implementation, the fourth set of factors 1002 may include any number of factors and any type of factor without deviating from the scope of the disclosure. In some embodiments, the machine learning engine 406 may filter the first dataset 414 based on the fourth set of factors 1002 to obtain a filtered first dataset 414. The filtered first dataset 414 may only include data that corresponds to the fourth set of factors 1002.

In an exemplary embodiment, the machine learning engine 406 may determine, using the feature engineering techniques, a fourth plurality of features 1004 associated with the selected fourth set of factors 1002. The machine learning engine 406 may determine the fourth plurality of features 1004 by processing and analyzing the filtered first dataset 414 based on the selected fourth set of factors 1002. The fourth plurality of features 1004 may include one or more features associated with each factor of the fourth set of factors 1002. Each feature of the fourth plurality of features 1004 may be determined such that the feature captures a change, a trend, or a pattern in a value of a corresponding factor (of the fourth set of factors 1002) across various time periods (e.g., days, weeks, months, years, or the like) over the first time-interval.

For example, a first feature of the fourth plurality of features 1004 may correspond to a cumulative or total distance travelled by a vehicle prior to an engine overhaul or an engine bay components service session. A second feature of the fourth plurality of features 1004 may correspond to an average age of a vehicle prior to an engine overhaul or an engine bay components service session.

A third feature of the fourth plurality of features 1004 may correspond to a moving average of a number of instances of generation or more relevant DTCs prior to an engine overhaul or an engine bay components service session. A fourth feature of the fourth plurality of features 1004 may correspond to a cumulative sum of a number of instances of generation or more relevant DTCs prior to an engine overhaul or an engine bay components service session. A fifth feature of the fourth plurality of features 1004 may correspond to a level of engine oil in an engine oil tank prior to an engine overhaul or an engine bay components service session. A sixth feature of the fourth plurality of features 1004 may correspond to a level of coolant in a vehicle prior to an engine overhaul or an engine bay components service session.

A seventh feature of the fourth plurality of features 1004 may correspond to a level of wear and tear on an engine of a vehicle prior to an engine overhaul or an engine bay components service session. In a non-limiting example, a health (i.e., a level of wear and tear) of mechanical or electromechanical components such as an engine (e.g., the first engine 308a), an engine oil tank (e.g., the first engine oil tank 308b), an oil feedline (e.g., the first oil feed line 308c), an oil sump (e.g., the first oil sump 308d), a thermostat (e.g., the first thermostat 308g), or the like may be quantified by way of service data of a corresponding vehicle (e.g., the first and second service data of the first vehicle 102a). In another non-limiting example, the health of the mechanical or electromechanical components may be quantified by way of sensor data or one or more DTCs generated by a corresponding ECU.

The fourth plurality of features 1004 listed above should not be construed as limitations to the present disclosure. Each factor of the fourth set of factors 1002 may be associated with one or more features. The fourth plurality of features 1004 may include any type of feature and any number of features without deviating from the scope of the disclosure. In one embodiment, each feature of the fourth plurality of features 1004 may be assigned a weight corresponding to a strength of a relationship of correlation or causation between the feature and a health status of components in an engine bay of a vehicle.

On determining the fourth plurality of features 1004, the machine learning engine 406 processes the filtered first dataset 414 to determine a fourth plurality of feature values 1006. For determining the fourth plurality of feature values 1006, the machine learning engine 406 may determine, for each of the plurality of vehicles 102, a feature value for each feature of the fourth plurality of features 1004. On determining the fourth plurality of feature values 1006, the machine learning engine 406 may initiate a training phase of the classifier 412.

The machine learning engine 406 may train the classifier 412 for determining a health status of components in an engine bay of a vehicle. The training of the classifier 412 may be based on the fourth plurality of feature values 1006 and the weight assigned to each feature of the fourth plurality of features 1004. In other words, the fourth plurality of feature values 1006 and the weight assigned to each feature of the fourth plurality of features 1004 constitute a fourth training dataset for training the classifier 412. Methods of training the classifier 412 on the fourth training dataset to determine a health status of components in an engine bay of a vehicle are well known to those of skill in the art. In the current embodiment, for the sake of brevity, the fourth training dataset has been shown to correspond to a sample size of two (i.e., the first and second vehicles 102a and 102b). However, in an actual implementation, the fourth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the fourth training dataset, to determine an RUL of components in an engine bay of a vehicle and classify the determined RUL as one of a good RUL, a bad RUL, a very bad RUL, or the like.

Figure 11:
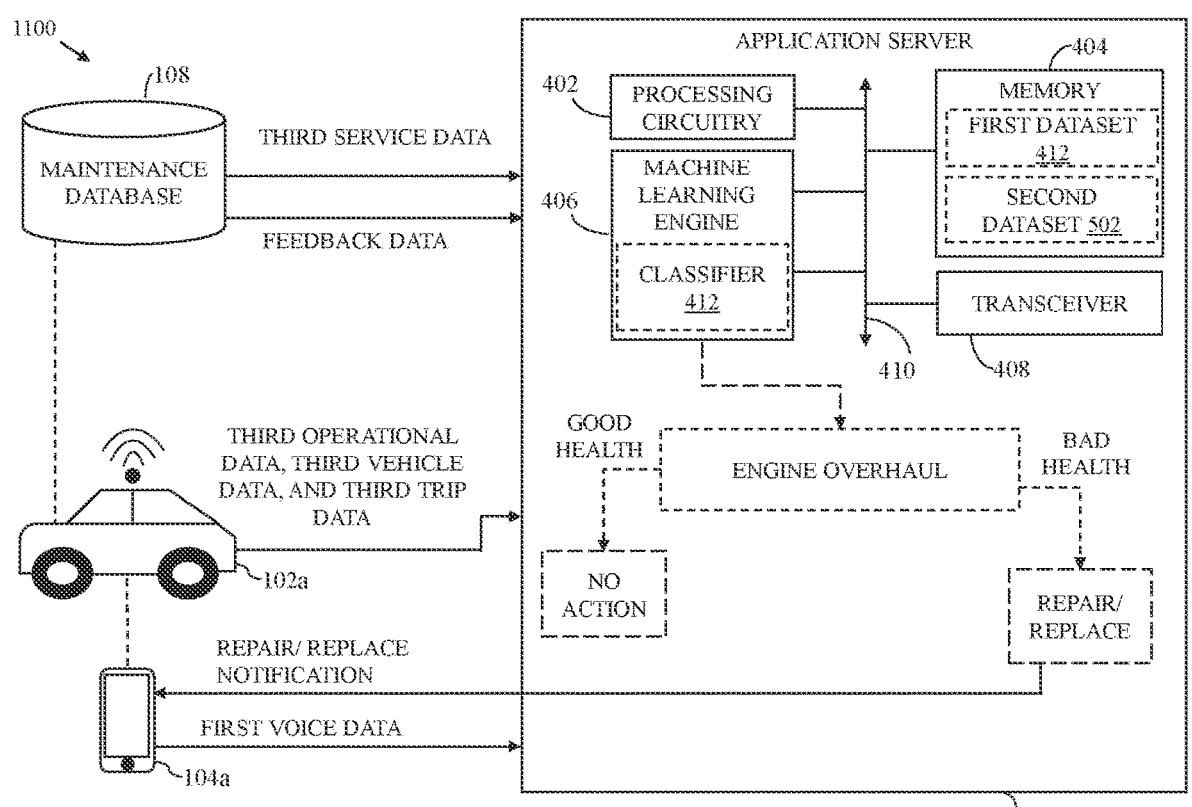
FIG. 11 is a block diagram that illustrates determination of a health status of a set of components in an engine bay of the first vehicle, in accordance with an exemplary embodiment of the disclosure.

FIG. 11 is a block diagram 1100 that illustrates determination of a health status of the first set of components 202d in the first engine bay of the first vehicle 102a, in accordance with an exemplary embodiment of the disclosure. FIG. 11 is explained in conjunction with FIGS. 1A and 10. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104a, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the fourth plurality of features 1004 (as described in the foregoing description of FIG. 5). Based on the data determined from the second dataset 502, the classifier 412 may determine a health status of the first set of components 202d. In other words, the classifier 412 determines whether the first set of components 202d is functioning properly or not.

In a non-limiting example, the classifier 412 determines a probability (e.g., "68%") that the first set of components 202d is currently faulty (i.e., health status is bad). For example, the classifier 412 may determine that there is a "68%" probability that the health status of the first set of components 202d is bad. If the probability (e.g. "68%") associated with the determination is greater than or equal to a preset probability threshold (e.g., "40%"), the health status of the first set of components 202d is classified as bad. If the probability (e.g. "68%") associated with the determination is less than the preset probability threshold (e.g., "40%"), the health status of the first set of components 202d is classified as good.

The machine learning engine 406 may employ the one or more model interpretability techniques, to identify a set of factors that have influenced the classifier 412 in determining faulty functioning of the first set of components 202d (i.e., "60%" probability of the health status of the first set of components 202d being bad). Based on the determined health status of the first set of components 202d, the processing circuitry 402 may communicate, by way of the transceiver 408, a notification to the first telematics device 104a. The notification may be indicative of the determined health status of the first set of components 202d. Further, the notification may include a message requesting the first driver to assess a functioning of the first set of components 202d (as described in the foregoing description of FIG. 5). In other words, the processing circuitry 402 may request the first driver to assess whether the first set of components 202d displays an onset of one or more symptoms (e.g., engine oil leakage or coolant leakage) of poor health or faulty functioning of the first set of components 202d.

In one embodiment, first voice data (i.e., feedback) indicative of an assessment of the functioning of the first set of components 202d may be communicated by the first driver to the application server 110 by way of the first telematics device 104a. For example, the first voice data may include a speech message recorded by the first driver, indicating an engine oil leakage within the first engine bay. In another embodiment, an assessment of the functioning of the first set of components 202d may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first set of components 202d is "below par", "bad", or "very bad", the processing circuitry 402 may communicate a message to the first telematics device 104a, requesting the first driver to visit the maintenance center 106 for servicing the first set of components 202d (i.e., engine overhaul or engine bay components service session).

Based on the message, the first vehicle 102a may be taken by the first driver to the maintenance center 106 for servicing. Following a servicing of the first set of components 202d, the maintenance system 120 in the maintenance center 106 may communicate corresponding one or more service logs to the maintenance database 108 for storing therein. The service logs may indicate repair or replacement of one or more of the first set of components 202d. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first set of components 202d) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first set of components 202d is "below par", "bad", or "very bad" and the corresponding service data indicates the repair and/or the replacement of one or more of the internal components of the first set of components 202d, the machine learning engine 406 tags the output as a true negative.

If the deciphered speech message indicates that the functioning of the first set of components 202d is "good", the processing circuitry 402 may or may not communicate, to the first telematics device 104a, a message requesting the first driver to visit the maintenance center 106 for servicing the first set of components 202d. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first set of components 202d, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first set of components 202d prior to the servicing, the machine learning engine 406 may tag the output as a true negative. If the corresponding service data indicates a good or healthy functioning of the first set of components 202d prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the fourth plurality of features 1004), as described in the foregoing description of FIG. 5.

In another example, the classifier 412 may determine a "15%" probability of the health status of the first set of components 202d being bad. Since the determined probability (i.e., "15%") is less than the preset probability threshold (e.g., "40%"), the health status of the first set of components 202d is classified as good. In other words, the classifier 412 determines that there is an "85%" probability that the health status of the first set of components 202d is good. In a non-limiting example, no action may be taken by the application server 110 based on the determination. However, in another non-limiting example, the processing circuitry 402 may communicate a notification to the first telematics device 104a, requesting the first driver for first voice data indicative of an assessment of a functioning of the first set of components 202d. The first voice data (i.e., feedback), indicative of the assessment of the functioning of the first set of components 202d, may be communicated by the first driver to the application server 110. If the first voice data is not indicative of any symptoms of poor health or faulty functioning of the first set of components 202d, an output (i.e., the determined health status of the first set of components 202d) of the classifier 412 may be tagged as a "true positive". If the first voice data is indicative of one or more symptoms of poor health or faulty functioning of the first set of components 202d, the output of the classifier 412 may be tagged as a "false positive". Further, if the first voice data is indicative of one or more symptoms of faulty functioning of the first set of components 202d, the processing circuitry 402 may communicate a message to the first telematics device 104a. The message may be a request to the first driver to take the first vehicle 102a to the maintenance center 106 for servicing the first set of components 202d. Based on the tagging of the output (i.e., a result of validation of the output) as a true positive or a false positive, the machine learning engine 406 may re-train the classifier 412 (e.g., update the weights of the fourth plurality of features 1004), using the reinforcement learning techniques for improving the accuracy of the classifier 412.

In a scenario where the determined health status of the first set of components 202d is good, the classifier 412 may further determine a fourth RUL of the first set of components 202d (as described in the foregoing description of FIG. 5). For example, the classifier 412 may determine that there is an "86%" chance of the first set of components 202d turning faulty after 3,000 Km. In other words, there is an "86%" chance of the first set of components 202d experiencing bad health (i.e., requiring engine overhaul or engine bay components service session) after 3,000 Km. Based on the determined fourth RUL, the classifier 412 may classify the determined fourth RUL as a bad RUL.

The machine learning engine 406 may employ the one or more model interpretability techniques, to identify a set of factors that have influenced the classifier 412 in determining the fourth RUL. Based on the determined fourth RUL, the processing circuitry 402 may schedule engine overhaul or engine bay components service session for the first set of components 202*d* to prevent the health status (i.e., good health status) of the first set of components 202*d* from deteriorating. The processing circuitry 402 may communicate, to the first telematics device 104*a*, a notification indicative of the determined fourth RUL and the scheduled engine overhaul or engine bay components service session. Based on the notification, the first vehicle 102*a* may be taken by the first driver to the maintenance center 106 at a scheduled time for the scheduled engine overhaul or engine bay components service session.

Following the engine overhaul or engine bay components service session, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining an RUL of the first set of components 202*d*. It will be apparent to those of skill in the art that a health status or an RUL of components in an engine bay in any vehicle (e.g., the second vehicle 102*b* or any other vehicle) may be determined in a similar manner.

Figure 12:
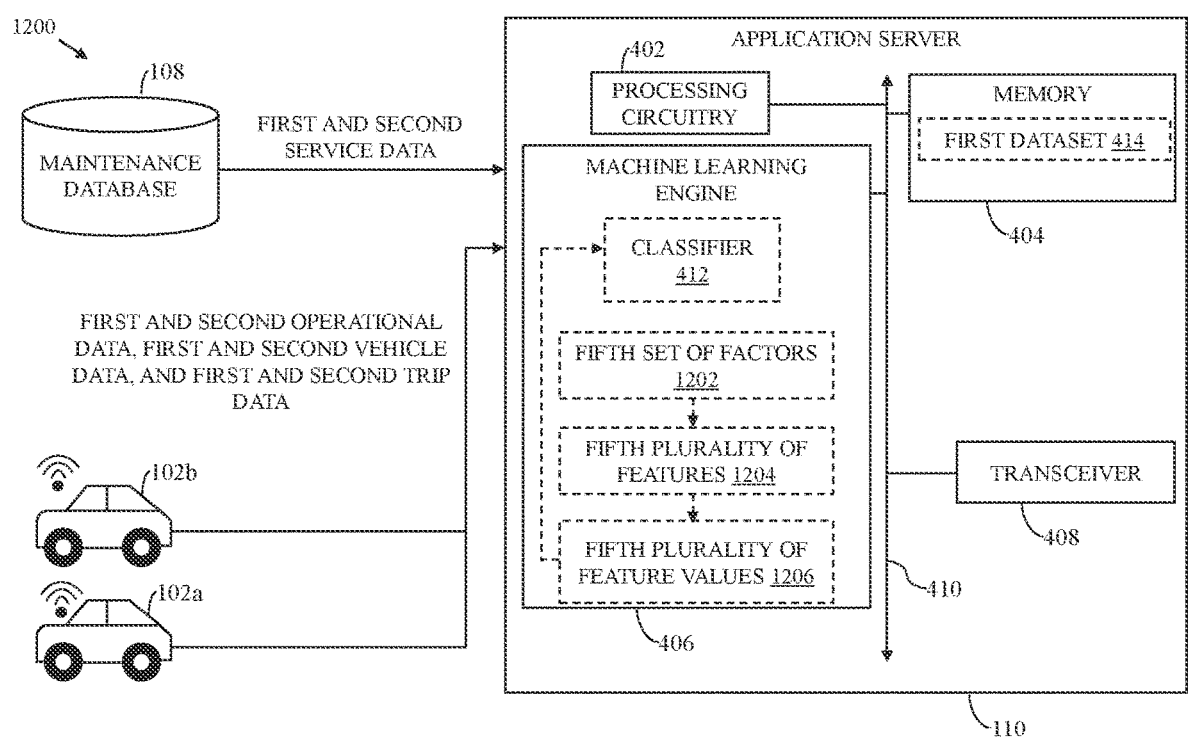
FIG. 12 is a block diagram that illustrates an exemplary scenario for training a classifier for predictive maintenance of a compressed natural gas system in a vehicle, in accordance with an exemplary embodiment of the disclosure.

FIG. 12 is a block diagram 1200 that illustrates an exemplary scenario for training the classifier 412 for predictive maintenance of a CNG system in a vehicle, in accordance with an exemplary embodiment of the disclosure. FIG. 12 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 12 is explained in conjunction with FIGS. 1A and 3D.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select a fifth set of factors 1202. Each factor of the fifth set of factors 1202 may have a causal relationship (e.g., direct causal relationship or indirect causal relationship) or a high degree of correlation with a health status of a CNG system in a vehicle (e.g., the first and second vehicles 102*a* and 102*b*). In a non-limiting example, the fifth set of factors 1202 may include, but are not limited to, a health of an engine storage tank, health of a set of high-pressure fuel filters, health of a fuel rails, or a health of a set of fuel injectors. The fifth set of factors 1202 may further include, a signal from an air intake temperature circuit, a signal from on an oxygen sensor circuit, a signal from a camshaft position sensor, a signal from an ignition circuit, an efficiency of a heated catalyst, or the like. The fifth set of factors 1202 may further include a level of performance of an exhaust pressure control valve, a health of a throttle actuator, or the like. It will be apparent to those of skill in the art that factors included in the fifth set of factors 1202 are merely exemplary and are not to be construed as limitations to the scope of the disclosure. In an actual implementation, the fifth set of factors 1202 may include any number of factors and any type of factor without deviating from the scope of the disclosure. In some embodiments, the machine learning engine 406 may filter the first dataset 414 based on the fifth set of factors 1202 to obtain the filtered first dataset 414. The filtered first dataset 414 may include only data that corresponds to the fifth set of factors 1202.

In an exemplary embodiment, the machine learning engine 406 may determine, using the feature engineering techniques, a fifth plurality of features 1204 associated with the selected fifth set of factors 1202. The machine learning engine 406 may determine the fifth plurality of features 1204 by processing and analyzing the filtered first dataset 414 based on the selected fifth set of factors 1202. The fifth plurality of features 1204 may include one or more features associated with each factor of the fifth set of factors 1202. Each feature of the fifth plurality of features 1204 may be determined such that the feature captures a change, a trend, or a pattern in a value of a corresponding factor (of the fifth set of factors 1202) across various time periods (e.g., days, weeks, months, years, or the like) over the first time-interval.

For example, a first feature of the fifth plurality of features 1204 may correspond to a cumulative sum of a number of instances of generation of a first DTC (e.g., "P0114") in a vehicle prior to a CNG system service session. The first DTC may indicate that an input signal from an air intake temperature circuit, in a vehicle, is intermittent. The input signal from the air intake temperature circuit may be essential for calculation of fuel delivery (e.g., CNG delivery to an engine in the vehicle) and ignition timing strategy. A second feature of the fifth plurality of features 1204 may correspond to a moving average of a number of instances of generation of the first DTC in a vehicle over a time period (e.g., 10 days, 30 days, 45 days, or the like) prior to a CNG system service session. A third feature of the fifth plurality of features 1204 may correspond to a standard deviation of a number of instances of generation of the first DTC in a vehicle over a time period (e.g., 10 days, 30 days, 45 days, or the like) prior to a CNG system service session.

A fourth feature of the fifth plurality of features 1204 may correspond to a cumulative sum of a number of instances of generation of a second DTC (e.g., "P0114") in a vehicle prior to a CNG system service session. The second DTC may indicate malfunctioning of an oxygen sensor circuit (i.e., poor or bad health of the oxygen sensor circuit). A fifth feature of the fifth plurality of features 1204 may correspond to a moving average of a number of instances of generation of the second DTC in a vehicle over a time period (e.g., 10 days, 30 days, 45 days, or the like) prior to a CNG system service session. A sixth feature of the fifth plurality of features 1204 may correspond to a standard deviation of a number of instances of generation of the second DTC in a vehicle over a time period (e.g., 10 days, 30 days, 45 days, or the like) prior to a CNG system service session.

An eighth feature of the fifth plurality of features 1204 may correspond to a cumulative sum of a number of instances of generation of a third DTC (e.g., "P0200") in a vehicle prior to a CNG system service session. The third DTC may indicate malfunctioning of a fuel injector circuit (i.e., poor or bad health of the fuel injector circuit). A ninth feature of the fifth plurality of features 1204 may correspond to a moving average of a number of instances of generation of the third DTC in a vehicle over a time period (e.g., 10 days, 30 days, 45 days, or the like) prior to a CNG system service session. A tenth feature of the fifth plurality of features 1204 may correspond to a standard deviation of a number of instances of generation of the third DTC in a vehicle over a time period (e.g., 10 days, 30 days, 45 days, or the like) prior to a CNG system service session.

An eleventh feature of the fifth plurality of features 1204 may correspond to a cumulative sum of a number of instances of generation of a third DTC (e.g., "P0200") in a vehicle prior to a CNG system service session. The third DTC may indicate malfunctioning of a fuel injector circuit (i.e., poor or bad health of the fuel injector circuit). A twelfth feature of the fifth plurality of features 1204 may correspond to a moving average of a number of instances of generation of the third DTC in a vehicle over a time period (e.g., 10 days, 30 days, 45 days, or the like) prior to a CNG system service session. A thirteenth feature of the fifth plurality of features 1204 may correspond to a standard deviation of a number of instances of generation of the third DTC in a vehicle over a time period (e.g., 10 days, 30 days, 45 days, or the like) prior to a CNG system service session.

Similarly, the fifth plurality of features 1204 may include other features pertaining to other DTCs that may be generated in relation to a CNG system in a vehicle. These DTCs may include, but are not limited to, a fourth DTC (e.g., "P0341") indicating that a signal from a camshaft position sensor is out of range, a fifth DTC (e.g., "P0351" or "P0353") indicating poor health of an ignition coil circuit, or the like. These DTCs may further include a fifth DTC (e.g., "P0423") indicating that an efficiency of a heated catalyst is below a threshold, a sixth DTC (e.g., "P0476") indicating that an exhaust pressure control valve is faulty (i.e., bad health), a seventh DTC (e.g., "P2176") indicating that a throttle body or actuator has failed (i.e., bad health).

A fourteenth feature of the fifth plurality of features 1204 may correspond to a level of wear and tear on a fuel rail (i.e., a health of a fuel rail) of a vehicle prior to a CNG system service session. In a non-limiting example, a health (i.e., a level of wear and tear) of mechanical or electromechanical components of a CNG system such as a fuel rail (e.g., the first fuel rail 310b), a set of high-pressure fuel filters (e.g., the first set of high-pressure fuel filters 310c), or a set of fuel injectors (e.g., the first set of fuel injectors 308i) may be quantified by way of service data of a corresponding vehicle (e.g., the first and second service data of the first vehicle 102a). In another non-limiting example, the health of the fuel rail, the set of high-pressure fuel filters, the set of fuel injectors, or the like, may be quantified by way of sensor data or one or more DTCs generated by a corresponding ECU.

The fifth plurality of features 1204 listed above should not be construed as limitations to the present disclosure. Each factor of the fifth set of factors 1202 may be associated with one or more features. The fifth plurality of features 1204 may include any type of feature and any number of features without deviating from the scope of the disclosure. In one embodiment, each feature of the fifth plurality of features 1204 may be assigned a weight corresponding to a strength of a relationship of correlation or causation between the feature and a health status of a CNG system.

On determining the fifth plurality of features 1204, the machine learning engine 406 processes the filtered first dataset 414 to determine a fifth plurality of feature values 1206. For determining the fifth plurality of feature values 1206, the machine learning engine 406 may determine, for each of the plurality of vehicles 102, a feature value for each feature of the fifth plurality of features 1204. The machine learning engine 406 may obtain the fifth plurality of feature values 1206 for the fifth plurality of features 1204. On determining the fifth plurality of feature values 1206, the machine learning engine 406 may initiate a training phase of the classifier 412.

The machine learning engine 406 may train the classifier 412 for determining a health status of a CNG system. The training of the classifier 412 may be based on the fifth plurality of feature values 1206 and the weight assigned to each feature of the fifth plurality of features 1204. In other words, the fifth plurality of feature values 1206 and the weight assigned to each feature of the fifth plurality of features 1204 constitute a fifth training dataset for training the classifier 412. Methods of training the classifier 412 on the fifth training dataset to determine a health status of a CNG system are well known to those of skill in the art. In the current embodiment, for the sake of brevity, the fifth training dataset has been shown to correspond to a sample size of two (i.e., the first and second vehicles 102a and 102b). However, in an actual implementation, the fifth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the fifth training dataset, to determine an RUL of a CNG system in a vehicle and classify the determined RUL as one of a good RUL, a bad RUL, a very bad RUL, or the like.

Figure 13:
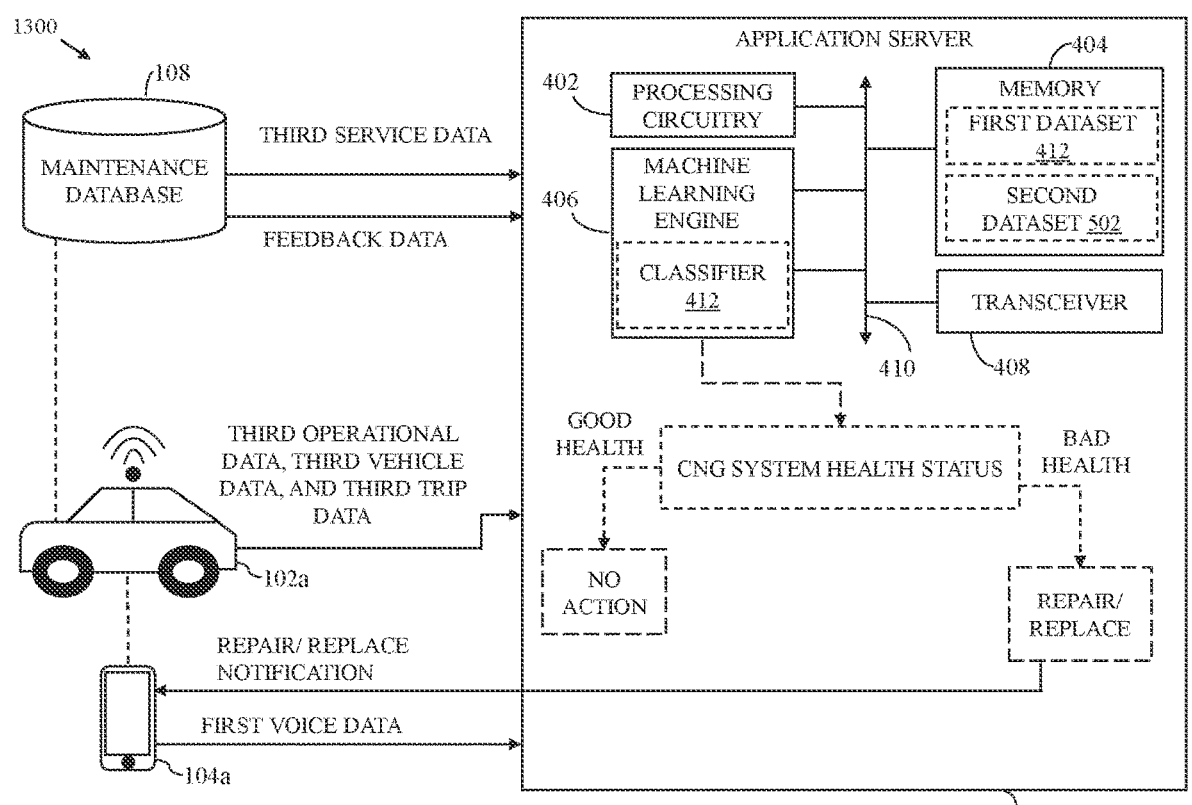
FIG. 13 is a block diagram that illustrates determination of a health status of a compressed natural gas system in the first vehicle, in accordance with an exemplary embodiment of the disclosure.

FIG. 13 is a block diagram 1300 that illustrates determination of a health status of the first CNG system 202e, in accordance with an exemplary embodiment of the disclosure. FIG. 13 is explained in conjunction with FIGS. 1A and 12. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104a, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the fifth plurality of features 1204 (as described in the foregoing description of FIG. 5). Based on the data determined from the second dataset 502, the classifier 412 may determine a health status of the first CNG system 202e. In other words, the classifier 412 determines whether the first CNG system 202e is functioning properly or not.

In a non-limiting example, the classifier 412 determines a probability (e.g., "60%") that the first CNG system 202e is currently faulty (i.e., health status is bad). If the probability (e.g. "60%") associated with the determination is greater than or equal to a preset probability threshold (e.g., "40%"), the health status of the first CNG system 202e is classified as bad. If the probability (e.g. "60%") associated with the determination is less than the preset probability threshold (e.g., "40%"), the health status of the first CNG system 202e is classified as good.

The machine learning engine 406 may employ the one or more model interpretability techniques, to identify a set of factors that have influenced the classifier 412 in determining faulty functioning of the first CNG system 202e (i.e., "60%" probability of the health status of the first CNG system 202e being bad). Based on the determined health status of the first CNG system 202e, the processing circuitry 402 may communicate, by way of the transceiver 408, a notification to the first telematics device 104a. The notification may be indicative of the determined health status of the first CNG system 202e. Further, the notification may include a message requesting the first driver to assess a functioning of the first CNG system 202e (as described in the foregoing description of FIG. 5). In other words, the processing circuitry 402 may request the first driver to assess whether the first CNG system 202e displays an onset of one or more symptoms (e.g., loss in engine power) of poor health or faulty functioning of the first CNG system 202e.

In one embodiment, first voice data (i.e., feedback) indicative of an assessment of the functioning of the first CNG system 202e may be communicated by the first driver to the application server 110 by way of the first telematics device 104a. For example, the first voice data may include a speech message recorded by the first driver, indicating a loss in power while driving the first vehicle 102a. In another embodiment, an assessment of the functioning of the first CNG system 202e may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first CNG system 202e is "below par", "bad", or "very bad", the processing circuitry 402 may communicate a message to the first telematics device 104a, requesting the first driver to visit the maintenance center 106 for servicing the first CNG system 202e.

Based on the message, the first vehicle 102a may be taken by the first driver to the maintenance center 106 for servicing. Following a servicing of the first CNG system 202e, the maintenance system 120 in the maintenance center 106 may communicate corresponding one or more service logs to the maintenance database 108 for storing therein. The service logs may indicate repair or replacement of one or more internal components of the first CNG system 202e. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first CNG system 202e) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first CNG system 202e is "below par", "bad", or "very bad" and the corresponding service data indicates the repair and/or the replacement of the one or more internal components of the first CNG system 202e, the machine learning engine 406 tags the output as a true negative.

If the deciphered speech message indicates that the functioning of the first CNG system 202e is "good", the processing circuitry 402 may or may not communicate, to the first telematics device 104a, a message requesting the first driver to visit the maintenance center 106 for servicing the first CNG system 202e. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first CNG system 202e, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first CNG system 202e prior to the servicing, the machine learning engine 406 may tag the output as a true negative. If the corresponding service data indicates a good or healthy functioning of the first CNG system 202e prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the fifth plurality of features 1204), as described in the foregoing description of FIG. 5.

In another example, the classifier 412 may determine a "27%" probability of the health status of the first CNG system 202e being bad. Since the determined probability "27%" is less than the preset probability threshold (e.g., "40%"), the health status of the first CNG system 202e is classified as good. In other words, the classifier 412 determines that there is a "73%" probability that the health status of the first CNG system 202e is good. In a non-limiting example, no action may be taken by the application server 110 based on the determination. However, in another non-limiting example, the processing circuitry 402 may communicate a notification to the first telematics device 104a, requesting the first driver for first voice data indicative of an assessment of a functioning of the first CNG system 202e. The first voice data (i.e., feedback), indicative of the assessment of the functioning of the first CNG system 202e, may be communicated by the first driver to the application server 110. If the first voice data is not indicative of any symptoms of poor health or faulty functioning of the first CNG system 202e, an output (i.e., the determined health status of the first CNG system 202e) of the classifier 412 may be tagged as a "true positive". If the first voice data is indicative of one or more symptoms of poor health or faulty functioning of the first CNG system 202e, the output of the classifier 412 may be tagged as a "false positive". Further, if the first voice data is indicative of one or more symptoms of faulty functioning of the first CNG system 202e, the processing circuitry 402 may communicate a message to the first telematics device 104a. The message may be a request to the first driver to take the first vehicle 102a to the maintenance center 106 for servicing the first CNG system 202e. Based on the tagging of the output (i.e., a result of the validation of the output) as a true positive or a false positive, the machine learning engine 406 may re-train the classifier 412 (e.g., update the weights of the fifth plurality of features 1204), using the reinforcement learning techniques for improving the accuracy of the classifier 412.

In a scenario where the determined health status of the first CNG system 202e is good, the classifier 412 may further determine a fifth RUL of the first CNG system 202e (as described in the foregoing description of FIG. 5). For example, the classifier 412 may determine that there is a "60%" chance of the first CNG system 202e turning faulty after 3,500 Km. In other words, there is a "60%" chance of the first CNG system 202e experiencing bad health (i.e., requiring repair or replacement) after 3,500 Km. Based on the determined fifth RUL, the classifier 412 may classify the determined fifth RUL as a bad RUL.

The machine learning engine 406 may employ the one or more model interpretability techniques, to identify a set of factors that have influenced the classifier 412 in determining the fifth RUL. Based on the determined fifth RUL, the processing circuitry 402 may schedule a CNG system service session for the first CNG system 202e to prevent the health status (i.e., good health status) of the first CNG system 202e from deteriorating. The processing circuitry 402 may communicate, to the first telematics device 104a, a notification indicative of the determined fifth RUL and the scheduled CNG system service session. The first vehicle 102a may be taken by the first driver to the maintenance center 106 at a scheduled time for the scheduled CNG system service session based on the notification.

Following a servicing of the first CNG system 202e, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining an RUL of a CNG system. It will be apparent to those of skill in the art that a health status or an RUL of a CNG system in any vehicle (e.g., the second vehicle 102b or any other vehicle) may be determined in a similar manner.

Figure 14:
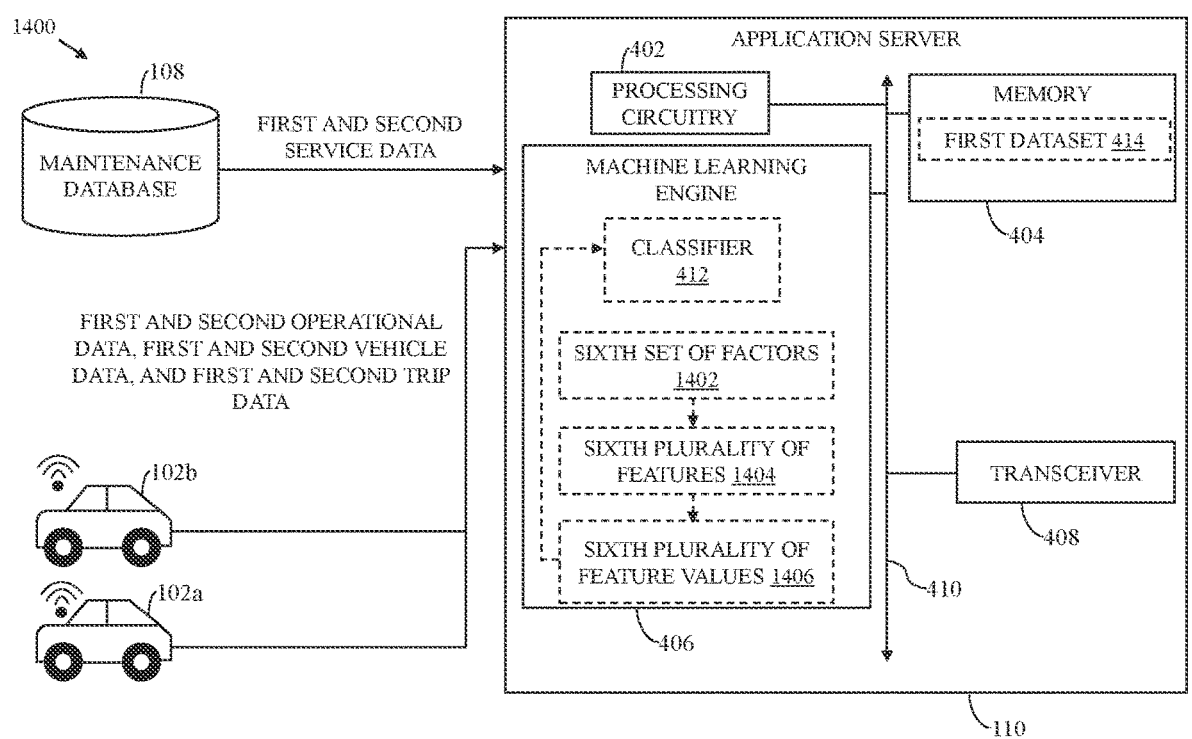
FIG. 14 is a block diagram that illustrates an exemplary scenario for training a classifier for predictive maintenance of a fuel injection system in a vehicle, in accordance with an exemplary embodiment of the disclosure.

FIG. 14 is a block diagram 1400 that illustrates an exemplary scenario for the training the classifier 412 for predictive maintenance of a fuel injection system in a vehicle, in accordance with an exemplary embodiment of the disclosure. FIG. 14 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 14 is explained in conjunction with FIGS. 1A and 3F.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select a sixth set of factors 1402. Each factor of the sixth set of factors 1402 may have a causal relationship (e.g., direct causal relationship or indirect causal relationship) or a high degree of correlation with a health status of a fuel injection system in a vehicle.

In a non-limiting example, the sixth set of factors 1402 may include, but are not limited to, a health of a fuel filter, a health of a fuel accumulator, a health of a set of fuel injectors, a health of a fuel distributor, a health of an engine, or a health of a set of spark plugs. The sixth set of factors 1402 may further include, a vehicle age, a vehicle model, a distance travelled (mileage), a driver behavior or a driving style of a driver, an ambient temperature, a level of humidity, a level of atmospheric pressure, an AQI (i.e., a level of air pollution), or the like. It will be apparent to those of skill in the art that factors included in the sixth set of factors 1402 are merely exemplary and should not be construed as a limitation of the disclosure. In an actual implementation, the sixth set of factors 1402 may include any number of factors and any type of factor without deviating from the scope of the disclosure. In some embodiments, the machine learning engine 406 may filter the first dataset 414 based on the sixth set of factors 1402 to obtain a filtered first dataset 414. The filtered first dataset 414 may include only data that corresponds to the sixth set of factors 1402.

In an exemplary embodiment, the machine learning engine 406 may determine, using the feature engineering techniques, a sixth plurality of features 1404 associated with the selected sixth set of factors 1402. The machine learning engine 406 may determine the sixth plurality of features 1404 by processing and analyzing the filtered first dataset 414 based on the selected sixth set of factors 1402. The sixth plurality of features 1404 may include one or more features associated with each factor of the sixth set of factors 1402. Each feature of the sixth plurality of features 1404 may be determined such that the feature captures a change, a trend, or a pattern in a value of a corresponding factor (of the sixth set of factors 1402) across various time periods (e.g., days, weeks, months, years, or the like) over the first time-interval.

For example, a first feature of the sixth plurality of features 1404 may correspond to a cumulative or total distance travelled by a vehicle prior to a fuel injection system service session. A second feature of the sixth plurality of features 1404 may correspond to an age of a vehicle prior to a fuel injection system service session. A third feature of the sixth plurality of features 1404 may correspond to an average distance travelled by a vehicle between consecutive fuel injection system service sessions.

A fourth feature of the sixth plurality of features 1404 may correspond to a moving average of a number of ignitions of a vehicle over a time period prior to a fuel injection system service session. A fifth feature of the sixth plurality of features 1404 may correspond to an average speed of a vehicle prior to a fuel injection system service session. A sixth feature of the sixth plurality of features 1404 may correspond to a maximum speed of a vehicle prior to a fuel injection system service session.

A seventh feature of the sixth plurality of features 1404 may correspond to an average temperature of one or more geographical locations associated with a vehicle. An eighth feature of the sixth plurality of features 1404 may correspond to an average humidity of one or more geographical locations associated with a vehicle. A ninth feature of the sixth plurality of features 1404 may correspond to an average atmospheric pressure of one or more geographical locations associated with a vehicle. A tenth feature of the sixth plurality of features 1404 may correspond to an average AQI of one or more geographical locations associated with a vehicle.

An eleventh feature of the sixth plurality of features 1404 may correspond to a cumulative sum of instances of generation of one more DTCs (e.g., "P0300", "P0301", "P0302", "P0303", or "P0304") in a vehicle over a time period prior to a fuel injection system service session. In a non-limiting example, the one or more DTCs may indicate misfiring of one or more cylinders in a vehicle. A twelfth feature of the sixth plurality of features 1404 may correspond to a moving average of a number of instances of generation of the one or more DTCs in a vehicle over a time period (e.g., 10 days, 30 days, 45 days, or the like) prior to a fuel injection system service session. A thirteenth feature of the sixth plurality of features 1404 may correspond to a standard deviation of a number of instances of generation of the one or more DTCs in a vehicle over a time period (e.g., 10 days, 30 days, 45 days, or the like) prior to a fuel injection system service session. The sixth plurality of features 1404 may further include other features corresponding to other DTCs that are pertinent to determination of health status of a fuel injection system.

A fourteenth feature of the sixth plurality of features 1404 may correspond to a level of wear and tear on an air filter (i.e., a health of the air filter) of a vehicle prior to a fuel injection system service session. A fifteenth feature of the sixth plurality of features 1404 may correspond to a level of wear and tear on an engine (i.e., a health of the engine) of a vehicle prior to a fuel injection system service session. A sixteenth feature of the sixth plurality of features 1404 may correspond to a level of wear and tear on a set of spark plugs (i.e., a health of the set of spark plugs) of a vehicle prior to a fuel injection system service session. In a non-limiting example, a health (i.e., a level of wear and tear) of mechanical or electromechanical components such as the air filter (e.g., the first air filter 308*h*), an engine (e.g., the first engine 308*a*), a set of spark plugs (e.g., the first set of spark plugs 308*o*, or the like may be quantified by way of service data of a corresponding vehicle (e.g., the first and second service data of the first vehicle 102*a*). In another non-limiting example, the health of the mechanical or electromechanical components may be quantified by way of sensor data or one or more DTCs generated by a corresponding ECU.

The sixth plurality of features 1404 listed above should not be construed as limitations to the present disclosure. Each factor of the sixth set of factors 1402 may be associated with one or more features. The sixth plurality of features 1404 may include any type of feature and any number of features without deviating from the scope of the disclosure.

In one embodiment, each feature of the sixth plurality of features 1404 may be assigned a weight corresponding to a strength of a relationship of correlation or causation between the feature and a health status of a fuel injection system.

On determining the sixth plurality of features 1404, the machine learning engine 406 processes the filtered first dataset 414 to determine a sixth plurality of feature values 1406. For determining the sixth plurality of feature values 1406, the machine learning engine 406 may determine, for each vehicle of the plurality of vehicles 102, a feature value for each of the sixth plurality of features 1404 (as described in the foregoing description of FIG. 4). The machine learning engine 406 may determine the sixth plurality of feature values 1406 for the sixth plurality of features 1404. On determining the sixth plurality of feature values 1406, the machine learning engine 406 may initiate a training phase of the classifier 412.

The machine learning engine 406 may train the classifier 412 for determining a health status of a fuel injection system. The training of the classifier 412 may be based on the sixth plurality of feature values 1406 and the weight assigned to each feature of the sixth plurality of features 1404. In other words, the sixth plurality of feature values 1406 and the weight assigned to each feature of the sixth plurality of features 1404 constitute a sixth training dataset for training the classifier 412. Methods of training the classifier 412 on the sixth training dataset to determine a health status of a fuel injection system are well known to those of skill in the art. In the current embodiment, for the sake of brevity, the sixth training dataset has been shown to correspond to a sample size of two (i.e., the first and second vehicles 102*a* and 102*b*). However, in an actual implementation, the sixth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the sixth training dataset, to determine an RUL of a fuel injection system in a vehicle and classify the determined RUL as one of a good RUL, a bad RUL, a very bad RUL, or the like.

Figure 15:
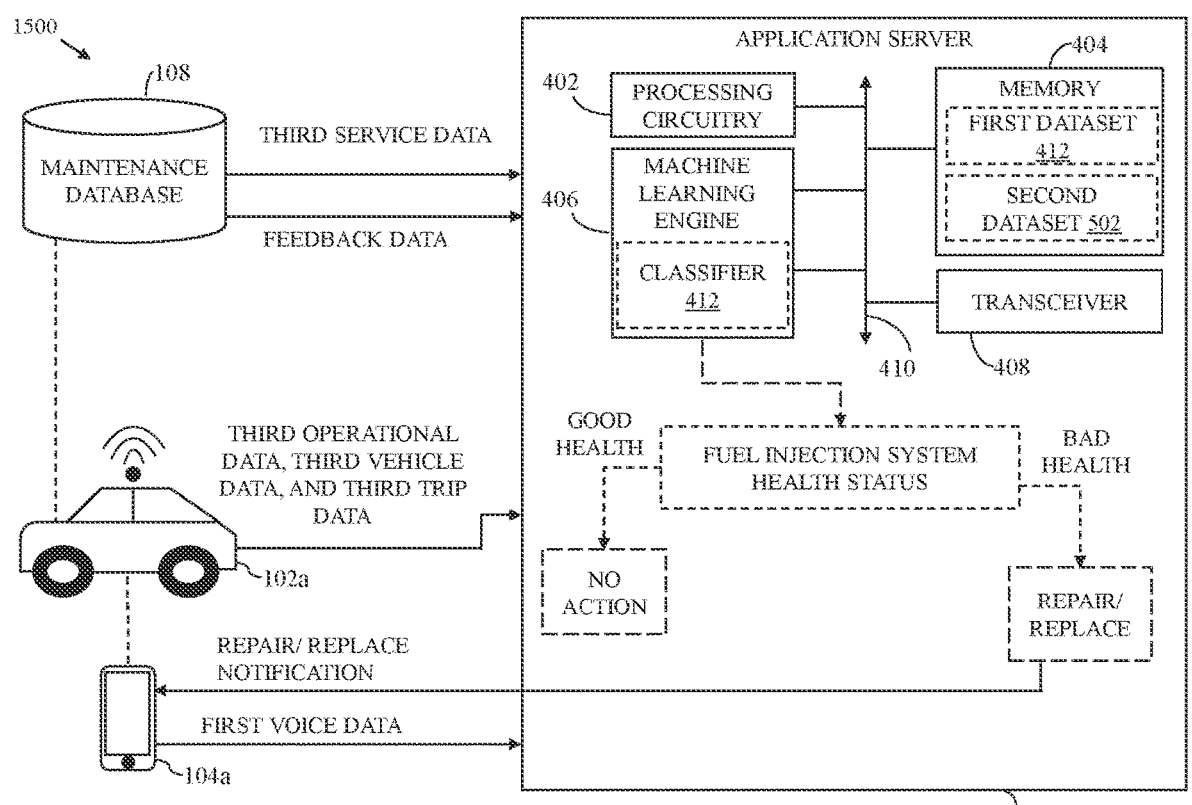
FIG. 15 is a block diagram that illustrates determination of a health status of a fuel injection system in the first vehicle, in accordance with an exemplary embodiment of the disclosure.

FIG. 15 is a block diagram 1500 that illustrates determination of a health status of the first fuel injection system 202*f*, in accordance with an exemplary embodiment of the disclosure. FIG. 15 is explained in conjunction with FIGS. 1A and 14. In one embodiment, the processing circuitry 402 collects over the second time-interval, the second dataset 502 (as described in the foregoing description of FIG. 5). A portion of the second dataset 502 (e.g., the third operational data, the third vehicle data, and the third trip data) may be collected by way of the first telematics device 104*a*, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the sixth plurality of features 1404 (as described in the foregoing description of FIG. 5). Based on the data determined from the second dataset 502, the classifier 412 may determine a health status of the first fuel injection system 202*f*. In other words, the classifier 412 determines whether the first fuel injection system 202*f* is functioning properly or not.

In a non-limiting example, the classifier 412 determines a probability (e.g., "60%") that the first fuel injection system 202*f* is currently faulty (i.e., health status is bad). If the probability (e.g. "60%") associated with the determination is greater than or equal to a preset probability threshold (e.g., "30%"), the health status of the first fuel injection system 202*f* is classified as bad. If the probability (e.g. "60%")

associated with the determination is less than the preset probability threshold (e.g., "30%"), the health status of the first fuel injection system 202f is classified as good.

The machine learning engine 406 may employ the one or more model interpretability techniques, to identify a set of factors that have influenced the classifier 412 in determining faulty functioning of the first fuel injection system 202f (i.e., "60%" probability of the health status of the first fuel injection system 202f being bad). Based on the determined health status of the first fuel injection system 202f, the processing circuitry 402 may communicate, by way of the transceiver 408, a notification to the first telematics device 104a. The notification may be indicative of the determined health status of the first fuel injection system 202f. Further, the notification may include a message requesting the first driver to assess a functioning of the first fuel injection system 202f (as described in the foregoing description of FIG. 5). In other words, the processing circuitry 402 may request the first driver to assess whether the first fuel injection system 202f displays an onset of one or more symptoms of poor health or faulty functioning of the first fuel injection system 202f. The one or more symptoms may include, but are not limited to, rough acceleration of the first vehicle 102a, a glowing of a "check engine" light in an instrument cluster of the first vehicle 102a, rough idling of the first vehicle 102a, or the like.

In one embodiment, first voice data (i.e., feedback) indicative of an assessment of the functioning of the first fuel injection system 202f may be communicated by the first driver to the application server 110 by way of the first telematics device 104a. For example, the first voice data may include a speech message recorded by the first driver, indicating rough acceleration of the first vehicle 102a. In another embodiment, an assessment of the functioning of the first fuel injection system 202f may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first fuel injection system 202f is "below par", "bad", or "very bad", the processing circuitry 402 may communicate a message to the first telematics device 104a, requesting the first driver to visit the maintenance center 106 for servicing the first fuel injection system 202f.

Based on the message, the first vehicle 102a may be taken by the first driver to the maintenance center 106 for servicing. Following a servicing of the first fuel injection system 202f, the maintenance system 120 in the maintenance center 106 may communicate corresponding one or more service logs to the maintenance database 108 for storing therein. The service logs may indicate repair or replacement of one or more internal components of the first fuel injection system 202f. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first fuel injection system 2020 of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first fuel injection system 202f is "below par", "bad", or "very bad" and the corresponding service data indicates the repair and/or the replacement of the one or more internal components of the first fuel injection system 202f, the machine learning engine 406 tags the output as a true negative.

If the deciphered speech message indicates that the functioning of the first fuel injection system 202f is "good", the processing circuitry 402 may or may not communicate, to the first telematics device 104a, a message requesting the first driver to visit the maintenance center 106 for servicing the first fuel injection system 202f. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first fuel injection system 202f, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first fuel injection system 202f prior to the servicing, the machine learning engine 406 may tag the output as a true negative. If the corresponding service data indicates a good or healthy functioning of the first fuel injection system 202f prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the sixth plurality of features 1404), as described in the foregoing description of FIG. 5.

In another example, the classifier 412 may determine a "27%" probability of the health status of the first fuel injection system 202f being bad. Since the determined probability (i.e., "27%") is less than the preset probability threshold (e.g., "40%"), the health status of the first fuel injection system 202f is classified as good. In other words, the classifier 412 determines that there is a "73%" probability that the health status of the first fuel injection system 202f is good. In a non-limiting example, no action may be taken by the application server 110 based on the determination. However, in another non-limiting example, the processing circuitry 402 may communicate a notification to the first telematics device 104a, requesting the first driver for first voice data (i.e., feedback) indicative of an assessment of a functioning of the first fuel injection system 202f. The first voice data (i.e., feedback), indicative of the assessment of the functioning of the first fuel injection system 202*f*, may be communicated by the first driver to the application server 110. If the first voice data is not indicative of any symptoms of poor health or faulty functioning of the first fuel injection system 202*f*, an output (i.e., the determined health status of the first fuel injection system 202*0* of the classifier 412 may be tagged as a "true positive". If the first voice data is indicative of one or more symptoms of poor health or faulty functioning of the first fuel injection system 202*f*, the output of the classifier 412 may be tagged as a "false positive". Further, if the first voice data is indicative of one or more symptoms of faulty functioning of the first fuel injection system 202*f*, the processing circuitry 402 may communicate a message to the first telematics device 104*a*. The message may be a request to the first driver to take the first vehicle 102*a* to the maintenance center 106 for servicing the first fuel injection system 202*f*. Based on the tagging of the output (i.e., a result of validation of the output) as a true positive or a false positive, the machine learning engine 406 may re-train the classifier 412 (e.g., update the weights of the sixth plurality of features 1404), using the reinforcement learning techniques for improving the accuracy of the classifier 412.

In a scenario where the determined health status of the first fuel injection system 202*f* is good, the classifier 412 may further determine a sixth RUL of the first fuel injection system 202*f* (as described in the foregoing description of FIG. 5). For example, the classifier 412 may determine that there is a "60%" chance of the first fuel injection system 202*f* turning faulty after 3,500 Km. In other words, there is a "60%" chance of the first fuel injection system 202*f* experiencing bad health (i.e., requiring repair or replacement) after 3,500 Km. Based on the determined sixth RUL, the classifier 412 may classify the determined sixth RUL as a bad RUL.

The machine learning engine 406 may employ the one or more model interpretability techniques, to identify a set of factors that have influenced the classifier 412 in determining the sixth RUL. Based on the determined sixth RUL, the processing circuitry 402 may schedule a fuel injection system service session for the first fuel injection system 202*f* to prevent the health status (i.e., good health status) of the first fuel injection system 202*f* from deteriorating. The processing circuitry 402 may communicate, to the first telematics device 104*a*, a notification indicative of the determined sixth RUL and the scheduled fuel injection system service session. Based on the notification, the first vehicle 102*a* may be taken by the first driver to the maintenance center 106 at a scheduled time for the scheduled fuel injection system service session.

Following a servicing of the first fuel injection system, the maintenance system 120 may communicate one or more service logs to the maintenance database 108 for storing therein. The maintenance database 108 may communicate corresponding service data (i.e., feedback) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining an RUL of a fuel injection system. It will be apparent to those of skill in the art that a health status or an RUL of a fuel injection system in any vehicle (e.g., the second vehicle 102*b* or any other vehicle) may be determined in a similar manner.

Figure 16:
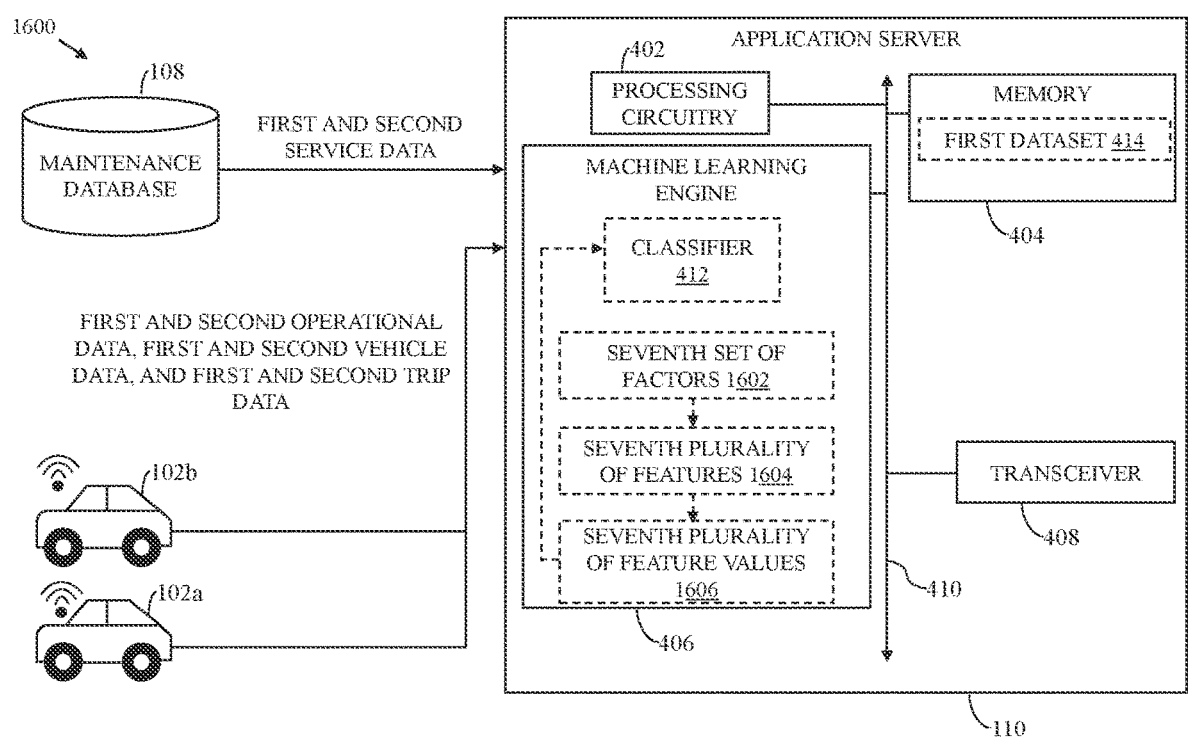
FIG. 16 is a block diagram that illustrates an exemplary scenario for training a classifier for predictive maintenance of a turbocharger in a vehicle, in accordance with an exemplary embodiment of the disclosure.

FIG. 16 is a block diagram 1600 that illustrates an exemplary scenario for training the classifier 412 for predictive maintenance of a turbocharger in a vehicle, in accordance with an exemplary embodiment of the disclosure. FIG. 16 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 16 is explained in conjunction with FIGS. 1A and 3G.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select a seventh set of factors 1602. Each factor of the seventh set of factors 1602 may have a causal relationship (e.g., direct causal relationship or indirect causal relationship) or a high degree of correlation with a health status of a turbocharger in a vehicle (e.g., the first and second vehicles 102*a* and 102*b*).

In a non-limiting example, the sixth set of factors 1402 may include, but are not limited to, a health of an air filter, a health of an oil filter, a health of an engine, a health of an oil feed line, a health of an oil sump, a health of a set of spark plugs, a level of coolant in a coolant tank, a health of a radiator, or a level of engine oil. The seventh set of factors 1602 may further include, a vehicle age, a vehicle model, a distance travelled (mileage), a driver behavior or a driving style of a driver, an ambient temperature, a level of humidity, an AQI, a level of atmospheric pressure, a number of ignitions, or the like. It will be apparent to those of skill in the art that factors included in the seventh set of factors 1602 are merely exemplary and should not be construed as a limitation of the disclosure. In an actual implementation, the seventh set of factors 1602 may include any number of factors and any type of factor without deviating from the scope of the disclosure. In some embodiments, the machine learning engine 406 may filter the first dataset 414 based on the seventh set of factors 1602 to obtain a filtered first dataset 414. The filtered first dataset 414 may include only data that corresponds to the seventh set of factors 1602.

In an exemplary embodiment, the machine learning engine 406 may determine, using the feature engineering techniques, a seventh plurality of features 1604 associated with the selected seventh set of factors 1602. The machine learning engine 406 may determine the seventh plurality of features 1604 by processing and analyzing the filtered first dataset 414 based on the selected seventh set of factors 1602. The seventh plurality of features 1604 may include one or more features associated with each factor of the seventh set of factors 1602. Each feature of the seventh plurality of features 1604 may be determined such that the feature captures a change, a trend, or a pattern in a value of a corresponding factor (of the seventh set of factors 1602) across various time periods (e.g., days, weeks, months, years, or the like) over the first time-interval.

For example, a first feature of the seventh plurality of features 1604 may correspond to a cumulative or total distance travelled by a vehicle prior to a turbocharger service session. A second feature of the seventh plurality of features 1604 may correspond to an age of a vehicle prior to a turbocharger service session. A third feature of the seventh plurality of features 1604 may correspond to a moving average of distances travelled by a vehicle between consecutive turbocharger service sessions.

A fourth feature of the seventh plurality of features 1604 may correspond to a rolling mean of a number of ignitions of a vehicle prior to a turbocharger service session. A fifth feature of the seventh plurality of features 1604 may correspond to an average speed of a vehicle prior to a turbocharger service session.

A seventh feature of the seventh plurality of features 1604 may correspond to an average temperature of one or more geographical locations associated with a vehicle. An eighth feature of the seventh plurality of features 1604 may correspond to an average humidity of one or more geographical locations associated with a vehicle. A ninth feature of the seventh plurality of features 1604 may correspond to an average atmospheric pressure of one or more geographical locations associated with a vehicle. A tenth feature of the seventh plurality of features 1604 may correspond to an average AQI of one or more geographical locations associated with a vehicle.

An eleventh feature of the seventh plurality of features 1604 may correspond to a cumulative sum of a number of instances of generation of one more DTCs (e.g., "P0300", "P0301", "P0302", "P0303", or "P0304") in a vehicle over a time period (e.g., 10 days, 30 days, 45 days, or the like) prior to a turbocharger service session. In a non-limiting example, the one or more DTCs may indicate misfiring of one or more cylinders in a vehicle. A twelfth feature of the seventh plurality of features 1604 may correspond to a moving average of a number of instances of generation of the one or more DTCs in a vehicle over a time period (e.g., 10 days, 30 days, 45 days, or the like) prior to a turbocharger service session. A thirteenth feature of the seventh plurality of features 1604 may correspond to a standard deviation of a number of instances of generation of the one or more DTCs in a vehicle over a time period (e.g., 10 days, 30 days, 45 days, or the like) prior to a turbocharger service session. A fourteenth feature of the seventh plurality of features 1604 may correspond to a moving average of a number of instances of generation of the one or more DTCs in a vehicle over a time period (e.g., 10 days, 30 days, 45 days, or the like) prior to a turbocharger service session. The seventh plurality of features 1604 may further include other features corresponding to other DTCs that are pertinent to determination of a health status of a turbocharger.

A fifteenth feature of the seventh plurality of features 1604 may correspond to a level of wear and tear on an oil filter (i.e., a health of the oil filter) of a vehicle prior to a turbocharger service session. A sixteenth feature of the seventh plurality of features 1604 may correspond to a level of wear and tear on an engine (i.e., a health of the engine) of a vehicle prior to a turbocharger service session. A seventeenth feature of the seventh plurality of features 1604 may correspond to a level of wear and tear on a set of spark plugs (i.e., a health of the set of spark plugs) of a vehicle prior to a turbocharger service session. An eighteenth feature of the seventh plurality of features 1604 may correspond to a level of wear and tear on an oil sump (i.e., a health of the oil sump) of a vehicle prior to a turbocharger service session. A nineteenth feature of the seventh plurality of features 1604 may correspond to a level of wear and tear on an oil feed line (i.e., a health of the oil feed line) of a vehicle prior to a turbocharger service session. A twentieth feature of the seventh plurality of features 1604 may correspond to a level of wear and tear on a radiator (i.e., a health of the radiator) of a vehicle prior to a turbocharger service session. In a non-limiting example, a health (i.e., a level of wear and tear) of mechanical or electromechanical components such as the oil sump (e.g., the first oil sump 308*d*), an engine (e.g., the first engine 308*a*), a set of spark plugs (e.g., the first set of spark plugs 308*0*, the oil feed line (e.g., the first oil feed line 308*c*), or the like may be quantified by way of service data of a corresponding vehicle (e.g., the first and second service data of the first vehicle 102*a*). In another non-limiting example, the health of the mechanical or electromechanical components may be quantified by way of sensor data or one or more DTCs generated by a corresponding ECU.

The seventh plurality of features 1604 listed above should not be construed as limitations to the present disclosure. The seventh plurality of features 1604 may include any type of feature and any number of features without deviating from the scope of the disclosure. Each factor of the seventh set of factors 1602 may be associated with one or more features.

In one embodiment, each feature of the seventh plurality of features 1604 may be assigned a weight corresponding to a strength of a relationship of correlation or causation between the feature and a health status of a turbocharger. On determining the seventh plurality of features 1604, the machine learning engine 406 processes the filtered first dataset 414 to determine a seventh plurality of feature values 1606. For determining the seventh plurality of feature values 1606, the machine learning engine 406 may determine, for each vehicle of the plurality of vehicles 102, a feature value for each of the seventh plurality of features 1604 (as described in the foregoing description of FIG. 4). The machine learning engine 406 may determine the seventh plurality of feature values 1606 for the seventh plurality of features 1604. On determining the seventh plurality of feature values 1606, the machine learning engine 406 may initiate a training phase of the classifier 412.

The machine learning engine 406 may train the classifier 412 for determining a health status of a turbocharger. The training of the classifier 412 may be based on the seventh plurality of feature values 1606 and the weight assigned to each feature of the seventh plurality of features 1604. In other words, the seventh plurality of feature values 1606 and the weight assigned to each feature of the seventh plurality of features 1604 constitute a seventh training dataset for training the classifier 412. Methods of training the classifier 412 on the seventh training dataset to determine a health status of a turbocharger are well known to those of skill in the art. In the current embodiment, for the sake of brevity, the seventh training dataset has been shown to correspond to a sample size of two (i.e., the first and second vehicles 102*a* and 102*b*). However, in an actual implementation, the seventh training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the seventh training dataset, to determine an RUL of a turbocharger in a vehicle and classify the determined RUL as one of a good RUL, a bad RUL, a very bad RUL, or the like.

Figure 17:
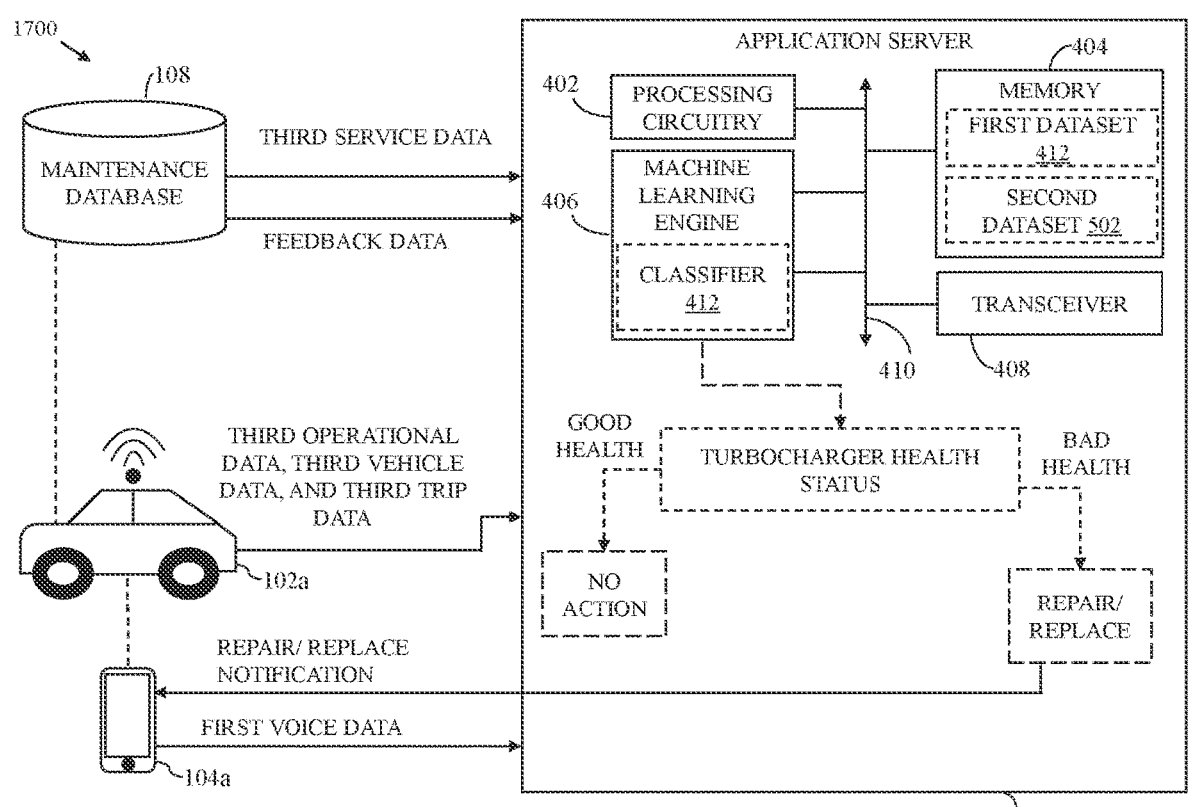
FIG. 17 is a block diagram that illustrates determination of a health status of a turbocharger in the first vehicle, in accordance with an exemplary embodiment of the disclosure.

FIG. 17 is a block diagram 1700 that illustrates determination of a health status of the first turbocharger 202*g*, in accordance with an exemplary embodiment of the disclosure. FIG. 17 is explained in conjunction with FIGS. 1A and 16. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104a, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the seventh plurality of features 1604 (as described in the foregoing description of FIG. 5).

Based on the data determined from the second dataset 502, the classifier 412 may determine a health status of the first turbocharger 202g. In other words, the classifier 412 determines whether the first turbocharger 202g is functioning properly or not. In a non-limiting example, the classifier 412 determines a probability (e.g., "60%") that the first turbocharger 202g is currently faulty (i.e., health status is bad). If the probability (e.g. "60%") associated with the determination is greater than or equal to a preset probability threshold (e.g., "30%"), the health status of the first turbocharger 202g is classified as bad. If the probability (e.g. "60%") associated with the determination is less than the preset probability threshold (e.g., "30%"), the health status of the first turbocharger 202g is classified as good.

The machine learning engine 406 may employ the one or more model interpretability techniques, to identify a set of factors that have influenced the classifier 412 in determining faulty functioning of the first turbocharger 202e (i.e., "60%" probability of the health status of the first turbocharger 202g being bad). Based on the determined health status of the first turbocharger 202g, the processing circuitry 402 may communicate, by way of the transceiver 408, a notification to the first telematics device 104a. The notification may be indicative of the determined health status of the first turbocharger 202g. Further, the notification may include a message requesting the first driver to assess a functioning of the first turbocharger 202g (as described in the foregoing description of FIG. 5). In other words, the processing circuitry 402 may request the first driver to assess whether the first turbocharger 202g displays an onset of one or more symptoms of poor health or faulty functioning of the first turbocharger 202g. The one or more symptoms may include, but are not limited to, noisy operation of the first turbocharger 202g, a glowing of a "check engine" light in an instrument cluster in the first vehicle 102a, excessive exhaust smoke emitted by the first vehicle 102a, increased engine oil consumption in the first vehicle 102a, or the like.

In one embodiment, first voice data (i.e., feedback) indicative of an assessment of the functioning of the first turbocharger 202g may be communicated by the first driver to the application server 110 by way of the first telematics device 104a. For example, the first voice data may include a speech message recorded by the first driver, indicating noisy operation of the first turbocharger 202g. In another embodiment, an assessment of the functioning of the first turbocharger 202g may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first turbocharger 202g is "below par", "bad", or "very bad", the processing circuitry 402 may communicate a message to the first telematics device 104a, requesting the first driver to visit the maintenance center 106 for servicing the first turbocharger 202g.

Based on the message, the first vehicle 102a may be taken by the first driver to the maintenance center 106 for servicing. Following a servicing of the first turbocharger 202g, the maintenance system 120 in the maintenance center 106 may communicate corresponding one or more service logs to the maintenance database 108 for storing therein. The service logs may indicate repair or replacement of one or more internal components of the first turbocharger 202g. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first turbocharger 202g) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first turbocharger 202g is "below par", "bad", or "very bad" and the corresponding service data indicates the repair and/or the replacement of the one or more internal components of the first turbocharger 202g, the machine learning engine 406 tags the output as a true negative.

If the deciphered speech message indicates that the functioning of the first turbocharger 202g is "good", the processing circuitry 402 may or may not communicate, to the first telematics device 104a, a message requesting the first driver to visit the maintenance center 106 for servicing the first turbocharger 202g. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first turbocharger 202g, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first turbocharger 202g prior to the servicing, the machine learning engine 406 may tag the output as a true negative. If the corresponding service data indicates a good or healthy functioning of the first turbocharger 202g prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the seventh plurality of features 1604), as described in the foregoing description of FIG. 5.

In another example, the classifier 412 may determine a "27%" probability of the health status of the first turbocharger 202g being bad. Since the determined probability (i.e., "27%") is less than the preset probability threshold (e.g., "40%"), the health status of the first turbocharger 202g is classified as good. In other words, the classifier 412 determines that there is a "73%" probability that the health status of the first turbocharger 202g is good. In a non-limiting example, no action may be taken by the application server 110 based on the determination. However, in another non-limiting example, the processing circuitry 402 may communicate a notification to the first telematics device 104a, requesting the first driver for first voice data indicative of an assessment of a functioning of the first turbocharger 202g. The first voice data (i.e., feedback), indicative of the assessment of the functioning of the first turbocharger 202g, may be communicated by the first driver to the application server 110. If the first voice data is not indicative of any symptoms of poor health or faulty functioning of the first turbocharger 202g, an output (i.e., the determined health status of the first turbocharger 202g) of the classifier 412 may be tagged as a "true positive". If the first voice data is indicative of one or more symptoms of poor health or faulty functioning of the first turbocharger 202g, the output of the classifier 412 may be tagged as a "false positive". Further, if the first voice data is indicative of one or more symptoms of faulty functioning of the first turbocharger 202g, the processing circuitry 402 may communicate a message to the first telematics device 104a. The message may be a request to the first driver to take the first vehicle 102a to the maintenance center 106 for servicing the first turbocharger 202g. Based on the tagging of the output (i.e., a result of validation of the output) as a true positive or a false positive, the machine learning engine 406 may re-train the classifier 412 (e.g., update the weights of the seventh plurality of features 1604), using the reinforcement learning techniques for improving the accuracy of the classifier 412.

In a scenario where the determined health status of the first turbocharger 202g is good, the classifier 412 may further determine a seventh RUL of the first turbocharger 202g (as described in the foregoing description of FIG. 5). For example, the classifier 412 may determine that there is a "60%" chance of the first turbocharger 202g turning faulty after 5,000 Km. In other words, there is a "60%" chance of the first turbocharger 202g experiencing bad health (i.e., requiring repair or replacement) after 5,000 Km. Based on the determined seventh RUL, the classifier 412 may classify the determined seventh RUL as a good RUL.

The machine learning engine 406 may employ the one or more model interpretability techniques, to identify a set of factors that have influenced the classifier 412 in determining the seventh RUL. Based on the determined seventh RUL, the processing circuitry 402 may schedule, in the future (e.g., after the first vehicle 102a travels 3,000 Km) a turbocharger service session for the first turbocharger 202g to prevent the health status (i.e., good health status) of the first turbocharger 202g from deteriorating. The processing circuitry 402 may communicate, to the first telematics device 104a, a notification indicative of the determined seventh RUL and the scheduled turbocharger service session. Based on the notification, the first vehicle 102a may be taken by the first driver to the maintenance center 106 at a scheduled time for the scheduled turbocharger service session.

Following a servicing of the first turbocharger 202g, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining the RUL of a turbocharger. It will be apparent to those of skill in the art that a health status or an RUL of a turbocharger in any vehicle (e.g., the second vehicle 102b or any other vehicle) may be determined in a similar manner.

Figure 18:
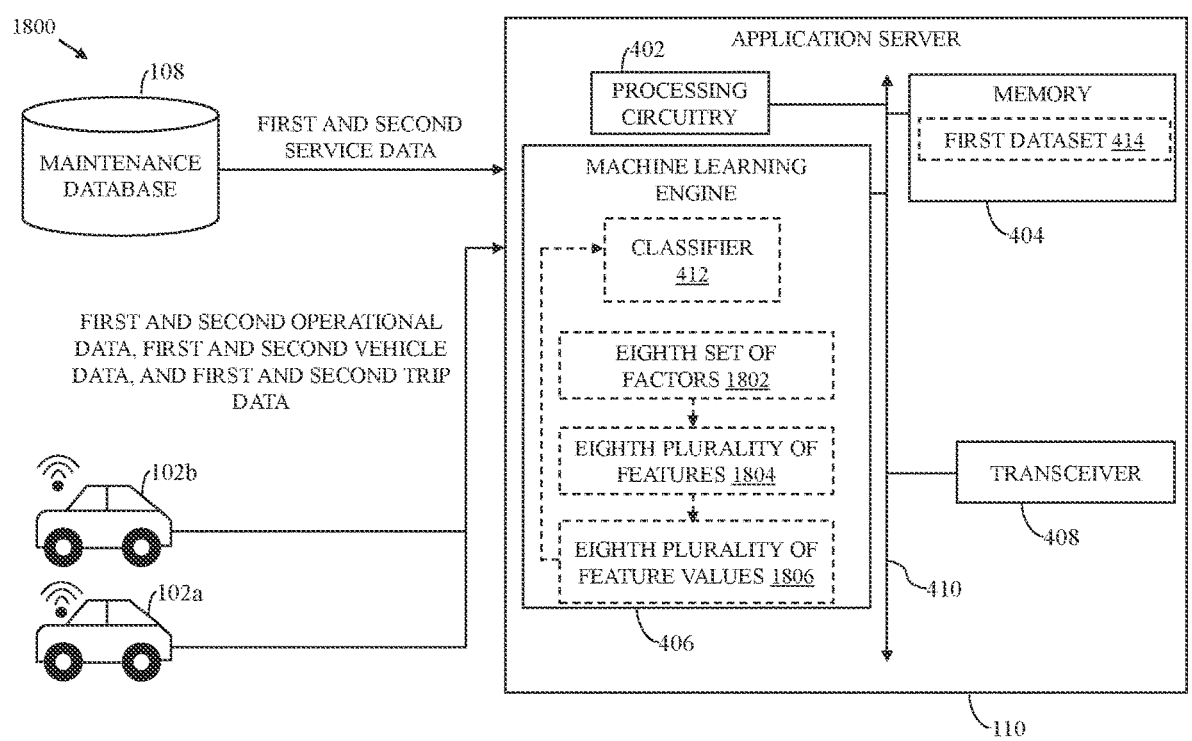
FIG. 18 is a block diagram that illustrates an exemplary scenario for training a classifier for predictive maintenance of a radiator in a vehicle, in accordance with an exemplary embodiment of the disclosure.

FIG. 18 is a block diagram 1800 that illustrates an exemplary scenario for training the classifier 412 for predictive maintenance of a radiator in a vehicle, in accordance with an exemplary embodiment of the disclosure. FIG. 18 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 18 is explained in conjunction with FIGS. 1A and 3H.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select an eighth set of factors 1802. Each factor of the eighth set of factors 1802 may have a causal relationship (e.g., direct causal relationship or indirect causal relationship) or a high degree of correlation with a health status of a radiator in a vehicle (e.g., the first and second vehicles 102a and 102b).

In a non-limiting example, the eighth set of factors 1802 may include, but is not limited to, a health of a radiator cooling fan, a health of a set of radiator mountings, a health of a water pump, a health of a thermostat, a health of a heater core, a level of coolant in a coolant tank, a health of an engine, or a health of an alternator belt. The eighth set of factors 1802 may further include, a vehicle age, a vehicle model, a distance travelled (mileage), a driver behavior or a driving style of a driver, an ambient temperature, a level of humidity, an AQI, a level of atmospheric pressure, or the like. It will be apparent to those of skill in the art that factors included in the eighth set of factors 1802 are merely exemplary and should not be construed as a limitation of the disclosure. In an actual implementation, the eighth set of factors 1802 may include any number of factors and any type of factor without deviating from the scope of the disclosure. In some embodiments, the machine learning engine 406 may filter the first dataset 414 based on the eighth set of factors 1802 to obtain a filtered first dataset 414. The filtered first dataset 414 may include only data that corresponds to the eighth set of factors 1802.

In an exemplary embodiment, the machine learning engine 406 may determine, using the feature engineering techniques, an eighth plurality of features 1804 associated with the selected eighth set of factors 1802. The machine learning engine 406 may determine the eighth plurality of features 1804 by processing and analyzing the filtered first dataset 414 based on the selected eighth set of factors 1802. The eighth plurality of features 1804 may include one or more features associated with each factor of the eighth set of factors 1802. Each feature of the eighth plurality of features 1804 may be determined such that the feature captures a change, a trend, or a pattern in a value of a corresponding factor (of the eighth set of factors 1802) across various time periods (e.g., days, weeks, months, years, or the like) over the first time-interval.

For example, a first feature of the eighth plurality of features 1804 may correspond to a cumulative or total distance travelled by a vehicle prior to a radiator service session. A second feature of the eighth plurality of features 1804 may correspond to an age of a vehicle prior to a radiator service session. A third feature of the eighth plurality of features 1804 may correspond to a moving average of distances travelled by a vehicle between consecutive radiator service sessions. A fourth feature of the eighth plurality of features 1804 may correspond to a moving average of a level of coolant in a vehicle prior to a radiator service session.

A fifth feature of the eighth plurality of features 1804 may correspond to an average temperature of one or more geographical locations associated with a vehicle. A seventh feature of the eighth plurality of features 1804 may correspond to an average humidity of one or more geographical locations associated with a vehicle. An eighth feature of the eighth plurality of features 1804 may correspond to an average atmospheric pressure of one or more geographical locations associated with a vehicle. A ninth feature of the eighth plurality of features 1804 may correspond to an average AQI of one or more geographical locations associated with a vehicle.

A tenth feature of the eighth plurality of features 1804 may correspond to a level of wear and tear on a radiator cooling fan (i.e., a health of the radiator cooling fan) in a vehicle prior to a radiator service session. An eleventh feature of the eighth plurality of features 1804 may correspond to a level of wear and tear on a set of radiator mountings (i.e., a health of the set of radiator mountings) in a vehicle prior to a radiator service session. A twelfth feature of the eighth plurality of features 1804 may correspond to a level of wear and tear in a radiator water pump (i.e., a health of the radiator water pump) in a vehicle prior to a radiator service session. A thirteenth feature of the eighth plurality of features 1804 may correspond to a level of wear and tear on a thermostat (i.e., a health of the thermostat) in a vehicle prior to a radiator service session. A fourteenth feature of the eighth plurality of features 1804 may correspond to a level of wear and tear on a heater core (i.e., a health of the heater core) in a vehicle prior to a radiator service session. In a non-limiting example, a health (i.e., a level of wear and tear) of mechanical or electromechanical components such as the radiator cooling fan (e.g., the first radiator cooling fan 316*a*), the set of radiator mountings, the radiator water pump (e.g., the first radiator water pump 316*b*), the thermostat (e.g., the first thermostat 308*g*), or the like may be quantified by way of service data of a corresponding vehicle (e.g., the first and third service data of the first vehicle 102*a*). In another non-limiting example, the health of the mechanical or electromechanical components may be quantified by way of sensor data or one or more DTCs generated by a corresponding ECU.

The eighth plurality of features 1804 listed above should not be construed as limitations to the present disclosure. Each factor of the eighth set of factors 1802 may be associated with one or more features. The eighth plurality of features 1804 may include any type of feature and any number of features without deviating from the scope of the disclosure.

In one embodiment, each feature of the eighth plurality of features 1804 may be assigned a weight corresponding to a strength of a relationship of correlation or causation between the feature and a health status of a radiator. On determining the eighth plurality of features 1804, the machine learning engine 406 processes the filtered first dataset 414 to determine an eighth plurality of feature values 1806. For determining the eighth plurality of feature values 1806, the machine learning engine 406 may determine, for each vehicle of the plurality of vehicles 102, a feature value for each of the eighth plurality of features 1804 (as described in the foregoing description of FIG. 4). The machine learning engine 406 may determine the eighth plurality of feature values 1806 for the eighth plurality of features 1804. On determining the eighth plurality of feature values 1806, the machine learning engine 406 may initiate a training phase of the classifier 412.

The machine learning engine 406 may train the classifier 412 for determining a health status of a radiator. The training of the classifier 412 may be based on the eighth plurality of feature values 1806 and the weight assigned to each feature of the eighth plurality of features 1804. In other words, the eighth plurality of feature values 1806 and the weight assigned to each feature of the eighth plurality of features 1804 constitute an eighth training dataset for training the classifier 412. Methods of training the classifier 412 on the eighth training dataset to determine a health status of a radiator are well known to those of skill in the art. In the current embodiment, for the sake of brevity, the eighth training dataset has been shown to correspond to a sample size of two (i.e., the first and second vehicles 102*a* and 102*b*). However, in an actual implementation, the eighth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the eighth training dataset, to determine an RUL of a radiator in a vehicle and classify the determined RUL as one of a good RUL, a bad RUL, a very bad RUL, or the like.

Figure 19:
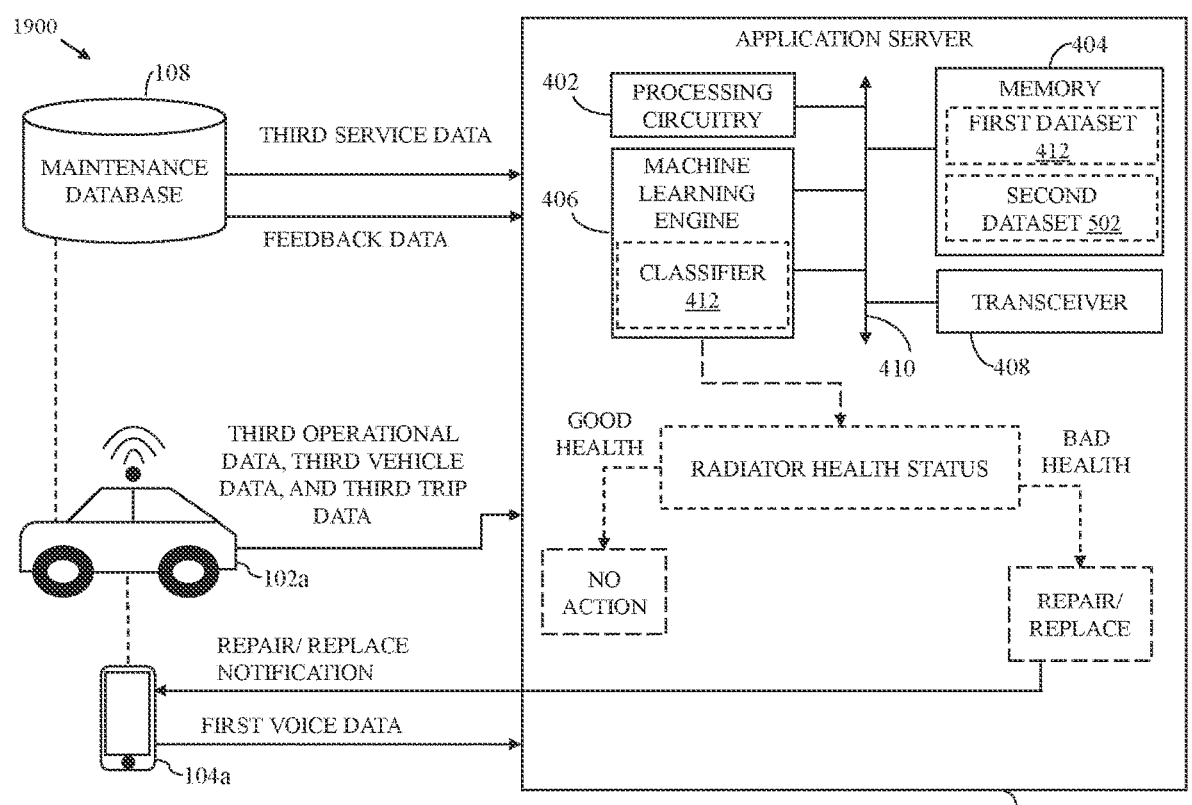
FIG. 19 is a block diagram that illustrates determination of a health status of a radiator in the first vehicle, in accordance with an exemplary embodiment of the disclosure.

FIG. 19 is a block diagram 1900 that illustrates determination of a health status of the first radiator 202*h*, in accordance with an exemplary embodiment of the disclosure. FIG. 19 is explained in conjunction with FIGS. 1A and 18. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104*a*, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the eighth plurality of features 1804 (as described in the foregoing description of FIG. 5). Based on the data determined from the second dataset 502, the classifier 412 may determine a health status of the first radiator 202h. In other words, the classifier 412 determines whether the first radiator 202h is functioning properly or not.

In a non-limiting example, the classifier 412 determines a probability (e.g., "60%") that the first radiator 202h is currently faulty (i.e., health status is bad). If the probability (e.g. "60%") associated with the determination is greater than or equal to a preset probability threshold (e.g., "30%"), the health status of the first radiator 202h is classified as bad. If the probability (e.g. "60%") associated with the determination is less than a preset probability threshold (e.g., "30%"), the health status of the first radiator 202h is classified as good.

The machine learning engine 406 may employ the one or more model interpretability techniques, to identify a set of factors that have influenced the classifier 412 in determining faulty functioning of the first radiator 202e (i.e., "60%" probability of the health status of the first radiator 202h being bad). Based on the determined health status of the first radiator 202h, the processing circuitry 402 may communicate, by way of the transceiver 408, a notification to the first telematics device 104a. The notification may be indicative of the determined health status of the first radiator 202h. Further, the notification may include a message requesting the first driver to assess a functioning of the first radiator 202h (as described in the foregoing description of FIG. 5). In other words, the processing circuitry 402 may request the first driver to assess whether the first radiator 202h displays an onset of one or more symptoms of poor health or faulty functioning of the first radiator 202h. The one or more symptoms may include, but are not limited to, overheating of the first engine 308a, change in a color of the coolant in the first coolant tank 308e, or the like.

In one embodiment, first voice data (i.e., feedback) indicative of an assessment of the functioning of the first radiator 202h may be communicated by the first driver to the application server 110 by way of the first telematics device 104a. For example, the first voice data may include a speech message recorded by the first driver, indicating overheating of the first engine 308a. In another embodiment, an assessment of the functioning of the first radiator 202h may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first radiator 202h is "below par", "bad", or "very bad", the processing circuitry 402 may communicate a message to the first telematics device 104a, requesting the first driver to visit the maintenance center 106 for servicing the first radiator 202h.

Based on the message, the first vehicle 102a may be taken by the first driver to the maintenance center 106 for servicing. Following a servicing of the first radiator 202h, the maintenance system 120 in the maintenance center 106 may communicate corresponding one or more service logs to the maintenance database 108 for storing therein. The service logs may indicate repair or replacement of one or more internal components of the first radiator 202h. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first radiator 202h) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first radiator 202h is "below par", "bad", or "very bad" and the corresponding service data indicates the repair and/or the replacement of the one or more internal components of the first radiator 202h, the machine learning engine 406 tags the output as a true negative.

If the deciphered speech message indicates that the functioning of the first radiator 202h is "good", the processing circuitry 402 may or may not communicate, to the first telematics device 104a, a message requesting the first driver to visit the maintenance center 106 for servicing the first radiator 202h. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first radiator 202h, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first radiator 202h prior to the servicing, the machine learning engine 406 may tag the output as a true negative. If the corresponding service data indicates a good or healthy functioning of the first radiator 202h prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the eighth plurality of features 1804), as described in the foregoing description of FIG. 5.

In another example, the classifier 412 may determine a "27%" probability of the health status of the first radiator 202*h* being bad. Since the determined probability is less than the preset probability threshold (e.g., "40%"), the health status of the first radiator 202*h* is classified as good. In other words, the classifier 412 determines that there is a "73%" probability that the health status of the first radiator 202*h* is good. In a non-limiting example, no action may be taken by the application server 110 based on the determination. However, in another non-limiting example, the processing circuitry 402 may communicate a notification to the first telematics device 104*a*, requesting the first driver for first voice data (i.e., feedback) indicative of an assessment of a functioning of the first radiator 202*h*. The first voice data (i.e., feedback), indicative of the assessment of the functioning of the first radiator 202*h*, may be communicated by the first driver to the application server 110. If the first voice data is not indicative of any symptoms of poor health or faulty functioning of the first radiator 202*h*, an output (i.e., the determined health status of the first radiator 202*h*) of the classifier 412 may be tagged as a "true positive". If the first voice data is indicative of one or more symptoms of poor health or faulty functioning of the first radiator 202*h*, the output of the classifier 412 may be tagged as a "false positive". Further, if the first voice data is indicative of one or more symptoms of faulty functioning of the first radiator 202*h*, the processing circuitry 402 may communicate a message to the first telematics device 104*a*. The message may be a request to the first driver to take the first vehicle 102*a* to the maintenance center 106 for servicing the first radiator 202*h*. Based on the tagging of the output (i.e., a result of validation of the output) as a true positive or a false positive, the machine learning engine 406 may re-train the classifier 412 (e.g., update the weights of the eighth plurality of features 1804), using the reinforcement learning techniques for improving the accuracy of the classifier 412.

The machine learning engine 406 may employ the one or more model interpretability techniques, to identify a set of factors that have influenced the classifier 412 in determining the eighth RUL. Based on the determined eighth RUL, the processing circuitry 402 may schedule, in the future (e.g., after the first vehicle 102*a* travels 3,000 Km) a radiator service session for the first radiator 202*h* to prevent the health status (i.e., good health status) of the first radiator 202*h* from deteriorating. The processing circuitry 402 may communicate, to the first telematics device 104*a*, a notification indicative of the determined eighth RUL and the scheduled radiator service session. Based on the notification, the first vehicle 102*a* may be taken by the first driver to the maintenance center 106 at a scheduled time for the scheduled radiator service session.

Following a servicing of the first radiator 202*h*, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining the RUL of a radiator. It will be apparent to those of skill in the art that a health status or an RUL of a radiator in any vehicle (e.g., the second vehicle 102*b* or any other vehicle) may be determined in a similar manner.

Figure 20:
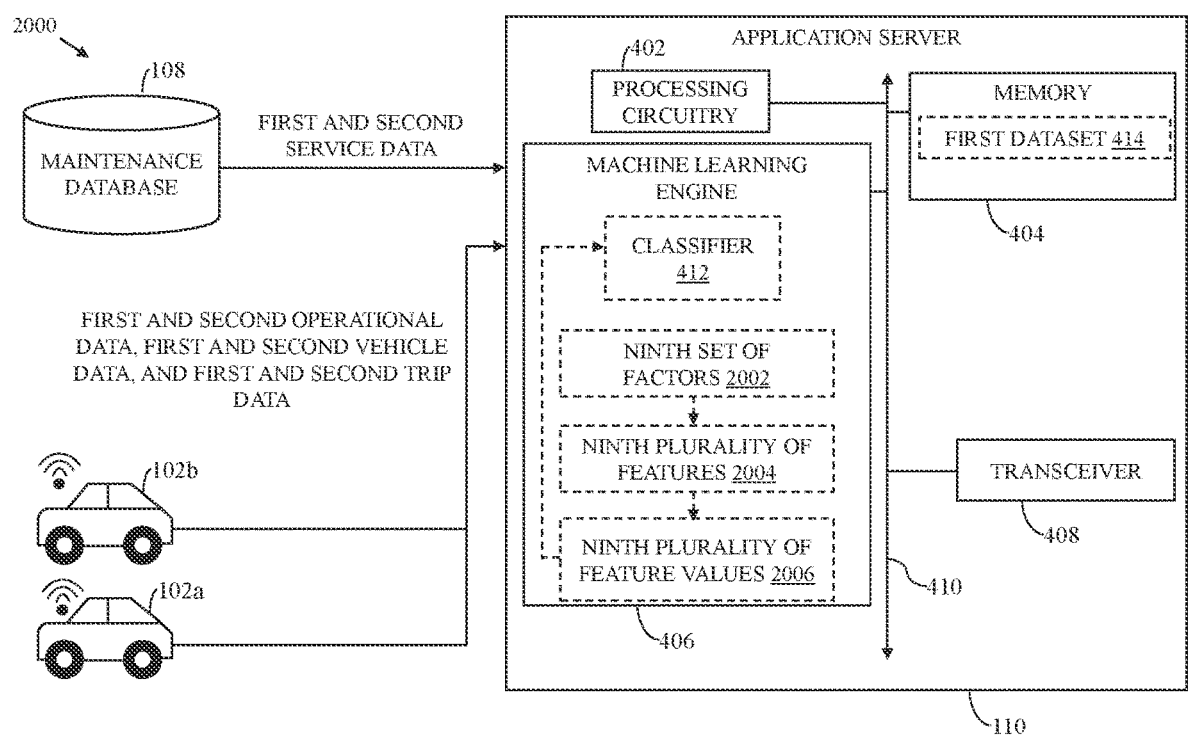
FIG. 20 is a block diagram that illustrates an exemplary scenario for training a classifier for predictive maintenance of a steering system in a vehicle, in accordance with an exemplary embodiment of the disclosure.

FIG. 20 is a block diagram 2000 that illustrates an exemplary scenario for training the classifier 412 for predictive maintenance of a steering system in a vehicle, in accordance with an exemplary embodiment of the disclosure. FIG. 20 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 20 is explained in conjunction with FIGS. 1A and 3I.

The processing circuitry 402 may collect, over the first time-interval, the first dataset 414 (as described in the foregoing description of FIG. 4). The processing circuitry 402 may store the first dataset 414 in the memory 404. The machine learning engine 406 may generate and train the classifier 412. As described in the foregoing description of FIG. 1A, prior to training the classifier 412, the machine learning engine 406 may employ the feature or variable selection techniques to process the first dataset 414 and select a ninth set of factors 2002. Each factor of the ninth set of factors 2002 may have a causal relationship (e.g., direct causal relationship or indirect causal relationship) or a high degree of correlation with a health status of a steering system in a vehicle (e.g., the first and second vehicles 102*a* and 102*b*).

In a non-limiting example, the sixth set of factors 1402 may include, but are not limited to, a health of a steering rack cooling system, a health of a steering pump, a health of a rack and pinion, a health of a suspension, or a degree of alignment of a set of wheels. The ninth set of factors 2002 may further include, a vehicle age, a vehicle model, a distance travelled (mileage), a driving pattern or a driving style of a driver, or the like. It will be apparent to those of skill in the art that factors included in the ninth set of factors 2002 are merely exemplary and should not be construed as a limitation of the disclosure. In an actual implementation, the ninth set of factors 2002 may include any number of factors and any type of factor without deviating from the scope of the disclosure. In some embodiments, the machine learning engine 406 may filter the first dataset 414 based on the ninth set of factors 2002 to obtain a filtered first dataset 414. The filtered first dataset 414 may include only data that corresponds to the ninth set of factors 2002.

In an exemplary embodiment, the machine learning engine 406 may determine, using the feature engineering techniques, a ninth plurality of features 2004 associated with the selected ninth set of factors 2002. The machine learning engine 406 may determine the ninth plurality of features 2004 by processing and analyzing the filtered first dataset 414 based on the selected ninth set of factors 2002. The ninth plurality of features 2004 may include one or more features associated with each factor of the ninth set of factors 2002. Each feature of the ninth plurality of features 2004 may be determined such that the feature captures a change, a trend, or a pattern in a value of a corresponding factor (of the ninth set of factors 2002) across various time periods (e.g., days, weeks, months, years, or the like) over the first time-interval.

For example, a first feature of the ninth plurality of features 2004 may correspond to a cumulative or total distance travelled by a vehicle prior to a steering system service session. A second feature of the ninth plurality of features 2004 may correspond to an age of a vehicle prior to a steering system service session. A third feature of the ninth plurality of features 2004 may correspond to a moving average of distances travelled by a vehicle between consecutive steering system service sessions. A fourth feature of the ninth plurality of features 2004 may correspond to a degree of alignment or misalignment of a set of wheels of a vehicle prior to a steering system service session.

A fifth feature of the ninth plurality of features 2004 may correspond to a level of wear and tear on a steering rack cooling system (i.e., a health of the steering rack cooling system) in a vehicle prior to a steering system service session. A sixth feature of the ninth plurality of features 2004 may correspond to a level of wear and tear on a steering pump (i.e., a health of the steering pump) in a vehicle prior to a steering system service session. A seventh feature of the ninth plurality of features 2004 may correspond to a level of wear and tear on a suspension system (i.e., a health of the suspension system) in a vehicle prior to a steering system service session. In a non-limiting example, a health (i.e., a level of wear and tear) of mechanical or electromechanical components such as the steering rack cooling system (e.g., the first steering rack cooling system 318*a*), the steering pump (e.g., the first steering pump 318*c*), the suspension system (e.g., the first suspension system 202*j*), or the like may be quantified by way of service data of a corresponding vehicle (e.g., the first and third service data of the first vehicle 102*a*). In another non-limiting example, the health of the mechanical or electromechanical components may be quantified by way of sensor data or one or more DTCs generated by a corresponding ECU.

The ninth plurality of features 2004 listed above should not be construed as limitations to the present disclosure. Each factor of the ninth set of factors 2002 may be associated with one or more features. The ninth plurality of features 2004 may include any type of feature and any number of features without deviating from the scope of the disclosure. In one embodiment, each feature of the ninth plurality of features 2004 may be assigned a weight corresponding to a strength of a relationship of correlation or causation between the feature and a health status of a steering system.

On determining the ninth plurality of features 2004, the machine learning engine 406 processes the filtered first dataset 414 to determine a ninth plurality of feature values 2006. For determining the ninth plurality of feature values 2006, the machine learning engine 406 may determine, for each vehicle of the plurality of vehicles 102, a feature value for each of the ninth plurality of features 2004 (as described in the foregoing description of FIG. 4).

The machine learning engine 406 may determine the ninth plurality of feature values 2006 for the ninth plurality of features 2004. On determining the ninth plurality of feature values 2006, the machine learning engine 406 may initiate a training phase of the classifier 412. The machine learning engine 406 may train the classifier 412 for determining a health status of a steering system. The training of the classifier 412 may be based on the ninth plurality of feature values 2006 and the weight assigned to each feature of the ninth plurality of features 2004. In other words, the ninth plurality of feature values 2006 and the weight assigned to each feature of the ninth plurality of features 2004 constitute a ninth training dataset for training the classifier 412. Methods of training the classifier 412 on the ninth training dataset to determine a health status of a steering system are well known to those of skill in the art. In the current embodiment, for the sake of brevity, the ninth training dataset has been shown to correspond to a sample size of two (i.e., the first and second vehicles 102*a* and 102*b*). However, in an actual implementation, the ninth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the ninth training dataset, to determine an RUL of a steering system in a vehicle and classify the determined RUL as one of a good RUL, a bad RUL, a very bad RUL, or the like.

Figure 21:
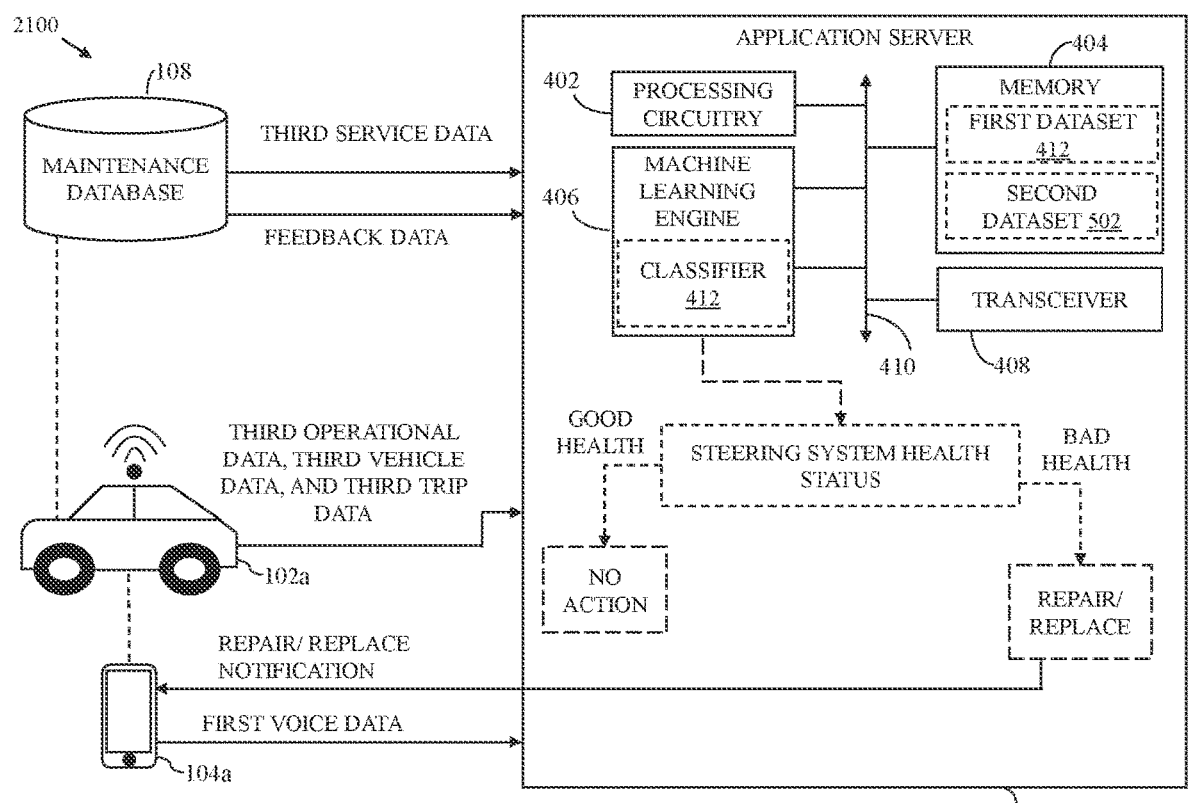
FIG. 21 is a block diagram that illustrates determination of a health status of a steering system in the first vehicle, in accordance with an exemplary embodiment of the disclosure.

FIG. 21 is a block diagram 2100 that illustrates determination of a health status of the first steering system 202*i*, in accordance with an exemplary embodiment of the disclosure. FIG. 21 is explained in conjunction with FIGS. 1A and 20. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104*a*, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the ninth plurality of features 2004 (as described in the foregoing description of FIG. 5). Based on the data determined from the second dataset 502, the classifier 412 may determine a health status of the first steering system 202*i*. In other words, the classifier 412 determines whether the first steering system 202*i* is functioning properly or not.

In a non-limiting example, the classifier 412 determines a probability (e.g., "80%") that the first steering system 202*i* is currently faulty (i.e., health status is bad). If the probability (e.g. "80%") associated with the determination is greater than or equal to a preset probability threshold (e.g., "30%"), the health status of the first steering system 202*i* is classified as bad. If the probability (e.g. "80%") associated with the determination is less than the preset probability threshold (e.g., "30%"), the health status of the first steering system 202*i* is classified as good.

The machine learning engine 406 may employ the one or more model interpretability techniques, to identify a set of factors that have influenced the classifier 412 in determining faulty functioning of the first steering system 202*e* (i.e., "80%" probability of the health status of the first steering system 202*i* being bad). Based on the determined health status of the first steering system 202*i*, the processing circuitry 402 may communicate, by way of the transceiver 408, a notification to the first telematics device 104*a*. The notification may be indicative of the determined health status of the first steering system 202*i*. Further, the notification may include a message requesting the first driver to assess a functioning of the first steering system 202*i* (as described in the foregoing description of FIG. 5). In other words, the processing circuitry 402 may request the first driver to assess whether the first steering system 202*i* displays an onset of one or more symptoms of poor health or faulty functioning of the first steering system 202*i*. The one or more symptoms may include, but are not limited to, noise while turning a steering wheel of the first steering system 202*i*, an excessive level of "play" in the steering wheel, or the like.

In one embodiment, first voice data (i.e., feedback) indicative of an assessment of the functioning of the first steering system 202*i* may be communicated by the first driver to the application server 110 by way of the first telematics device 104*a*. For example, the first voice data may include a speech message recorded by the first driver, indicating a noise while turning the steering wheel of the first steering system 202*i*. In another embodiment, an assessment of the functioning of the first steering system 202*i* may be communicated to the application server 110 when the first driver selects an option of the one or more options presented the UI rendered on the display screen of the first telematics device 104*a*. The first telematics device 104*a* may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first steering system 202*i* is "below par", "bad", or "very bad", the processing circuitry 402 may communicate a message to the first telematics device 104*a*, requesting the first driver to visit the maintenance center 106 for servicing the first steering system 202*i*.

Based on the message, the first vehicle 102*a* may be taken by the first driver to the maintenance center 106 for servicing. Following a servicing of the first steering system 202*i*, the maintenance system 120 in the maintenance center 106 may communicate corresponding one or more service logs to the maintenance database 108 for storing therein. The service logs may indicate repair or replacement of one or more internal components of the first steering system 202*i*. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first steering system 202*i*) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first steering system 202*i* is "below par", "bad", or "very bad" and the corresponding service data indicates the repair and/or the replacement of the one or more internal components of the first steering system 202*i*, the machine learning engine 406 tags the output as a true negative.

If the deciphered speech message indicates that the functioning of the first steering system 202*i* is "good", the processing circuitry 402 may or may not communicate, to the first telematics device 104*a*, a message requesting the first driver to visit the maintenance center 106 for servicing the first steering system 202*i*. In some scenarios, no such message is communicated to the first telematics device 104*a* by the processing circuitry 402. In such scenarios, the machine learning engine 406 may tag the output as a false negative (i.e., bad health status determined wrongly).

However, in other scenarios, the processing circuitry 402 may communicate the message to the first telematics device 104*a*. Based on the message, the first vehicle 102*a* may be taken by the first driver to the maintenance center 106 for servicing. Following the servicing of the first steering system 202*i*, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first steering system 202*i* prior to the servicing, the machine learning engine 406 may tag the output as a true negative. If the corresponding service data indicates a good or healthy functioning of the first steering system 202*i* prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the ninth plurality of features 2004), as described in the foregoing description of FIG. 5.

In another example, the classifier 412 may determine a "25%" probability of the health status of the first steering system 202*i* being bad. Since the determined probability (i.e., "25%") is less than the preset probability threshold (e.g., "40%"), the health status of the first steering system 202*i* is classified as good. In other words, the classifier 412 determines that there is a "75%" probability that the health status of the first steering system 202*i* is good. In a non-limiting example, no action may be taken by the application server 110 based on the determination. However, in another non-limiting example, the processing circuitry 402 may communicate a notification to the first telematics device 104*a*, requesting the first driver for first voice data indicative of an assessment of a functioning of the first steering system 202*i*. The first voice data (i.e., feedback), indicative of the assessment of the functioning of the first steering system 202*i*, may be communicated by the first driver to the application server 110. If the first voice data is not indicative of any symptoms of poor health or faulty functioning of the first steering system 202*i*, an output (i.e., the determined health status of the first steering system 202*i*) of the classifier 412 may be tagged as a "true positive". If the first voice data is indicative of one or more symptoms of poor health or faulty functioning of the first steering system 202*i*, the output of the classifier 412 may be tagged as a "false positive". Further, if the first voice data is indicative of one or more symptoms of faulty functioning of the first steering system 202*i*, the processing circuitry 402 may communicate a message to the first telematics device 104*a*. The message may be a request to the first driver to take the first vehicle 102*a* to the maintenance center 106 for servicing the first steering system 202*i*. Based on the tagging of the output (i.e., a result of validation of the output) as a true positive or a false positive, the machine learning engine 406 may re-train the classifier 412 (e.g., update the weights of the ninth plurality of features 2004), using the reinforcement learning techniques for improving the accuracy of the classifier 412.

In a scenario where the determined health status of the first steering system 202*i* is good, the classifier 412 may further determine a ninth RUL of the first steering system 202*i* (as described in the foregoing description of FIG. 5).

For example, the classifier 412 may determine that there is a "90%" chance of the first steering system 202*i* turning faulty after 1,000 Km. In other words, there is a "90%" chance of the first steering system 202*i* experiencing bad health (i.e., requiring repair or replacement) after 1,000 Km. Based on the determined ninth RUL, the classifier 412 may classify the determined ninth RUL as a very bad RUL.

The machine learning engine 406 may employ the one or more model interpretability techniques, to identify a set of factors that have influenced the classifier 412 in determining the ninth RUL. Based on the determined ninth RUL, the processing circuitry 402 may schedule a steering system service session for the first steering system 202*i* to prevent the health status (i.e., good health status) of the first steering system 202*i* from deteriorating. The processing circuitry 402 may communicate, to the first telematics device 104*a*, a notification indicative of the determined ninth RUL and the scheduled steering system service session. Based on the notification, the first vehicle 102*a* may be taken by the first driver to the maintenance center 106 at a scheduled time for the scheduled steering system service session.

Following a servicing of the first steering system 202*i*, the maintenance system 120 may communicate one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining the RUL of a steering system.

It will be apparent to those of skill in the art that a health status or an RUL of a steering system in any vehicle (e.g., the second vehicle 102*b* or any other vehicle) may be determined in a similar manner.

Figure 22:
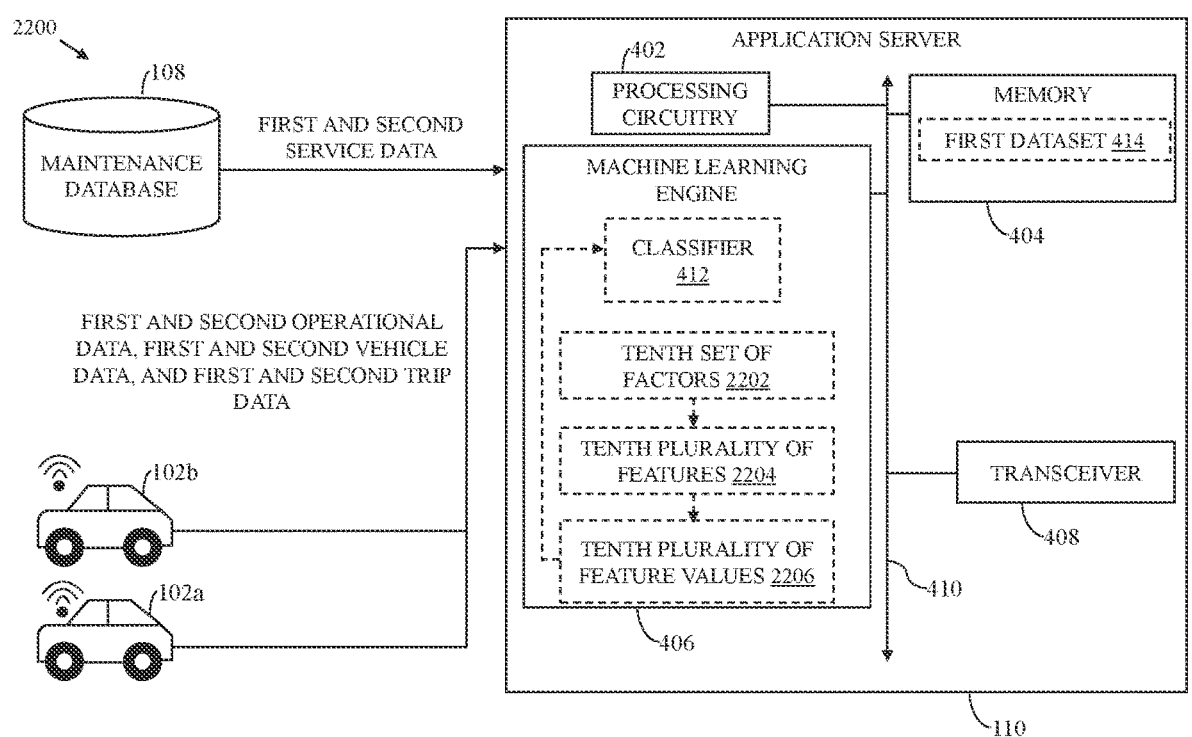
FIG. 22 is a block diagram that illustrates an exemplary scenario for training a classifier for predictive maintenance of a suspension system in a vehicle, in accordance with an exemplary embodiment of the disclosure.

FIG. 22 is a block diagram 2200 that illustrates an exemplary scenario for training the classifier 412 for predictive maintenance of a suspension system in a vehicle, in accordance with an exemplary embodiment of the disclosure. FIG. 22 includes the plurality of vehicles 102, the maintenance database 108, and the application server 110. The application server 110 is shown to include the processing circuitry 402, the memory 404, the machine learning engine 406, the transceiver 408, and the classifier 412. Functions of the processing circuitry 402, the memory 404, the machine learning engine 406, and the transceiver 408 are similar to those described in FIG. 4. FIG. 22 is explained in conjunction with FIGS. 1A and 3J.

The processing circuitry 402 may collect, over the first time-interval, the first dataset 414 (as described in the foregoing description of FIG. 4). The processing circuitry 402 may store the first dataset 414 in the memory 404.

The machine learning engine 406 may generate and train the classifier 412. As described in the foregoing description of FIG. 1A, prior to training the classifier 412, the machine learning engine 406 may employ the feature or variable selection techniques to process the first dataset 414 and select a tenth set of factors 2202. Each factor of the tenth set of factors 2202 may have a causal relationship (e.g., direct causal relationship or indirect causal relationship) or a high degree of correlation with a health status of a suspension system in a vehicle (e.g., the first and second vehicles 102*a* and 102*b*). In a non-limiting example, the tenth set of factors 1402 may include, but are not limited to, a health of a set of shock absorbers, a health of a set of suspension springs, a health of a set of suspension mounts, or a degree of alignment of a set of wheels. The tenth set of factors 2202 may further include, a vehicle age, a vehicle model, a distance travelled (mileage), a driver behavior or a driving style of a driver, road conditions of roads or routes traversed by the driver, or the like. It will be apparent to those of skill in the art that factors included in the tenth set of factors 2202 are merely exemplary and should not be construed as a limitation of the disclosure. In an actual implementation, the tenth set of factors 2202 may include any number of factors and any type of factor without deviating from the scope of the disclosure. In some embodiments, the machine learning engine 406 may filter the first dataset 414 based on the tenth set of factors 2202 to obtain a filtered first dataset 414. The filtered first dataset 414 may include only data that corresponds to the tenth set of factors 2202.

In an exemplary embodiment, the machine learning engine 406 may determine, using the feature engineering techniques, a tenth plurality of features 2204 associated with the selected tenth set of factors 2202. The machine learning engine 406 may determine the tenth plurality of features 2204 by processing and analyzing the filtered first dataset 414 based on the selected tenth set of factors 2202. The tenth plurality of features 2204 may include one or more features associated with each factor of the tenth set of factors 2202. Each feature of the tenth plurality of features 2204 may be determined such that the feature captures a change, a trend, or a pattern in a value of a corresponding factor (of the tenth set of factors 2202) across various time periods (e.g., days, weeks, months, years, or the like) over the first time-interval.

For example, a first feature of the tenth plurality of features 2204 may correspond to a cumulative or total distance travelled by a vehicle prior to a suspension system service session. A second feature of the tenth plurality of features 2204 may correspond to an age of a vehicle prior to a suspension system service session. A third feature of the tenth plurality of features 2204 may correspond to a moving average of distances travelled by a vehicle between consecutive suspension system service sessions. A fourth feature of the tenth plurality of features 2204 may correspond to a degree of alignment or misalignment of a set of wheels of a vehicle prior to a suspension system service session. A fifth feature of the tenth plurality of features 2204 may correspond to a distance travelled by a vehicle on roads with minor undulations prior to a suspension system service session. A sixth feature of the tenth plurality of features 2204 may correspond to a distance travelled by a vehicle on roads with major undulations prior to a suspension system service session.

A seventh feature of the tenth plurality of features 2204 may correspond to a level of wear and tear on a set of shock absorbers (i.e., a health of the set of shock absorbers) in a vehicle prior to a suspension system service session. An eighth feature of the tenth plurality of features 2204 may correspond to a level of wear and tear on a set of suspension springs (i.e., a health of the suspension springs) in a vehicle prior to a suspension system service session. A ninth feature of the tenth plurality of features 2204 may correspond to a level of wear and tear on a set of suspension mounts (i.e., a health of the set of suspension mounts) in a vehicle prior to a suspension system service session. In a non-limiting example, a health (i.e., a level of wear and tear) of mechanical or electromechanical components such as the set of shock absorbers (e.g., the first set of shock absorbers 320*a*), the set of suspension springs (e.g., the first set of suspension springs 320b), the set of suspension mounts (e.g., the first set of suspension mounts 320c), or the like may be quantified by way of service data of a corresponding vehicle (e.g., the first and third service data of the first vehicle 102a). In another non-limiting example, the health of the mechanical or electromechanical components may be quantified by way of sensor data or one or more DTCs generated by a corresponding ECU.

The tenth plurality of features 2204 listed above should not be construed as limitations to the present disclosure. Each factor of the tenth set of factors 2202 may be associated with one or more features. The tenth plurality of features 2204 may include any type of feature and any number of features without deviating from the scope of the disclosure.

In one embodiment, each feature of the tenth plurality of features 2204 may be assigned a weight corresponding to a strength of a relationship of correlation or causation between the feature and a health status of a suspension system. On determining the tenth plurality of features 2204, the machine learning engine 406 processes the filtered first dataset 414 to determine a tenth plurality of feature values 2206. For determining tenth plurality of feature values 2206, the machine learning engine 406 may determine, for each vehicle of the plurality of vehicles 102, a feature value for each of the tenth plurality of features 2204 (as described in the foregoing description of FIG. 4).

The machine learning engine 406 may determine the tenth plurality of feature values 2206 for the tenth plurality of features 2204. On determining the tenth plurality of feature values 2206, the machine learning engine 406 may initiate a training phase of the classifier 412.

The machine learning engine 406 may train the classifier 412 for determining a health status of a suspension system. The training of the classifier 412 may be based on the tenth plurality of feature values 2206 and the weight assigned to each feature of the tenth plurality of features 2204. In other words, the tenth plurality of feature values 2206 and the weight assigned to each feature of the ninth plurality of features 2004 constitute a tenth training dataset for training the classifier 412. Methods of training the classifier 412 on the tenth training dataset to determine a health status of a suspension system are well known to those of skill in the art. In the current embodiment, for the sake of brevity, the tenth training dataset has been shown to correspond to a sample size of two (i.e., the first and second vehicles 102a and 102b). However, in an actual implementation, the tenth training dataset may correspond to a large sample size (e.g., a sample size of a thousand vehicles, ten thousand vehicles, or a million vehicles).

As described in the foregoing description of FIG. 4, the machine learning engine 406 may further train the classifier 412, using the tenth training dataset, to determine an RUL of a steering system in a vehicle and classify the determined RUL as one of a good RUL, a bad RUL, a very bad RUL, or the like.

Figure 23:
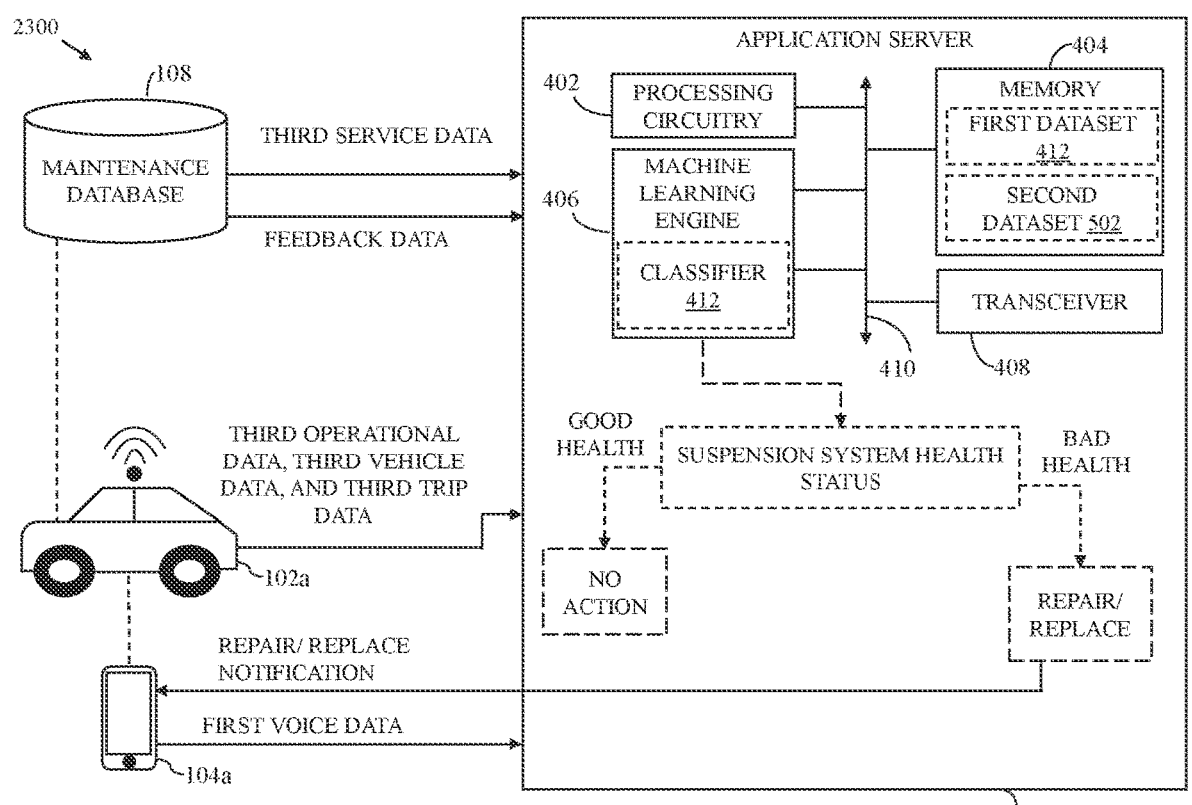
FIG. 23 is a block diagram that illustrates determination of a health status of a suspension system in the first vehicle, in accordance with an exemplary embodiment of the disclosure.

FIG. 23 is a block diagram 2300 that illustrates determination of a health status of the first suspension system 202j, in accordance with an exemplary embodiment of the disclosure. FIG. 23 is explained in conjunction with FIGS. 1A and 22. In one embodiment, the processing circuitry 402 collects, over the second time-interval, the second dataset 502 (as described in the foregoing description of FIG. 5). A portion of the second dataset 502 (e.g., the third operational data, the third vehicle data, and the third trip data) may be collected by way of the first telematics device 104a, as described in the foregoing description of FIG. 1A. The processing circuitry 402 may store the second dataset 502 in the memory 404.

The machine learning engine 406 provides the second dataset 502 as input to the trained classifier 412. The classifier 412 may determine, from the second dataset 502, data that corresponds to the tenth plurality of features 2204 (as described in the foregoing description of FIG. 5). Based on the data determined from the second dataset 502, the classifier 412 may determine a health status of the first suspension system 202j. In other words, the classifier 412 determines whether the first suspension system 202j is functioning properly or not.

In a non-limiting example, the classifier 412 determines a probability (e.g., "55%") that the first suspension system 202j is currently faulty (i.e., health status is bad). If the probability (e.g. "55%") associated with the determination is greater than or equal to a preset probability threshold (e.g., "30%"), the health status of the first suspension system 202j is classified as bad. If the probability (e.g. "55%") associated with the determination is less than the preset probability threshold (e.g., "30%"), the health status of the first suspension system 202j is classified as good.

The machine learning engine 406 may employ the one or more model interpretability techniques, to identify a set of factors that have influenced the classifier 412 in determining faulty functioning of the first suspension system 202j (i.e., "55%" probability of the health status of the first suspension system 202j being bad). Based on the determined health status of the first suspension system 202j, the processing circuitry 402 may communicate, by way of the transceiver 408, a notification to the first telematics device 104a. The notification may be indicative of the determined health status of the first suspension system 202j. Further, the notification may include a message requesting the first driver to assess a functioning of the first suspension system 202j. In other words, the processing circuitry 402 may request the first driver to assess whether the first suspension system 202j displays an onset of one or more symptoms of poor health or faulty functioning of the first suspension system 202j. The one or more symptoms may include, but are not limited to, tilting of the first vehicle 102a to one side, excessive bouncing or "bobbing" of the first vehicle 102a while driving, or the like.

In one embodiment, first voice data (i.e., feedback) indicative of an assessment of the functioning of the first suspension system 202j may be communicated by the first driver to the application server 110 by way of the first telematics device 104a. For example, the first voice data may include a speech message recorded by the first driver, indicating tilting of the first vehicle 102a to one side. In another embodiment, an assessment of the functioning of the first suspension system 202j may be communicated to the application server 110 when the first driver selects an option of the one or more options presented the UI rendered on the display screen of the first telematics device 104a. The first telematics device 104a may communicate the selected option to the application server 110. For the sake of brevity, it is assumed that the first driver communicates the first voice data. The processing circuitry 402 may include or work in conjunction with the NLP engine to decipher the speech message from the first driver. The processing circuitry 402 may communicate the deciphered speech message to the machine learning engine 406. If the deciphered speech message indicates that the functioning of the first suspension system 202j is "below par", "bad", or "very bad", the processing circuitry 402 may communicate a message to the first telematics device 104a, requesting the first driver to visit the maintenance center 106 for servicing the first suspension system 202j.

Based on the message, the first vehicle 102a may be taken by the first driver to the maintenance center 106 for servicing. Following a servicing of the first suspension system 202j, the maintenance system 120 in the maintenance center 106 may communicate corresponding one or more service logs to the maintenance database 108 for storing therein. The service logs may indicate repair or replacement of one or more internal components of the first suspension system 202j. The maintenance database 108 may communicate corresponding service data (i.e., feedback data) to the application server 110. The processing circuitry 402 may receive the corresponding service data and communicate the corresponding service data to the machine learning engine 406.

Based on the deciphered speech message and the corresponding service data, the machine learning engine 406 may validate an output (i.e., the determined health status of the first suspension system 202j) of the classifier 412 and tag the output of the classifier 412 as a "true negative" (i.e., bad health status determined correctly) or a "false negative" (i.e., bad health status determined wrongly) as per the result of validation. If the speech message indicates that the functioning of the first suspension system 202j is "below par", "bad", or "very bad" and the corresponding service data indicates the repair and/or the replacement of the one or more internal components of the first suspension system 202j, the machine learning engine 406 tags the output as a true negative.

If the deciphered speech message indicates that the functioning of the first suspension system 202j is "good", the processing circuitry 402 may or may not communicate, to the first telematics device 104a, a message requesting the first driver to visit the maintenance center 106 for servicing the first suspension system 202j. In some scenarios, no such message is communicated to the first telematics device 104a by the processing circuitry 402. In such scenarios, the machine learning engine 406 may tag the output as a false negative (i.e., bad health status determined wrongly).

However, in other scenarios, the processing circuitry 402 may communicate the message to the first telematics device 104a. Based on the message, the first vehicle 102a may be taken by the first driver to the maintenance center 106 for servicing. Following the servicing of the first suspension system 202j, the maintenance system 120 in the maintenance center 106 may communicate corresponding one or more service logs to the maintenance database 108 for storing therein. The maintenance database 108 may communicate corresponding service data (i.e., feedback data) to the application server 110. The processing circuitry 402 may receive the corresponding service data and communicate the corresponding service data to the machine learning engine 406. If the corresponding service data is indicative of a bad health status of the first suspension system 202j prior to the servicing, the machine learning engine 406 may tag the output as a true negative. If the corresponding service data indicates a good or healthy functioning of the first suspension system 202j prior to the servicing, the machine learning engine 406 may tag the output as a false negative.

Based on the tagging (i.e., the result of the validation) of the output and reinforcement learning techniques, the machine learning engine 406 may re-train the classifier 412 to improve an accuracy of the classifier 412. Further, the machine learning engine 406 may analyze the corresponding service data to determine whether the identified set of factors was correct and re-train the classifier 412 accordingly (e.g., update the weights of the tenth plurality of features 2204), as described in the foregoing description of FIG. 5.

In another example, the classifier 412 may determine a "25%" probability of the health status of the first suspension system 202j being bad. Since the determined probability (i.e., "25%") is less than the preset probability threshold (e.g., "40%"), the health status of the first suspension system 202j is classified as good. In other words, the classifier 412 determines that there is a "75%" probability that the health status of the first suspension system 202j is good. In a non-limiting example, no action may be taken by the application server 110 based on the determination. However, in another non-limiting example, the processing circuitry 402 may communicate a notification to the first telematics device 104a, requesting the first driver for first voice data (i.e., feedback) indicative of an assessment of a functioning of the first suspension system 202j. The first voice data (i.e., feedback), indicative of the assessment of the functioning of the first suspension system 202j, may be communicated by the first driver to the application server 110. If the first voice data is not indicative of any symptoms of poor health or faulty functioning of the first suspension system 202j, an output (i.e., the determined health status of the first suspension system 202j) of the classifier 412 may be tagged as a "true positive". If the first voice data is indicative of one or more symptoms of poor health or faulty functioning of the first suspension system 202j, the output of the classifier 412 may be tagged as a "false positive". Further, if the first voice data is indicative of one or more symptoms of faulty functioning of the first suspension system 202j, the processing circuitry 402 may communicate a message to the first telematics device 104a. The message may be a request to the first driver to take the first vehicle 102a to the maintenance center 106 for servicing the first suspension system 202j. Based on the tagging of the output (i.e., a result of validation of the output) as a true positive or a false positive, the machine learning engine 406 may re-train the classifier 412 (e.g., update the weights of the tenth plurality of features 2204), using the reinforcement learning techniques for improving the accuracy of the classifier 412.

In a scenario where the determined health status of the first suspension system 202j is good, the classifier 412 may further determine a tenth RUL of the first suspension system 202j (as described in the foregoing description of FIG. 5). For example, the classifier 412 may determine that there is a "90%" chance of the first suspension system 202j turning faulty after 1,000 Km. In other words, there is a "90%" chance of the first suspension system 202j experiencing bad health (i.e., requiring repair or replacement) after 1,000 Km. Based on the determined tenth RUL, the classifier 412 may classify the determined tenth RUL as a very bad RUL.

The machine learning engine 406 may employ the one or more model interpretability techniques, to identify a set of factors that have influenced the classifier 412 in determining the tenth RUL. Based on the determined tenth RUL, the processing circuitry 402 may schedule a suspension system service session for the first suspension system 202j to prevent the health status (i.e., good health status) of the first suspension system 202j from deteriorating. The processing circuitry 402 may communicate, to the first telematics device 104a, a notification indicative of the determined tenth RUL and the scheduled suspension system service session. Based on the notification, the first vehicle 102a may be taken by the first driver to the maintenance center 106 at a scheduled time for the scheduled suspension system service session.

Following a servicing of the first suspension system 202*j*, the maintenance system 120 may communicate one or more service logs to the maintenance database 108 for storing therein. The maintenance database 108 may communicate corresponding service data (i.e., feedback) to the application server 110. The processing circuitry 402 may receive the corresponding service data and communicate the corresponding service data to the machine learning engine 406. The machine learning engine 406 may analyze the corresponding service data to determine whether the identified set of factors was correct. On determining whether the set of factors was correctly identified or not, the machine learning engine 406 may re-train the classifier 412 based on the corresponding service data to improve an accuracy of the classifier 412 in determining the RUL of a suspension system. It will be apparent to those of skill in the art that a health status or an RUL of a suspension system in any vehicle (e.g., the second vehicle 102*b* or any other vehicle) may be determined in a similar manner.

The classifier 412 may be trained to determine a health status and an RUL of any vehicular system (e.g., the first plurality of vehicular systems 112*a*) of any vehicle (e.g., the plurality of vehicles 102).

In one embodiment, the classifier 412 may be further trained to determine an asset health index (i.e., a numeric score) for a vehicle based on a health status and an RUL of each vehicular system in the vehicle. In other words, the asset health index for a vehicle may be a function of the health status and the RUL of each vehicular system in the vehicle. The asset health index may be a metric that indicates an overall health of the vehicle. For example, the application server 110 (i.e., the classifier 412) may determine a first asset health index for the first vehicle 102*a* based on the health status and the RUL of each of the first plurality of vehicular systems 112*a*. A high asset health index for a vehicle may imply a relatively high overall health of the vehicle.

Figure 24:
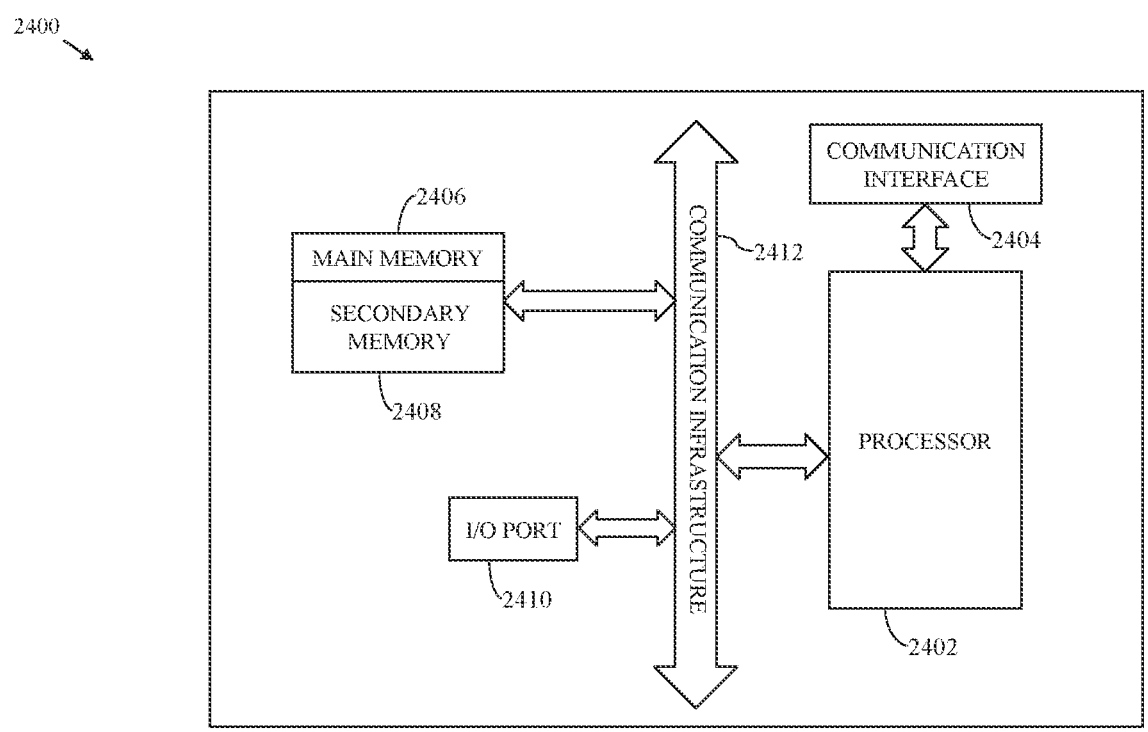
FIG. 24 is a block diagram that illustrates a system architecture of a computer system for predictive maintenance of a vehicular system in a vehicle, in accordance with an exemplary embodiment of the disclosure.

FIG. 24 is a block diagram that illustrates a system architecture of a computer system 2400 for predictive maintenance of a vehicular system in any vehicle of the plurality of vehicles 102, in accordance with an exemplary embodiment of the disclosure. An embodiment of the disclosure, or portions thereof, may be implemented as computer readable code on the computer system 2400. In one example, the application server 110 of FIGS. 1A and 1B may be implemented in the computer system 2400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A and 3B, 4, and 5.

The computer system 2400 may include a processor 2402 that may be a special purpose or a general-purpose processing device. The processor 2402 may be a single processor or multiple processors. The processor 2402 may have one or more processor "cores." Further, the processor 2402 may be coupled to a communication interface 2404, such as a bus, a bridge, a message queue, the communication network 118, multi-core message-passing scheme, or the like. The computer system 2400 may further include a main memory 2406 and a secondary memory 2408. Examples of the main memory 2406 may include RAM, ROM, and the like. The secondary memory 2408 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 2400 may further include an input/output (I/O) port 2410 and a communication infrastructure 2412. The I/O port 2410 may include various input and output devices that are configured to communicate with the processor 2402. Examples of the input devices may include a keyboard, a mouse, a joystick, a touchscreen, a microphone, and the like. Examples of the output devices may include a display screen, a speaker, headphones, and the like. The communication infrastructure 2412 may be configured to allow data to be transferred between the computer system 2400 and various devices that are communicatively coupled to the computer system 2400. Examples of the communication infrastructure 2412 may include a modem, a network interface, i.e., an Ethernet card, a communication port, and the like. Data transferred via the communication infrastructure 2412 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 2400. Examples of the communication channel may include a wired, wireless, and/or optical medium such as cable, fiber optics, a phone line, a cellular phone link, a radio frequency link, and the like. The main memory 2406 and the secondary memory 2408 may refer to non-transitory computer readable mediums that may provide data that enables the computer system 2400 to implement the methods illustrated in FIGS. 25A, 25B, and 26.

Various embodiments of the disclosure provide the application server 110 that is communicably coupled to the plurality of telematics devices 104 of the plurality of vehicles 102 for determining a health status of any vehicular system in any vehicle of the plurality of vehicles 102. The application server 110 may be configured to collect, over the first time-interval, the first dataset 414 for the plurality of vehicles 102. The first dataset 414 includes the first and second operational data, the first and second vehicle data, the first and second trip data, the first and second service data, the first and second driver behavior data, and the first and second external factor data. A portion of the first dataset 414 may be collected by way of the plurality of telematics devices 104. The application server 110 may be further configured to process the first dataset 414 to determine a plurality of features (e.g., the first plurality of features 418 or the second through tenth plurality of features 604-2204) corresponding to the vehicular system. The application server 110 may be further configured to determine a plurality of feature values (e.g., the first plurality of feature values 420 or the second through tenth plurality of feature values 606-2206) for the plurality of features. The application server 110 may be further configured to train the classifier 412 based on the plurality of feature values. The application server 110 may be further configured to collect the second dataset 502 for the first vehicle 102*a* over the second time-interval. The second dataset 502 may include the third operational data, the third vehicle data, the third trip data, the third service data, the third driver behavior data, and the third external factor data for the first vehicle 102*a*. A portion of the second dataset 502 may be collected through the first telematics device 104*a*. The second dataset 502 may be provided as input to the trained classifier 412. The application server 110 determines the health status of the vehicular system based on an output of the trained classifier 412 for the second dataset 502.

Various embodiments of the disclosure provide the application server 110 that is communicably coupled to the database server 122 and the plurality of telematics devices 104 of the plurality of vehicles 102 for determining a health status of any vehicular system in any vehicle of the plurality of vehicles 102. The application server 110 may be configured to receive, from the database server 122, the first dataset 414 for the plurality of vehicles 102. The first dataset 414 includes the first and second operational data, the first and second vehicle data, the first and second trip data, the first and second service data, the first and second driver behavior data, and the first and second external factor data. A portion of the first dataset 414 may be collected by the database server 122 by way of the plurality of telematics devices 104. The application server 110 may be further configured to process the first dataset 414 to determine a plurality of features (e.g., the first plurality of features 418 or the second through tenth plurality of features 604-2204) corresponding to the vehicular system. The application server 110 may be further configured to determine a plurality of feature values (e.g., the first plurality of feature values 420 or the second through tenth plurality of feature values 606-2206) for the plurality of features. The application server 110 may be further configured to train the classifier 412 based on the plurality of feature values. The application server 110 may be further configured to collect the second dataset 502 for the first vehicle 102a. The second dataset 502 may include the third operational data, the third vehicle data, the third trip data, the third service data, the third driver behavior data, and the third external factor data for the first vehicle 102a. At least a portion of the second dataset 502 may be collected through the first telematics device 104a (as described in FIG. 1A). The second dataset 502 may be provided as input to the trained classifier 412. The application server 110 determines the health status of the vehicular system based on an output of the trained classifier 412 for the second dataset 502.

Figure 25A:
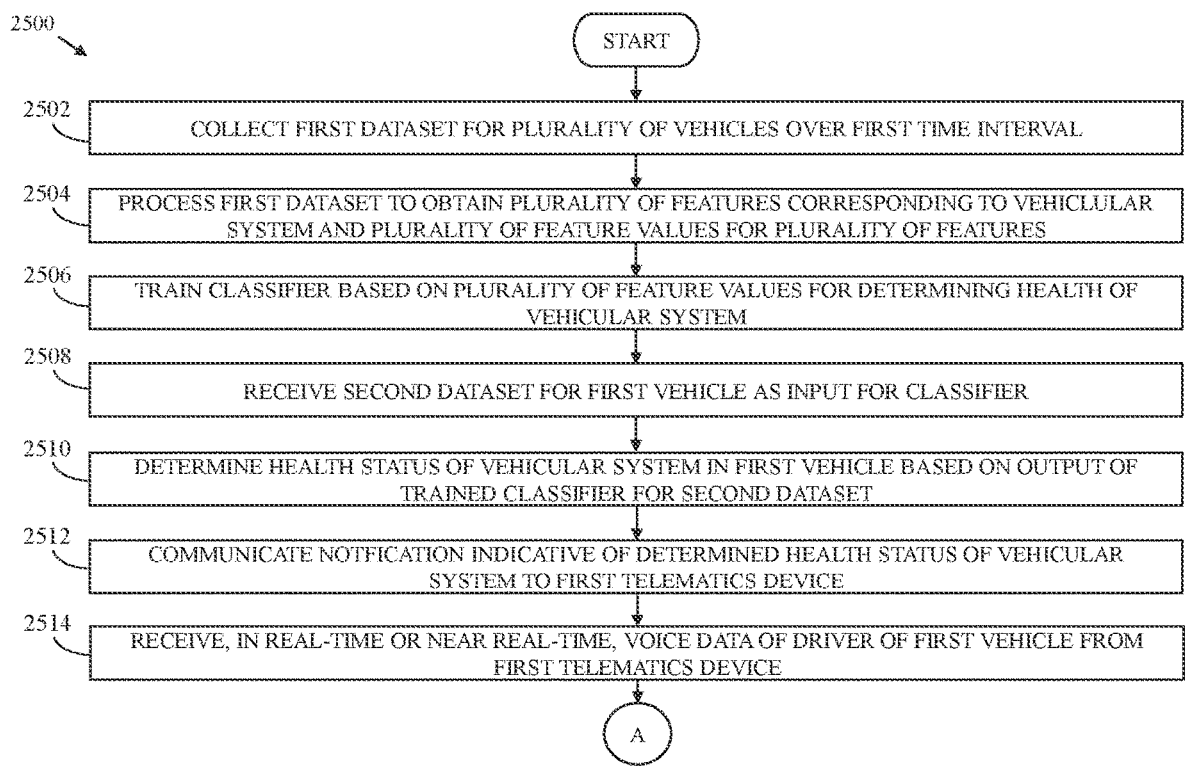
FIGS. 25A and 25B collectively, represent a flow chart that illustrates a method for determining a health status of a vehicular system, in accordance with an exemplary embodiment of the disclosure.
Figure 25B:
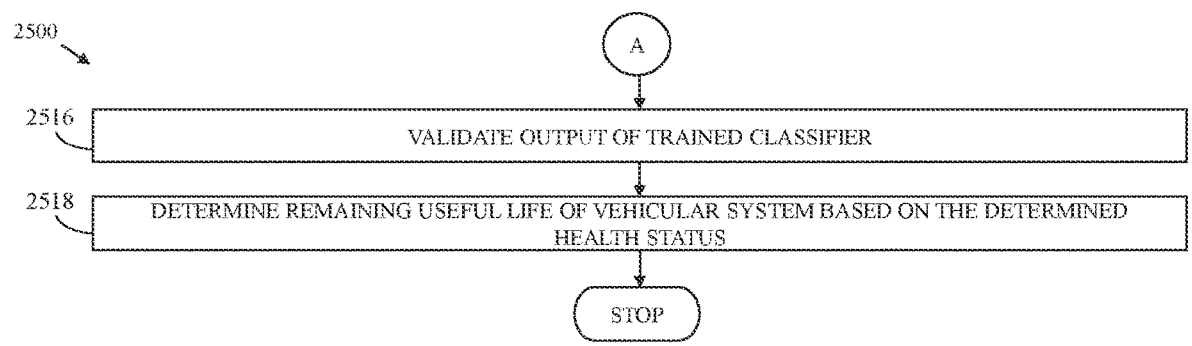

FIGS. 25A and 25B collectively, represent a flow chart 2500 that illustrates the method for determining a health status of a vehicular system of the first plurality of vehicular systems 112a, in accordance with an exemplary embodiment of the disclosure.

At 2502, the first dataset 414 is collected over the first time-interval for the plurality of vehicles 102. The application server 110 may be configured to collect the first dataset 414 over the first time-interval for the plurality of vehicles 102. The first dataset 414 includes the first and second operational data, the first and second vehicle data, the first and second trip data, the first and second service data, the first and second driver behavior data, and the first and second external factor data. At least a portion (e.g. the first and second operational data, the first and second vehicle data, and the first and second trip data) of the first dataset 414 may be collected by way of the plurality of telematics devices 104.

At 2504, the first dataset 414 is processed for determining a plurality of features (e.g., the first plurality of features 418) corresponding to the vehicular system (e.g., the first AC system 202a) and a plurality of feature values (e.g., the first plurality of feature values 420) for the plurality of features. The application server 110 may be configured to process the first dataset 414 for determining a plurality of features (e.g., the first plurality of features 418) corresponding to the vehicular system (e.g., the first AC system 202a) and a plurality of feature values (e.g., the first plurality of feature values 420) for the plurality of features. Features and feature values determined by the application server 110 for different vehicular systems are explained in the forgoing description of FIGS. 4-23.

At 2506, based on the plurality of feature values, the classifier 412 is trained for determining the health status of the vehicular system. The application server 110 may be configured to train the classifier 412, based on the plurality of feature values, for determining the health status of the vehicular system.

At 2508, the second dataset 502 is collected for the first vehicle 102a. The application server 110 may be configured to collect the second dataset 502 for the first vehicle 102a. The second dataset 502 may be collect over the second time-interval. The second dataset 502 may include the third operational data, the third vehicle data, the third trip data, the third service data, the third driver behavior data, and the third external factor data for the first vehicle 102a. A portion (e.g., third operational data, the third vehicle data, and the third trip data) of the second dataset 502 may be collected by way of the first telematics device 104a. The second dataset 502 may be provided as input to the classifier 412.

At 2510, the health status of the vehicular system is determined based on the output of the trained classifier 412 for the second dataset 502. The application server 110 may be configured to determine the health status of the vehicular system based on the output of the trained classifier 412 for the second dataset 502.

At 2512, a notification indicative of the determined health status (e.g., good health status or bad health status) of the vehicular system is communicated to the first telematics device 104a. The application server 110 may be configured to communicate, to the first telematics device 104a, a notification indicative of the determined health status (e.g., good health status or bad health status) of the vehicular system. Based on the notification, the first voice data indicative of an assessment of a functioning of the vehicular system may be communicated by the first driver to the application server 110 (as described in the foregoing description of FIG. 5).

At 2514, the first voice data of the first driver of the first vehicle 102a is received, in real-time or near-real time, from the first telematics device 104a. The application server 110 may be configured to receive, in real-time or near real-time, the first voice data of the first driver from the first telematics device 104a.

Referring now to FIG. 25B, at 2516, the output of the trained classifier 412 is validated (i.e., tagged as true positive, true negative, false positive, or false negative). The application server 110 may be configured to validate the output of the trained classifier 412 based on the received voice data and service data received from the maintenance database 108 following a service session for the vehicular system. Based on a result (i.e., tagged as true positive, true negative, false positive, or false negative) of the validation, the accuracy of the trained classifier is improved by way of the reinforcement learning techniques, as described in the foregoing description of FIG. 5.

At 2518, an RUL of the vehicular system is determined based on the determined health status. The application server 110 may be configured to determine an RUL for the vehicular system if the determined health status of the vehicular system is currently good. The application server 110 may be configured to classify the determined RUL as one of a good RUL, a bad RUL, a very bad RUL, or the like. Accordingly, the application server 110 may be configured to schedule a service session for the vehicular system at the maintenance center 106 and communicate, to the first telematics device 104*a*, a notification indicative of the determined RUL and the scheduled service session.

Figure 26:
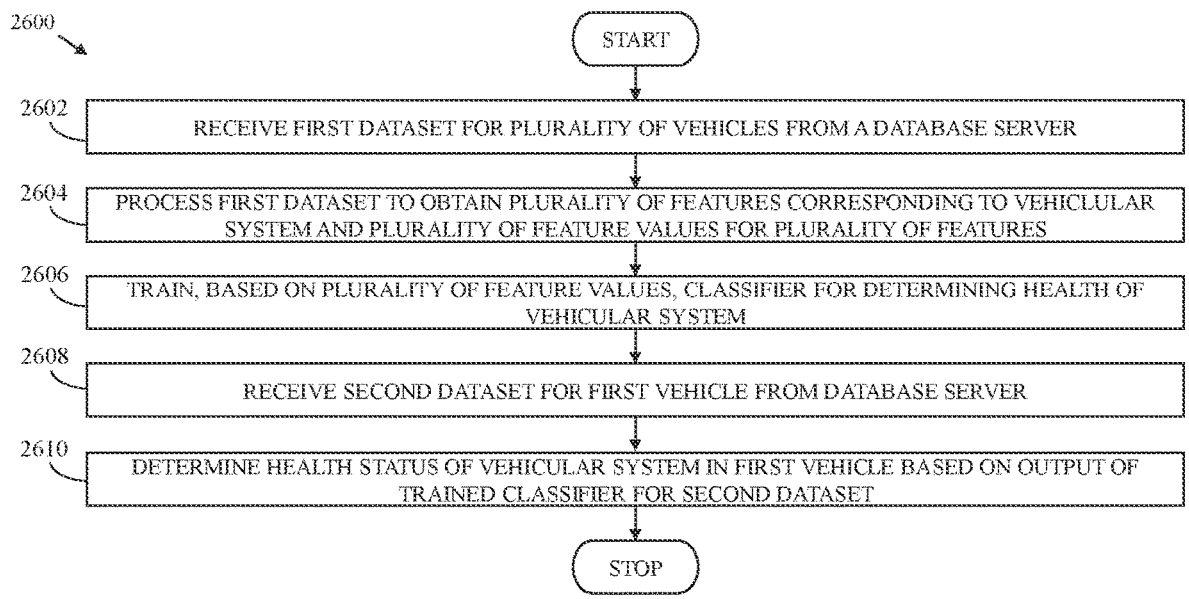
FIG. 26 represents a flow chart that illustrates a method for determining a health status of a vehicular system, in accordance with another exemplary embodiment of the disclosure.

FIG. 26 represents a flow chart 2600 that illustrates the method for determining a health status of a vehicular system of the first plurality of vehicular systems 112*a*, in accordance with another exemplary embodiment of the disclosure.

At 2602, the first dataset 414 for the plurality of vehicles 102 is received from the database server 122. The application server 110 may be configured to receive the first dataset 414 for the plurality of vehicles 102 from the database server 122. The first dataset 414 includes the first and second operational data, the first and second vehicle data, the first and second trip data, the first and second service data, the first and second driver behavior data, and the first and second external factor data.

At 2604, the first dataset 414 is processed for determining a plurality of features (e.g., the first plurality of features 418) corresponding to the vehicular system (e.g., the first AC system 202*a*) and a plurality of feature values (e.g., the first plurality of feature values 420) for the plurality of features. The application server 110 may be configured to process the first dataset 414 for determining a plurality of features (e.g., the first plurality of features 418) corresponding to the vehicular system (e.g., the first AC system 202*a*) and a plurality of feature values (e.g., the first plurality of feature values 420) for the plurality of features. Features and feature values determined by the application server 110 for different vehicular systems are explained in the forgoing description of FIGS. 4-23.

At 2606, based on the plurality of feature values, the classifier 412 is trained for determining the health status of the vehicular system. The application server 110 may be configured to train the classifier 412, based on the plurality of feature values, for determining the health status of the vehicular system.

At 2608, the second dataset 502 for the first vehicle 102*a* is received from the database server 122. The application server 110 may be configured to receive the second dataset 502 for the first vehicle 102*a* from the database server 122. The second dataset 502 may be collect over the second time-interval. The second dataset 502 may include the third operational data, the third vehicle data, the third trip data, the third service data, the third driver behavior data, and the third external factor data for the first vehicle 102*a*.

At 2610, the health status of the vehicular system is determined based on the output of the trained classifier 412 for the second dataset 502. The application server 110 may be configured to determine the health status of the vehicular system based on the output of the trained classifier 412 for the second dataset 502.

Various embodiments of the disclosure provide a non-transitory computer readable medium having stored thereon, computer executable instructions, which when executed by a computer, cause the computer to execute operations for determining a health status of a vehicular system in the first vehicle 102*a*. The operation includes collecting, by the application server 110, over the first time-interval, the first dataset 414 for the plurality of vehicles 102. The first dataset 414 includes the first and second operational data, the first and second vehicle data, the first and second trip data, and the first and second service data for the plurality of vehicles 102. A portion (i.e., the first and second operational data, the first and second vehicle data, the first and second trip data) of the first dataset 414 is collected by way of the plurality of telematics devices 104 in the plurality of vehicles 102. The operation further includes processing, by the application server 110, the first dataset 414 to determine a plurality of features (e.g., the first plurality of features 418) corresponding to the vehicular system and a plurality of feature values (e.g., the first plurality of feature values 420) for the plurality of features. The operation further includes collecting, by the application server 110, the second dataset 502 for the first vehicle 102*a*. The second dataset 502 includes the third operational data, the third vehicle data, the third trip data, and the third service data for the first vehicle 102*a*. A portion of the second dataset 502 is collected by way of the first telematics device 104*a* in the first vehicle 102*a*. The second dataset 502 is provided as input to the trained classifier 412. The operation further includes determining, by the application server 110, the health status of the vehicular system in the first vehicle 102*a* based on an output of the trained classifier 412 for the second dataset 502.

Various embodiments of the disclosure provide a non-transitory computer readable medium having stored thereon, computer executable instructions, which when executed by a computer, cause the computer to execute operations for determining a health status of a vehicular system in the first vehicle 102*a*. The operation includes receiving, by the application server 110, from the database server 122, the first dataset 414 for the plurality of vehicles 102. The first dataset 414 includes the first and second operational data, the first and second vehicle data, the first and second trip data, and the first and second service data for the plurality of vehicles 102. The operation further includes processing, by the application server 110, the first dataset 414 to determine a plurality of features (e.g., the first plurality of features 418) corresponding to the vehicular system and a plurality of feature values (e.g., the first plurality of feature values 420) for the plurality of features. The operation further includes receiving, by the application server 110, from the database server 122, the second dataset 502 for the first vehicle 102*a*. The second dataset 502 includes the third operational data, the third vehicle data, the third trip data, and the third service data for the first vehicle 102*a*. The second dataset 502 is provided as input to the trained classifier 412. The operation further includes determining, by the application server 110, the health status of the vehicular system in the first vehicle 102*a* based on an output of the trained classifier 412 for the second dataset 502.

The disclosed methods encompass numerous advantages. The disclosed methods describe collecting external factor data (e.g., the first external factor data) and driver behavior data, in addition to vehicle-related data and service data for determination of a health status of any vehicular system of a vehicle. Therefore, operating conditions (e.g., weather conditions, road conditions, or driving patterns) of the vehicle are taken into account for the determination of the health status of the vehicular system. The disclosed methods enable determination of a health status and an RUL of any type of vehicular system (e.g., electronic, electrical, mechanical, or electromechanical vehicular system).

Based on a determined health status and an RUL of a vehicular system of a vehicle, a need for immediate or predictive service sessions is determined, enabling scheduling of vehicular system-specific and/or component-specific service sessions for targeted mitigation of issues identified in the vehicular system. Therefore, time taken for servicing a vehicle is utilized in an optimized manner, resulting in minimal downtime of the vehicle. In a scenario where multiple vehicles are operated by a single entity (e.g., a transport provider such as a transport aggregator), a health status and an RUL of each vehicle may facilitate triaging service sessions for each vehicle in a manner that facilitates business continuity and minimizes negative commercial impact.

Further, the disclosed methods describe identification of factors responsible for a bad health status or a bad RUL for a vehicular system in a vehicle. This enables the maintenance center 106 to minimize a time spent in diagnosing issues in the vehicular system, decreasing a time taken to service the vehicle and/or the vehicular system, and, thereby, increasing revenue of the maintenance center 106. Determination of a health status for any vehicular system is validated or invalidated based on voice data (i.e., feedback) and service data (i.e., feedback data) from the maintenance database 108. This enables constant improvement in the accuracy of the classifier 412, using reinforcement learning techniques.

Further, the disclosed methods describe determination of the asset health index for each of the plurality of vehicles 102. The asset health index of a vehicle is a holistic assessment of a health of the vehicle. Therefore, the asset health index of the vehicle may be used as proxy for resale value of the vehicle, such that a higher asset health index translates to a higher resale value.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for determining a health status of a vehicular system. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A predictive maintenance method, comprising:
   collecting, by a server, over a first time-interval, a first dataset for a plurality of vehicles, wherein
   the first dataset includes first operational data, second operational data, first vehicle data, second vehicle data, first trip data, second trip data, first service data, and second service data for the plurality of vehicles,
   at least a portion of the first dataset is collected based on a plurality of telematics devices in a first vehicle of the plurality of vehicles, and
   the plurality of telematics devices is communicatively coupled to the server over a communication network in real-time;
   collecting over a second-time interval after the first time-interval, a second dataset for the first vehicle, wherein the second dataset includes third operational data, third vehicle data, third trip data, and third service data for the first vehicle;
   processing, by the server, the first dataset for:
   selecting a first set of factors, from the first dataset, affecting a health status of a vehicular system of the plurality of vehicles, wherein the selection of the first set of factors is based on a degree of correlation of each factor of the first set of factors with the health status of the vehicular system;
   determining a plurality of features associated with the selected first set of factors, wherein each feature of the plurality of features corresponds to one of a change, a trend, a pattern in a value of a factor of the selected first set of factors;
   associating each feature of the plurality of features with a corresponding weight value, wherein
   the corresponding weight value of the each feature is indicative of a strength of the degree of correlation between the each feature and the health status of the vehicular system,
   the corresponding weight value, of a specific feature of the plurality of features, having a higher value than a defined threshold value has a specific strength of the degree of correlation between the specific feature and the health status of the vehicular system;
   training, by the server, a classifier based on the plurality of features and the corresponding weight value associated with each feature of the plurality of features;
   providing the second dataset as an input to the trained classifier;
   determining, by the trained classifier from the second dataset, the health status of the vehicular system of the plurality of vehicles in real-time, the health status of the vehicular system;
   determining, by the trained classifier, a probability of a current health status of the vehicular system based on a specific threshold, and
   based on the probability being less than the specific threshold, determining a remaining useful life (RUL) of the vehicular system; and
   classifying, by the trained classifier based on the determination of the RUL of the vehicular system, the determined RUL as one of a 'good' RUL, a 'bad' RUL, or a 'very bad RUL', wherein
   the RUL is classified as the 'good' RUL in a case where the RUL is greater than a first threshold value,
   the RUL is classified as the 'bad' RUL in a case where the RUL is one of less than or equal to the first threshold value, and greater than a second threshold value,
   the RUL is classified as the 'very bad RUL' in a case where the RUL is less than or equal to the second threshold value, and
   the first threshold value and the second threshold value are indicative of a remaining distance for the first vehicle to traverse before requiring repair of components of the vehicular system.

2. The predictive maintenance method of claim 1, wherein the first dataset further includes driver behavior data of a plurality of drivers associated with the plurality of vehicles and external factor data associated with the plurality of vehicles, and wherein the method further comprises:

determining a driving pattern of a first driver based on the driver behavior data, wherein the driving pattern of the first driver is based on one of a throttle input, an acceleration, a deceleration, or a revving of a first engine to classify a category of aggressiveness of the first driver.

3. The predictive maintenance method of claim 1, wherein the first vehicle data includes a vehicle model, a vehicle make, and a vehicle age of each of the plurality of vehicles.

4. The predictive maintenance method of claim 1, wherein the plurality of features includes at least one of a plurality of moving average values, a plurality of cumulative sum values, or a plurality of rolling mean values based on the processing of the first dataset.

5. The predictive maintenance method of claim 1, wherein the vehicular system is an air conditioning (AC) system, and wherein the plurality of features is associated with a health of an evaporator, a health of a condenser, a health of an AC clutch, a health of an AC blower, and a level of AC gas in a compressor of each vehicle of the plurality of vehicles.

6. The predictive maintenance method of claim 1, wherein the vehicular system is one of a clutch or a braking system, and wherein the plurality of features is associated with a driver behavior of a driver associated with each of the plurality of vehicles and a distance travelled by each of the plurality of vehicles.

7. The predictive maintenance method of claim 1, wherein the vehicular system is a compressed natural gas (CNG) system, and wherein the plurality of features is associated with a signal from an air intake temperature circuit, a signal from an oxygen sensor circuit, a health of a fuel injector circuit, a signal from a camshaft position sensor, a health of an ignition circuit, an efficiency of a heated catalyst, a level of performance of an exhaust pressure control valve, and a health of a throttle actuator of each vehicle of the plurality of vehicles.

8. The predictive maintenance method of claim 1, wherein the vehicular system corresponds to a set of components in an engine bay, and wherein the plurality of features is associated with a health of an engine, a level of engine oil in an engine oil tank, a health of an oil feed line, a health of an oil sump, a health of a turbocharger, a health of a radiator, a level of coolant in a coolant tank, a health of a set of spark plugs, a health of a thermostat, and a health of a set of fuel injectors of each vehicle of the plurality of vehicles.

9. The predictive maintenance method of claim 1, wherein the vehicular system is a fuel injection system, and wherein the plurality of features is associated with a health of a fuel filter, a health of an engine, and a health of a set of spark plugs of each vehicle of the plurality of vehicles.

10. The predictive maintenance method of claim 1, wherein the vehicular system is a turbocharger, and wherein the plurality of features is associated with a health of an air filter, a health of an oil filter, a health of an engine, a health of an oil feed line, a health of an oil sump, a level of coolant in a coolant tank, a health of a set of spark plugs, a health of a radiator, and a level of engine oil in each vehicle of the plurality of vehicles.

11. The predictive maintenance method of claim 1, wherein the vehicular system is a radiator, and wherein the plurality of features is associated with a health of a radiator cooling fan, a health of a set of radiator mountings, a health of a water pump, a health of a thermostat, a health of a heater core, a level of coolant in a coolant tank, a health of an engine, and a health of an alternator belt in each vehicle of the plurality of vehicles.

12. The predictive maintenance method of claim 1, wherein the vehicular system is a steering system, and wherein the plurality of features is associated with a health of a steering rack cooling system, a health of a suspension, a health of a steering pump, and a degree of alignment of a set of wheels of each vehicle of the plurality of vehicles.

13. The predictive maintenance method of claim 1, wherein the vehicular system is a suspension system, and wherein the plurality of features is associated with a health of a set of shock absorbers, a health of a set of springs, a health of a set of suspension mounts, and a degree of alignment of a set of wheels of each vehicle of the plurality of vehicles.

14. The predictive maintenance method of claim 1, further comprising receiving, by the server, in real-time or near real-time, voice data of a driver of the first vehicle from a first telematics device.

15. The predictive maintenance method of claim 14, wherein the determination of the health status of the vehicular system included in the first vehicle is further based on the voice data.

16. The predictive maintenance method of claim 1, further comprising communicating, by the server, a notification indicative of the determined health status of the vehicular system to a first telematics device.

17. The predictive maintenance method of claim 1, further comprising validating, by the server, output of the trained classifier for the second dataset, wherein a result of the validation is used as feedback to improve an accuracy of the trained classifier.

* * * * *